(12) United States Patent
Cheng et al.

(10) Patent No.: US 12,117,687 B1
(45) Date of Patent: Oct. 15, 2024

(54) LIQUID CRYSTAL POLARIZATION HOLOGRAM WITH ENHANCED ANGULAR LUMINANCE UNIFORMITY AND SYSTEM INCLUDING THE SAME

(71) Applicant: Meta Platforms Technologies, LLC, Menlo Park, CA (US)

(72) Inventors: Hsien-Hui Cheng, Woodinville, WA (US); Michael Escuti, Redmond, WA (US); Xiayu Feng, Kirkland, WA (US); Mengfei Wang, Woodinville, WA (US); Steven John Robbins, Redmond, WA (US); Zhexin Zhao, Redmond, WA (US); Lu Lu, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/302,556

(22) Filed: Apr. 18, 2023

(51) Int. Cl.
  *G02F 1/1335* (2006.01)
  *G02F 1/13363* (2006.01)
  *G02F 1/1337* (2006.01)
  *G02F 1/137* (2006.01)
  *G03H 1/02* (2006.01)

(52) U.S. Cl.
  CPC .. *G02F 1/133524* (2013.01); *G02F 1/133507* (2021.01); *G02F 1/13355* (2021.01); *G02F 1/133636* (2013.01); *G02F 1/133757* (2021.01); *G02F 1/13706* (2021.01); *G03H 1/0248* (2013.01)

(58) Field of Classification Search
  None
  See application file for complete search history.

(56) References Cited

U.S. PATENT DOCUMENTS

| 8,896,507 B2 | 11/2014 | Broughton et al. |
| 10,012,884 B2 | 7/2018 | Osterman et al. |
| 10,996,476 B2 | 5/2021 | Maimone et al. |
| 11,079,646 B2 | 8/2021 | Robinson et al. |
| 2021/0364833 A1 | 11/2021 | Geng et al. |
| 2022/0035158 A1 | 2/2022 | Ouderkirk et al. |
| 2022/0052301 A1 | 2/2022 | Xu et al. |
| 2022/0082837 A1 | 3/2022 | Cheng et al. |
| 2022/0113459 A1 | 4/2022 | Lee et al. |

(Continued)

OTHER PUBLICATIONS

Lee Y.H., et al., "Compact See-through Near-Eye Display with Depth Adaption," Journal of the Society for Information Display, Feb. 1, 2018, vol. 26 (2), pp. 64-70.

(Continued)

*Primary Examiner* — Phu Vu
(74) *Attorney, Agent, or Firm* — MILLBURN IP PLLC

(57) ABSTRACT

A device is provided. The device includes a light guide configured to guide a first light propagating therein. The device also includes an optical film coupled with the light guide, optically anisotropic molecules in the optical film being configured with an in-plane orientation pattern having an in-plane pitch along the predetermined in-plane direction. Within the in-plane pitch of the in-plane orientation pattern, azimuthal angles of the optically anisotropic molecules are configured to vary nonlinearly along the predetermined in-plane direction. The optical film is configured to diffract the first light as a plurality of second lights at a plurality of locations of the optical film, with a plurality of predetermined, different diffraction efficiencies.

20 Claims, 25 Drawing Sheets

(56) References Cited

U.S. PATENT DOCUMENTS

2022/0146888 A1 5/2022 Oh et al.
2022/0221747 A1 7/2022 Schowengerdt et al.

OTHER PUBLICATIONS

Lee Y.H., et al., "Optical Properties of Reflective Liquid Crystal Polarization Volume Gratings," Journal of the Optical Society of America B, May 2019, vol. 36 (5), 4 pages.
Yoon J.S., et al., "Optimization of Diffractive Optical Elements by Genetic Algorithm," Journal of the Optical Society of Korea, Mar. 1, 2000, vol. 4, No. 1, pp. 30-36.
Zhang Y., et al., "Development of Planar Diffractive Waveguides in Optical See-Through Head-Mounted Displays," Precision Engineering, Nov. 2019, vol. 60, pp. 482-496, Retrieved from the Internet: URL: https://doi.org/10.1016/j.precisioneng.2019.09.009.

Table 1

| $x/P_{tx}$ (μm) | $\varphi$ (°) $A=9$ | $\varphi$ (°) $A=18$ | $\varphi$ (°) $A=36$ | $\varphi$ (°) $A=0$ (Linear) |
|---|---|---|---|---|
| 0 | 0 | 0 | 0 | 0 |
| 0.25 | 54 | 63 | 81 | 45 |
| 0.5 | 90 | 90 | 90 | 90 |
| 0.75 | 126 | 117 | 99 | 135 |
| 1 | 180 | 180 | 180 | 180 |

FIG. 2E

Table 2

| $z''/P_B$ (μm) | φ (°) $A=9$ | φ (°) $A=18$ | φ (°) $A=36$ | φ (°) $A=0$ (Linear) |
|---|---|---|---|---|
| 0 | 0 | 0 | 0 | 0 |
| 0.25 | 54 | 63 | 81 | 45 |
| 0.5 | 90 | 90 | 90 | 90 |
| 0.75 | 126 | 117 | 99 | 135 |
| 1 | 180 | 180 | 180 | 180 |
| 1.25 | 234 | 243 | 261 | 225 |
| 1.5 | 270 | 270 | 270 | 270 |
| 1.75 | 306 | 297 | 279 | 315 |
| 2 | 360 | 360 | 360 | 360 |

Generating at least three circularly polarized beams, wherein the at least three circularly polarized beams include one or more left-handed circularly polarized beams and one or more right-handed circularly polarized beams, and the at least three circularly polarized beams are configured to interfere with one another to generate a polarization interference pattern — 1010

Exposing a polarization sensitive recording medium to the polarization interference pattern, wherein optically anisotropic molecules in the polarization sensitive recording medium that has been exposed to the polarization interference pattern form an in-plane orientation pattern — 1015

Generating a plurality of polarized beams, wherein the plurality of polarized beams include at least three circularly polarized beams, the at least three circularly polarized beams include one or more left-handed circularly polarized beams and one or more right-handed circularly polarized beams, and the at least three circularly polarized beams are configured to interfere with one another to generate a polarization interference pattern ⟋1035

↓

Exposing a polarization sensitive recording medium to the polarization interference pattern ⟋1040

↓

Forming an optically anisotropic film on the polarization sensitive recording medium that has been exposed to the polarization interference pattern, wherein the optically anisotropic film includes a mixture of a host birefringent material and a chiral dopant ⟋1045

FIG. 10B

LIQUID CRYSTAL POLARIZATION HOLOGRAM WITH ENHANCED ANGULAR LUMINANCE UNIFORMITY AND SYSTEM INCLUDING THE SAME

TECHNICAL FIELD

The present disclosure generally relates to devices and, more specifically, to a liquid crystal polarization hologram with enhanced angular luminance uniformity and a system including the same.

BACKGROUND

Liquid crystal polarization holograms ("LCPHs") combine features of liquid crystal devices and polarization holograms. Liquid crystal displays ("LCDs"), having grown to a trillion dollar industry over the past decades, are the most successful examples of liquid crystal devices. The LCD industry has made tremendous investments to scale manufacturing, from the low end G2.5 μmanufacturing line to the high end G10.5+ to meet the market demands for displays. However, the LCD industry has recently faced competition from organic light-emitting diodes ("OLED"), e-paper and other emerging display technologies, which has flattened the growth rate of LCD industry and has rendered significant early generation capacity redundant. This provides an opportunity to repurpose the LCD idle capacity and existing supply chain to manufacture novel LC optical devices characterized by their polarization holograms.

LCPHs or LCPH elements have features such as small thickness (e.g., about 1 um), light weight, compactness, large aperture, high efficiency, simple fabrication, etc. Thus, LCPH elements have gained increasing interests in optical device and system applications, e.g., near-eye displays ("NEDs"), head-up displays ("HUDs"), head-mounted displays ("HMDs"), smart phones, laptops, televisions, or vehicles, etc. For example, LCPH elements may be used for addressing accommodation-vergence conflict, enabling thin and highly efficient eye-tracking and depth sensing in space constrained optical systems, developing optical combiners for image formation, correcting chromatic aberrations for image resolution enhancement of refractive optical elements in compact optical systems, and improving the efficiency and reducing the size of optical systems.

SUMMARY OF THE DISCLOSURE

Consistent with an aspect of the present disclosure, a device is provided. The device includes a light guide configured to guide a first light propagating therein. The device also includes an optical film coupled with the light guide, optically anisotropic molecules in the optical film being configured with an in-plane orientation pattern having an in-plane pitch along the predetermined in-plane direction. Within the in-plane pitch of the in-plane orientation pattern, azimuthal angles of the optically anisotropic molecules are configured to vary nonlinearly along the predetermined in-plane direction. The optical film is configured to diffract the first light as a plurality of second lights at a plurality of locations of the optical film, with a plurality of predetermined, different diffraction efficiencies.

Consistent with another aspect of the present disclosure, a method is provided. The method includes generating at least three circularly polarized beams. The at least three circularly polarized beams include one or more left-handed circularly polarized beams and one or more right-handed circularly polarized beams, and the at least three circularly polarized beams are configured to interfere with one another to generate a polarization interference pattern. The method also includes exposing a polarization sensitive recording medium to the polarization interference pattern to align optically anisotropic molecules in the polarization sensitive recording medium to form an in-plane orientation pattern.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings:

FIG. 2E illustrates simulation results showing azimuthal angles of optically anisotropic molecules for a series of in-plane axis distances over a single in-plane pitch, for both the LCPH element shown in FIG. 2A when the amplitude of a nonlinear term is of different non-zero values, and for a conventional R-PVH element where the amplitude is zero;

FIG. 2G illustrates simulation results showing azimuthal angles of optically anisotropic molecules for a series of out-of-plane axis distances over a single helical pitch, for both the LCPH element shown in FIG. 2A when the amplitude of a nonlinear term is of different non-zero values, and for a conventional R-PVH element where the amplitude is zero;

FIGS. 10A and 10B are flowcharts illustrating methods for fabricating an LCPH element, according to various embodiments of the present disclosure.

DETAILED DESCRIPTION

Figure 1A:
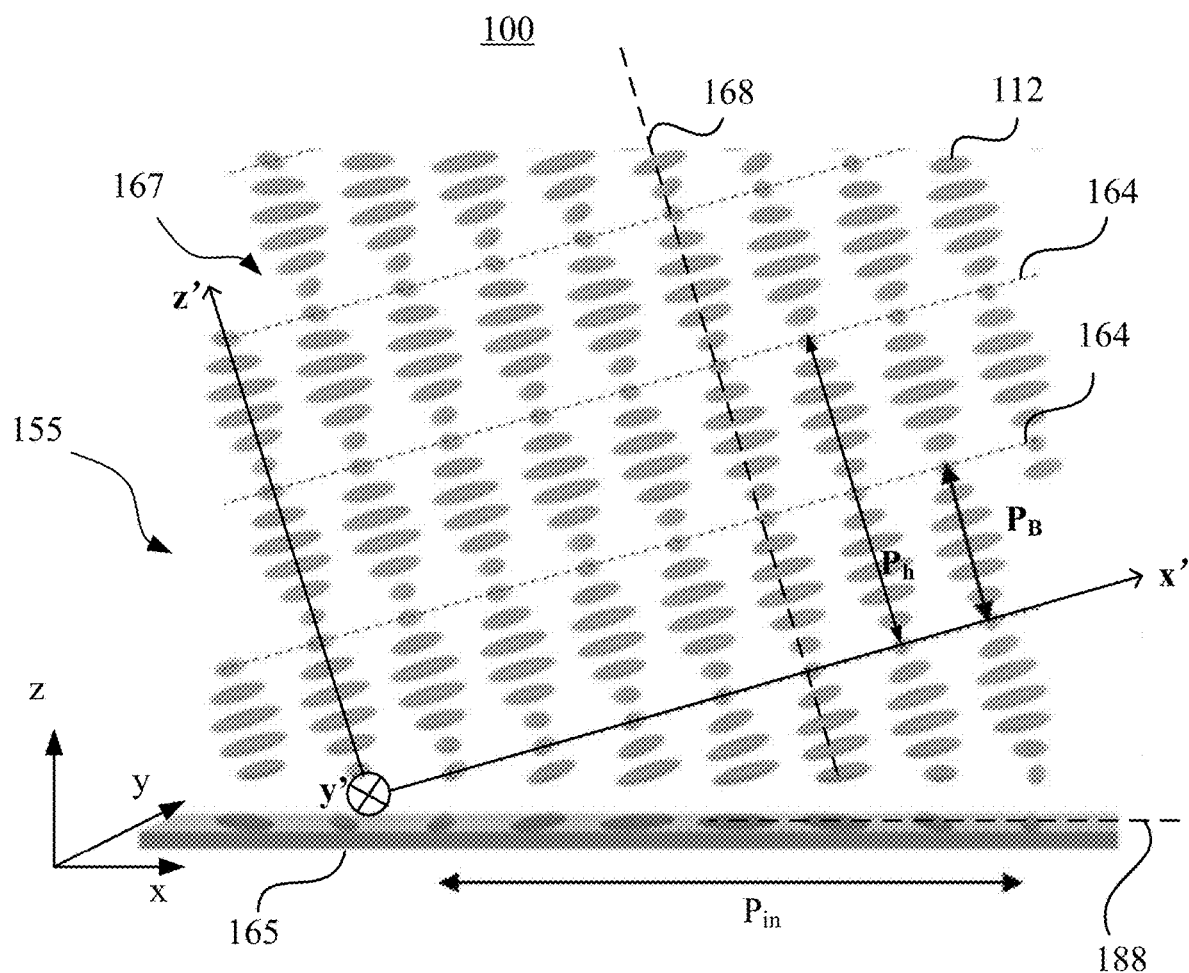
FIG. 1A illustrates a three-dimensional ("3D") view of a conventional reflective polarization volume hologram ("R-PVH") element.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the se$\phi$ is the azimuthal uence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable. The term "film plane" refers to a plane in the film, layer, coating, or plate that is perpendicular to the thickness direction or a normal of a surface of the film, layer, coating, or plate. The film plane may be a plane in the volume of the film, layer, coating, or plate, or may be a surface plane of the film, layer, coating, or plate. The term "in-plane" as in, e.g., "in-plane orientation," "in-plane direction," "in-plane pitch," etc., means that the orientation, direction, or pitch is within the film plane. The term "out-of-plane" as in, e.g., "out-of-plane direction," "out-of-plane orientation," or "out-of-plane pitch" etc., means that the orientation, direction, or pitch is not within a film plane (i.e., non-parallel with a film plane). For example, the direction, orientation, or pitch may be along a line that is perpendicular to a film plane, or that forms an acute or obtuse angle with respect to the film plane. For example, an "in-plane" direction or orientation may refer to a direction or orientation within a surface plane, an "out-of-plane" direction or orientation may refer to a thickness direction or orientation non-parallel with (e.g., perpendicular to) the surface plane. In some embodiments, an "out-of-plane" direction or orientation may form an acute or right angle with respect to the film plane.

The term "orthogonal" as used in "orthogonal polarizations" or the term "orthogonally" as used in "orthogonally polarized" means that an inner product of two vectors representing the two polarizations is substantially zero. For example, two lights or beams with orthogonal polarizations (or two orthogonally polarized lights or beams) may be two linearly polarized lights (or beams) with two orthogonal polarization directions (e.g., an x-axis direction and a y-axis direction in a Cartesian coordinate system) or two circularly polarized lights with opposite handednesses (e.g., a left-handed circularly polarized light and a right-handed circularly polarized light).

The wavelength ranges, spectra, or bands mentioned in the present disclosure are for illustrative purposes. The disclosed optical device, system, element, assembly, and method may be applied to a visible wavelength band, as well as other wavelength bands, such as an ultraviolet ("UV") wavelength band, an infrared ("IR") wavelength band, or a combination thereof. The term "substantially" or "primarily" used to modify an optical response action, such as transmit, reflect, diffract, block or the like that describes processing of a light means that a majority portion, including all, of a light is transmitted, reflected, diffracted, or blocked, etc. The majority portion may be a predetermined percentage (greater than 50%) of the entire light, such as 100%, 95%, 90%, 85%, 80%, etc., which may be determined based on specific application needs.

An angle of a beam (e.g., a diffraction angle of a diffracted beam, a reflection angle of a reflected light, or an incidence angle of an incident beam) with respect to a normal of a surface of an optical element can be defined as a positive angle or a negative angle, depending on the angular relationship between a propagating direction of the beam and the normal of the surface. For example, when a virtual line representing the propagating direction of the beam deviates from the normal in a clockwise direction (or counter-clockwise direction), the angle of the beam relative to the normal may be defined as a positive angle, and when the virtual line representing the propagating direction of the beam deviates from the normal in the counter-clockwise direction (or clockwise direction), the angle of the beam relative to the normal may be defined as a negative angle.

As used herein, the term "liquid crystal compound" or "mesogenic compound" may refer to a compound including one or more calamitic (rod- or board/lath-shaped) or discotic (disk-shaped) mesogenic groups. The term "mesogenic group" may refer to a group with the ability to induce liquid crystalline phase (or mesophase) behavior. In some embodiments, the compounds including mesogenic groups may not exhibit a liquid crystal ("LC") phase themselves. Instead, the compounds may exhibit the LC phase when mixed with other compounds. In some embodiments, the compounds may exhibit the LC phase when the compounds, or the mixture containing the compounds, are polymerized. For simplicity of discussion, the term "liquid crystal" is used hereinafter for both mesogenic and LC materials. In some embodiments, a calamitic mesogenic group may include a mesogenic core including one or more aromatic or non-aromatic cyclic groups connected to each other directly or via linkage groups. In some embodiments, a calamitic mesogenic group may include terminal groups attached to the ends of the mesogenic core. In some embodiments, a calamitic mesogenic group may include one or more lateral groups attached to a long side of the mesogenic core. These terminal and lateral groups may be selected from, e.g., carbyl or hydrocarbyl groups, polar groups such as halogen, nitro, hydroxy, etc., or polymerizable groups.

As used herein, the term "reactive mesogen" ("µM") may refer to a polymerizable mesogenic or a liquid crystal compound. A polymerizable compound with one polymerizable group may be also referred to as a "mono-reactive" compound. A compound with two polymerizable groups may be referred to as a "di-reactive" compound, and a compound with more than two polymerizable groups may be referred to as a "multi-reactive" compound. Compounds without a polymerizable group may be also referred to as "non-reactive" compounds. For discussion purposes, the term "liquid crystal" may encompass both polymerizable liquid crystal and non-polymerizable liquid crystal. As used herein, the term "director" may refer to a preferred orientation direction of long molecular axes (e.g., in case of calamitic compounds) or short molecular axes (e.g., in case of discotic compounds) of the LC molecules. The term "optic axis" may refer to a direction in a crystal. A light propagating in the optic axis direction may not experience birefringence (or double refraction). An optic axis may be a direction rather than a single line.

The term "diffraction efficiency" as used herein is a φ is the azimuthal uantitative measurement of the extent to which energy of an incident light is diffracted by a diffractive element. The diffraction efficiency may be defined as a ratio between an intensity (or optical power) of a diffracted light output from the diffractive element and an intensity (or optical power) of the incident light. The diffraction efficiency of the diffractive element may be calculated for a specific incident light, or a specific polarized component in the incident light. The diffraction efficiency for a specific polarized component in an incident light may be the same as or may be different from the diffraction efficiency for the overall incident light. Diffraction may include forward diffraction and backward diffraction. For illustrative purposes, the backward diffraction may be used as an example in the drawings and below descriptions. The term "diffraction efficiency" may be shown as reflection efficiency in some drawings as an example.

FIG. 1A illustrates a 3D view of a conventional reflective polarization hologram volume ("R-PVH") element 100. The R-PVH element 100 based on self-organized CLCs may be referred to as a slanted or patterned CLC element. Referring to FIG. 1A, the R-PVH element 100 may include an R-PVH layer 155. Within the volume of the R-PVH layer 155, the LC molecules 112 may be arranged to form a plurality of helical structures 167 with a plurality of helical axes 168, and a plurality of series of Bragg planes 164. The helical axis 168 may be slanted with respect to a surface 165 of the R-PVH layer 155, and the Bragg planes 164 may form an angle (e.g., an acute angle) with the surface 165. The x-y-z coordinate system shown in FIG. 1A refers to a global coordinate system for the R-PVH element 100, whereas an x'-y'-z' coordinate system shown in FIG. 1A refers to a local coordinate system for the helical structure 167. FIG. 1A shows that the Bragg planes 164 are within an x'-y' plane, the helical axis 168 is extending in a z'-axis direction, and the Bragg planes 164 are perpendicular to the helical axis 168.

In each helical structure 167, the LC molecules 112 may continuously rotate around the helical axis 168 in a predetermined rotation direction, and azimuthal angles of the LC molecules 162 may exhibit a continuous periodic variation along the helical axis 168. An azimuthal angle of the LC molecule 112 may be defined as an angle of the LC director with respect to a predetermined in-plane direction within the Bragg planes 164, e.g., an x'-axis direction in FIG. 1A. The azimuthal angle of the LC molecule 112 may have a value within the range from 0° to 360° (including 0° and 360°). A helical pitch $P_h$ of the helical structure 167 may be defined as a distance along the helical axis 168 over which the azimuthal angles of the LC molecules 112 vary by 360°.

Over the single helical pitch $P_h$ of the helical structure 167, the azimuthal angle Y of the LC molecule 112 may be linearly proportional to a distance from a starting point of the single helical pitch $P_h$ (e.g., where an azimuthal angle ϕ=0) to a local point at which the LC molecule 112 is located along the helical axis 168. For discussion purposes, over the single helical pitch $P_h$ of the helical structure 167, the distance from the starting point to a local point at which the LC molecule 112 is located along the helical axis 168 may be referred to as an out-of-plane axis distance of the LC molecule 112. For example, over the single helical pitch $P_h$ of the helical structure 117, the azimuthal angle ϕ of the LC molecule 112 may vary linearly with respect to an out-of-plane axis distance z' of the LC molecules 112, according to a linear function $$\varphi(z') = 180° * \frac{z'}{P_B},$$

where $P_B$ is the Bragg period (that is half of the helical pitch $P_h$ in FIG. 1A). When the out-of-plane axis distances z of the LC molecules 112 are 0, 0.25*$P_B$, 0.5*$P_B$, 0.75*$P_B$, $P_B$, 1.25*$P_B$, 1.5*$P_B$, 1.75*$P_B$, and 2*$P_B$, respectively, the azimuthal angles ϕ of the LC molecules 112 may be 0°, 45°, 90°, 135°, 180°, 225°, 270°, 315°, and 360°, respectively.

In addition, the LC molecules 112 located in close proximity to the surface 165 may have a non-uniform in-plane orientation pattern with an in-plane pitch $P_{in}$, in which the directors of the LC molecules 112 may rotate in a predetermined in-plane direction (or in-plane axis) 188 within the surface 165. Thus, the azimuthal angle of the LC molecules 112 located in close proximity to the surface 165 may vary in the predetermined in-plane direction 188. The azimuthal angle of the LC molecules 112 located in close proximity to the surface 165 of the R-PVH layer 155 may be defined as an angle of the LC director with respect to the predetermined in-plane direction 188 within the surface 165, e.g., the x-axis direction shown in FIG. 1A. The in-plane pitch $P_{in}$ may be defined as a distance along the predetermined in-plane direction 188 over which the azimuthal angles of the LC molecules 112 located in close proximity to the surface 165 vary by 180°. For discussion purposes, FIG. 1A shows that the azimuthal angle of the LC molecules 112 may vary periodically in the predetermined in-plane direction 188 with a constant in-plane pitch $P_{in}$.

Over a single in-plane pitch $P_{in}$ of the in-plane orientation pattern, the LC molecules 112 located in close proximity to the surface 165 may also have a linear azimuthal angle variation along the predetermined in-plane direction 188. For example, the azimuthal angle of the LC molecule 112 may be linearly proportional to a distance from a starting point of the in-plane pitch $P_{in}$ (e.g., where an azimuthal angle ϕ=0°) to a local point at which the LC molecule 112 is located along the predetermined in-plane direction 188. For discussion purposes, over the single in-plane pitch $P_{in}$ of the in-plane orientation pattern, the distance from the starting point to a local point at which the LC molecule 112 is located along the predetermined in-plane direction 188 may be referred to as an in-plane axis distance of the LC molecule 112. For example, over the single helical pitch $P_h$ of the helical structure 167, the azimuthal angle ϕ of the LC molecule 112 may vary according to the function $$\varphi(x) = 180° * \frac{x}{P_{in}},$$

where x is an in-plane axis distance of the LC molecules 112, and $P_{in}$ is the in-plane pitch of the in-plane orientation pattern. When the in-plane axis distances x of the LC molecules 112 located in close proximity to the surface 165 are 0, 0.25*$P_{in}$, 0.5*$P_{in}$, 0.75*$P_{in}$, and $P_{in}$, respectively, the azimuthal angles ϕ of the LC molecules 112 may be 0°, 45°, 90°, 135°, 180°, respectively.

Figure 1B:
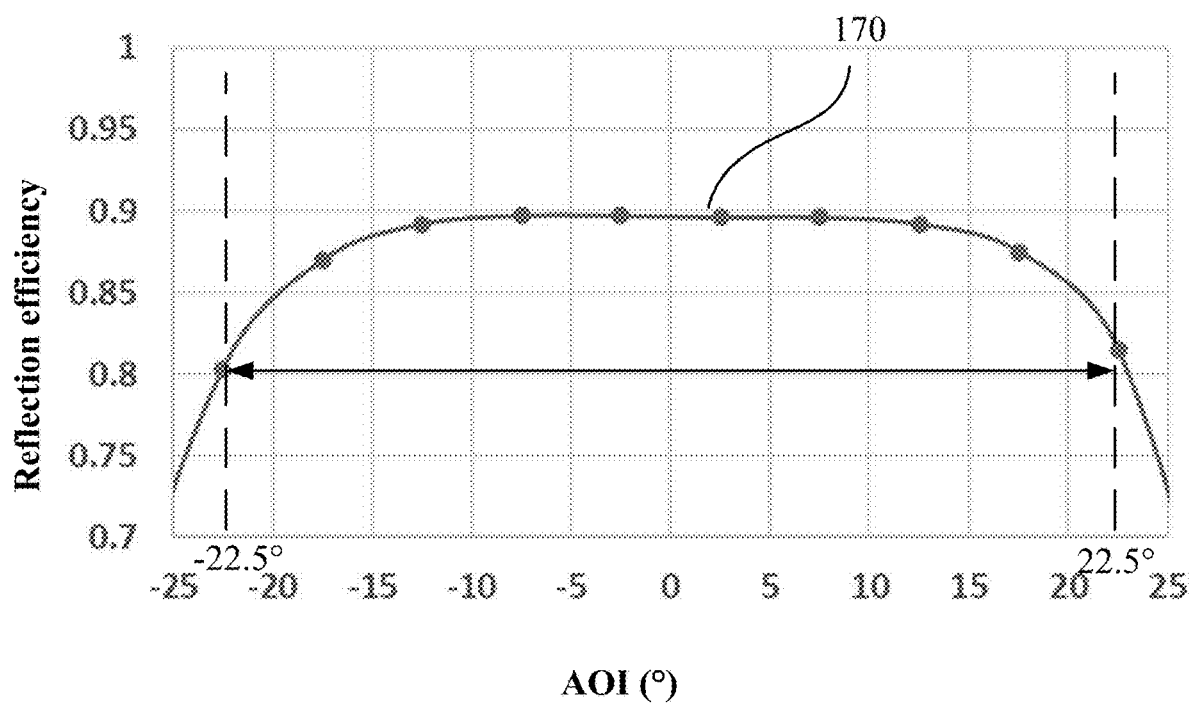
FIG. 1B illustrates simulation results showing a relationship between a diffraction efficiency and an angle of incidence ("AOI") of an incident light of the conventional R-PVH element shown in FIG. 1A.

The R-PVH element 100 may substantially reflect, via backward diffraction, a circularly polarized light having a predetermined handedness, and substantially transmit, with zero or negligible diffraction, a circularly polarized light having a handedness that is opposite to the predetermined handedness. FIG. 1B illustrates simulation results showing a relationship between a normalized diffraction efficiency of the conventional R-PVH element 100 shown in FIG. 1A and an angle of incidence ("AOI") of an incident light. As the conventional R-PVH element 100 reflects a light via backward diffraction, FIG. 1B shows the normalized diffraction efficiency as a normalized reflection efficiency for discussion purposes. A curve 170 shows the relationship. The curve 170 may also be referred to as a diffraction efficiency versus AOI curve. In the simulation, over the single helical pitch $P_h$ of the conventional R-PVH element 100, the azimuthal angle $\phi$ of the LC molecule 112 vary linearly with respect to the out-of-plane axis distance z' of the LC molecules 112, according to the function $$\varphi(z') = 180° * \frac{z'}{P_B},$$

where $P_B$=0.1565 μm. Over the single in-plane pitch $P_{in}$ of the conventional R-PVH element 100, the azimuthal angle $\phi$ of the LC molecule 112 located in close proximity to the surface 165 varies linearly with respect to the in-plane axis distance x of the LC molecules 112, according to a function $$\varphi(x) = 180° * \frac{x}{P_{in}},$$

where $P_{in}$=0.78 μm.

As shown in FIG. 1B, the horizontal axis represents angle of incidence ("AOI"), and the vertical axis represents a normalized diffraction efficiency. The curve 170 in FIG. 1B shows a relationship between the normalized diffraction efficiency (e.g., the normalized reflection efficiency) of the conventional R-PVH element 100 and the AOI of the incident light. Different AOIs correspond to a light coming to an eye of a user from different angles. The curve 170 shows that the conventional R-PVH element 100 may provide a high diffraction efficiency of about 90% when the AOI is within a range of from −10° to 10° (corresponding to an AOI range of 20°). As the AOI increases from 100 to about 250 (or from −10° to −25°), the reflection efficiency of the conventional R-PVH element 100 monotonically decreases from about 90% to about 73%. For an AOI range of 45° (from 22.5° to −22.5°), the reflection efficiency of the conventional R-PVH element 100 may vary in a range between about 90% and about 80%. When lights of the same intensity are incident onto the R-PVH element 100 at different angles of incidence, the diffracted lights output from the conventional R-PVH element 100 may have different light intensities, e.g., varying in a range between about 90% and about 80% of the incident light intensity.

Figure 1C:
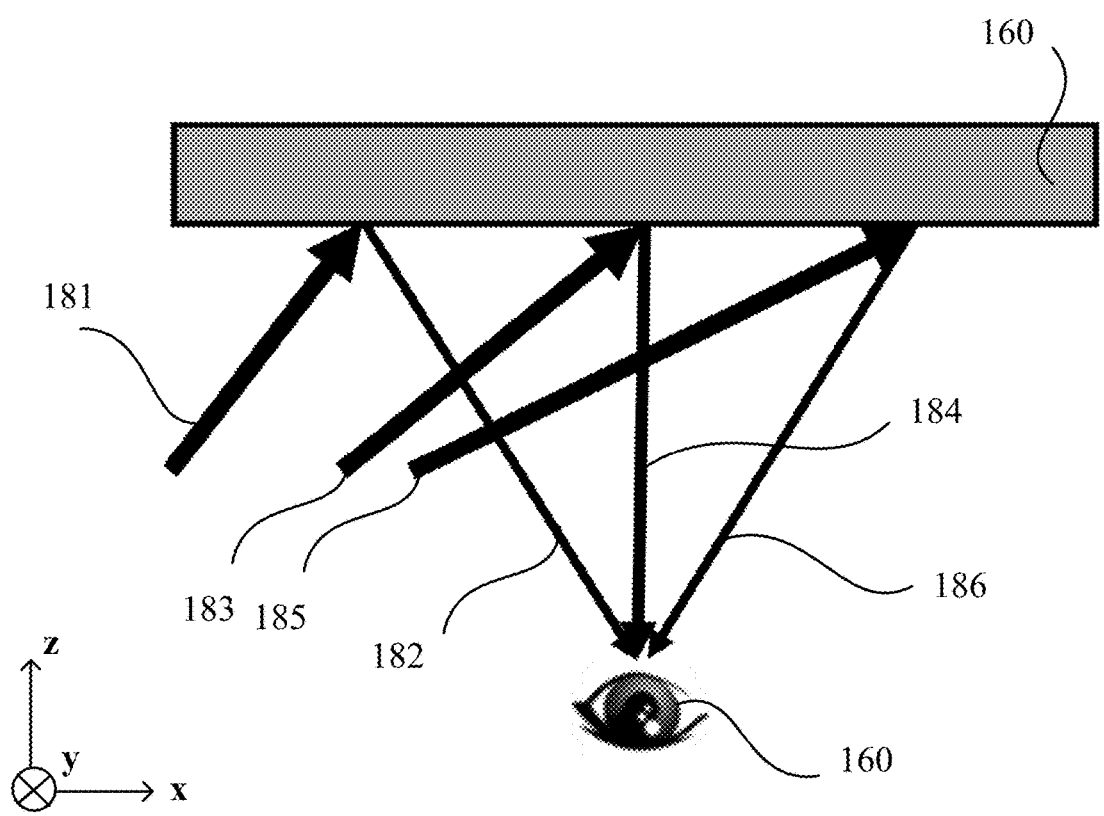
FIG. 1C illustrates diffracted lights perceived at different viewing angles of the conventional R-PVH shown in FIGS. 1A and 1B.

FIG. 1C illustrates diffracted lights perceived at different AOIs (or viewing angles, or field of view directions) of the conventional R-PVH element 100 shown in FIGS. 1A and 1B. As shown in FIG. 1C, the conventional R-PVH element 100 may reflect, via backward diffraction, lights 181, 183, and 185 having different angles of incidence as lights 182, 184, and 186 having different diffraction angles, respectively. The viewing angle (or field of view angle) may be defined the same as the diffraction (or reflection) angle, or may be defined as the complementary angle of the diffraction (or reflection) angle. For discussion purposes, the angles of incidence of the lights 181, 183, and 185 are presumed to be within the AOI range of 450 (from 22.5° to −22.5°). According to FIG. 1B, over the AOI range of 45°, the reflection efficiency provided by the conventional R-PVH element 100 to the incident lights 181, 183, and 185 varies between about 90% and about 80%. Thus, when the light intensities of the incident lights 181, 183, and 185 are the same, due to the reflection efficiency variation with respect to the AOI, the light intensities of the diffracted lights 182, 184, and 186 output from the conventional R-PVH element 100 may be different, e.g., varying in a range between about 90% and about 80% of the input light intensity. In other words, the brightness perceived at different FOV directions of the R-PVH element 100 is angularly dependent on the AOI.

Thus, when the light intensities of the incident lights 181, 183, and 185 are the same, the angular distribution of the brightness (or illuminance) at the output side of the R-PVH element 100 may be non-uniform over a field of view ("FOV") of the R-PVH element 100 associated with the predetermined AOI range (e.g. a 450 range from 22.5° to −22.5°). Especially, when the AOI is larger than 100 (or −10°), the 10% reduction in the reflection efficiency (from 90% to 80%) as the AOI changes from 100 to 22.5° (or from −10° to −22.5°) may cause a significant reduction in the brightness. The angular brightness variation or an angular illuminance variation may significantly degrade the optical performance of the R-PVH element 100.

When the brightness varies with respect to the AOI of the incident lights, the level of uniformity of the angular distribution of the brightness is referred to as an angular uniformity for the convenience of description. The angular uniformity provided by the conventional R-PVH element 100 over a predetermined FOV (e.g., 45°) (which corresponds to the AOI range of 45°), may be evaluated by a uniformity indicator U. The uniformity indicator U may be defined as: $U=(I_{max}-I_{min})/I_{avg}$, where $I_{max}$ is the maximum intensity, and $I_{min}$ is the minimum intensity, and $I_{avg}$ is the average intensity within the FOV (or within the AOI range). That is, the level of uniformity of the angular distribution of the brightness may be $\phi$ is the azimuthal uantified by a ratio defined by dividing a difference between a maximum diffracted light intensity and a minimum diffracted light intensity by an average diffracted light intensity over the predetermined FOV.

When the intensities of the incident lights of different AOIs are the same, the output intensities (or brightness) are directly proportional to the diffraction efficiencies of the R-PVH element 100 at different AOIs. Thus, the uniformity indicator U may be calculated as $U=(R_{max}-R_{min})/R_{avg}$, where $R_{max}$ is the maximum diffraction efficiency over the predetermined FOV (i.e., for the predetermined AOI range), $R_{min}$ is the minimum diffraction efficiency corresponding over the predetermined FOV (or AOI range), and $R_{avg}$ is the average diffraction efficiency over the predetermined FOV (or AOI range). In other words, the angular uniformity over the predetermined FOV may be $\phi$ is the azimuthal uantified by a ratio defined by dividing a difference between a maximum diffraction efficiency and a minimum diffraction efficiency by an average diffraction efficiency over the predetermined FOV. A higher U indicates a greater non-uniformity in the output light intensities (or brightness), and a smaller U indicates a greater uniformity in the output light intensities (or brightness).

Referring to FIG. 1B, for the conventional R-PVH element 100, over the field of view from 22.5° to −22.5°, the uniformity indicator is calculated to be U=10.8%, which indicates that the angular distribution of the brightness at the output side of the R-PVH element 100 is $\phi$ is the azimuthal uite non-uniform. If the thickness of the conventional R-PVH element 100 further decreases, the uniformity indicator U of the conventional R-PVH element 100 may further increase, which means that the angular distribution of the brightness becomes even more non-uniform. In the conventional technologies, due to the non-uniformity in the angular distribution of the brightness over the predetermined FOV, the conventional R-PVH element 100 may provide a poor visual effect to the user. The non-uniformity in the angular distribution of the brightness over the predetermined FOV of the conventional R-PVH element 100 is often uncontrolled.

In view of the limitations in conventional technologies, the present disclosure provides a liquid crystal polarization hologram ("LCPH") element configured with a nonlinear azimuthal angle variation. The disclosed LCPH element may be configured to provide an enhanced uniformity in the angular distribution of brightness (or illuminance) over a predetermined FOV of the LCPH element. In other words, the disclosed LCPH element may be configured to provide an enhanced angular brightness (or illuminance) uniformity over the predetermined FOV. The LCPH elements may include polarization volume hologram ("PVH") elements and cholesteric liquid crystal ("CLC") elements, etc. The LCPH elements may be fabricated based on various methods, such as holographic interference, direct writing, ink-jet printing, 3D printing, and various other forms of lithography. Thus, a "hologram" described herein is not limited to creation by holographic interference, or "holography."

Figure 2A:
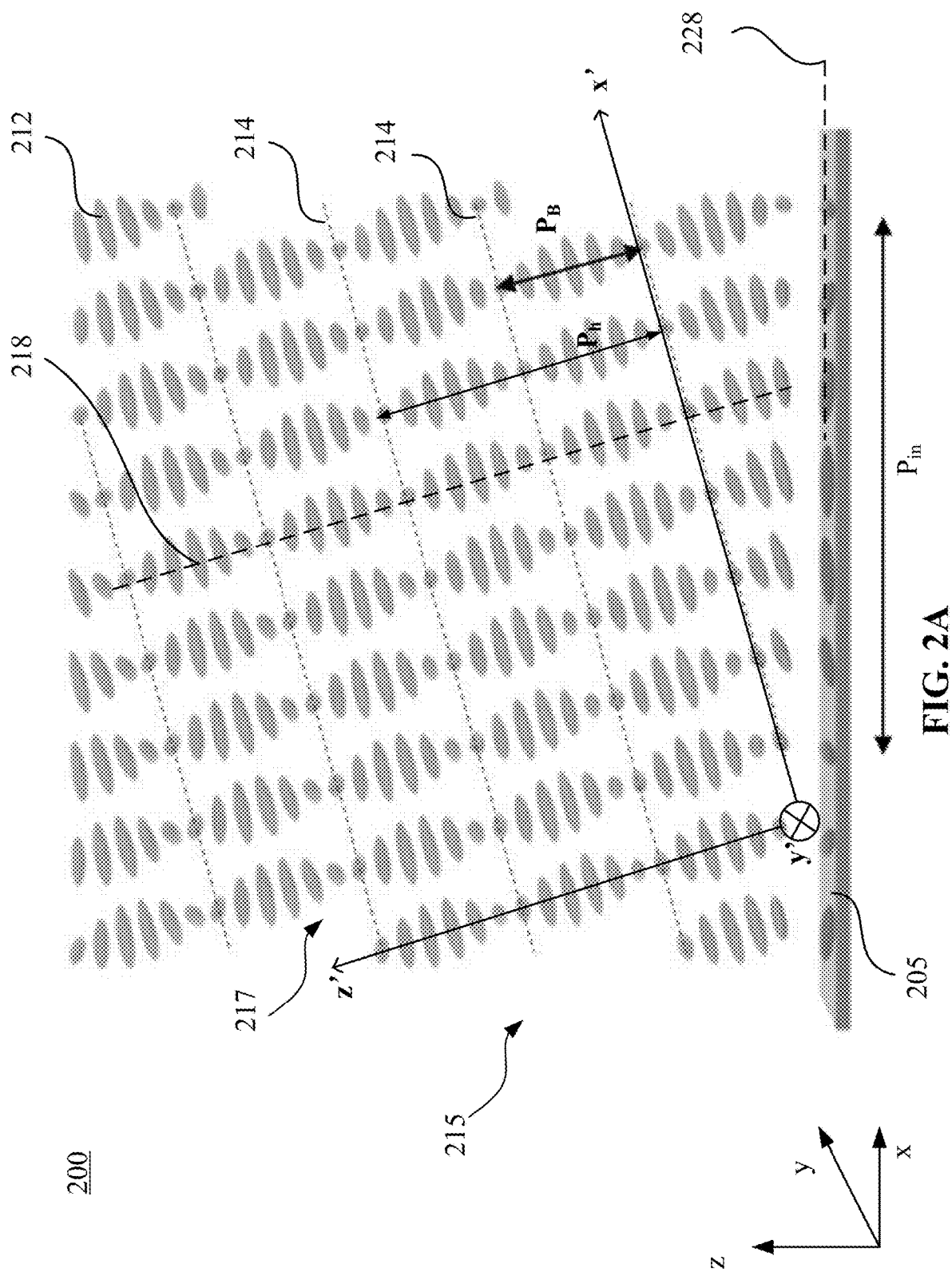
FIGS. 2A and 2B illustrate schematic diagrams of a liquid crystal polarization hologram ("LCPH") element, according to an embodiment of the present disclosure.
Figure 2B:
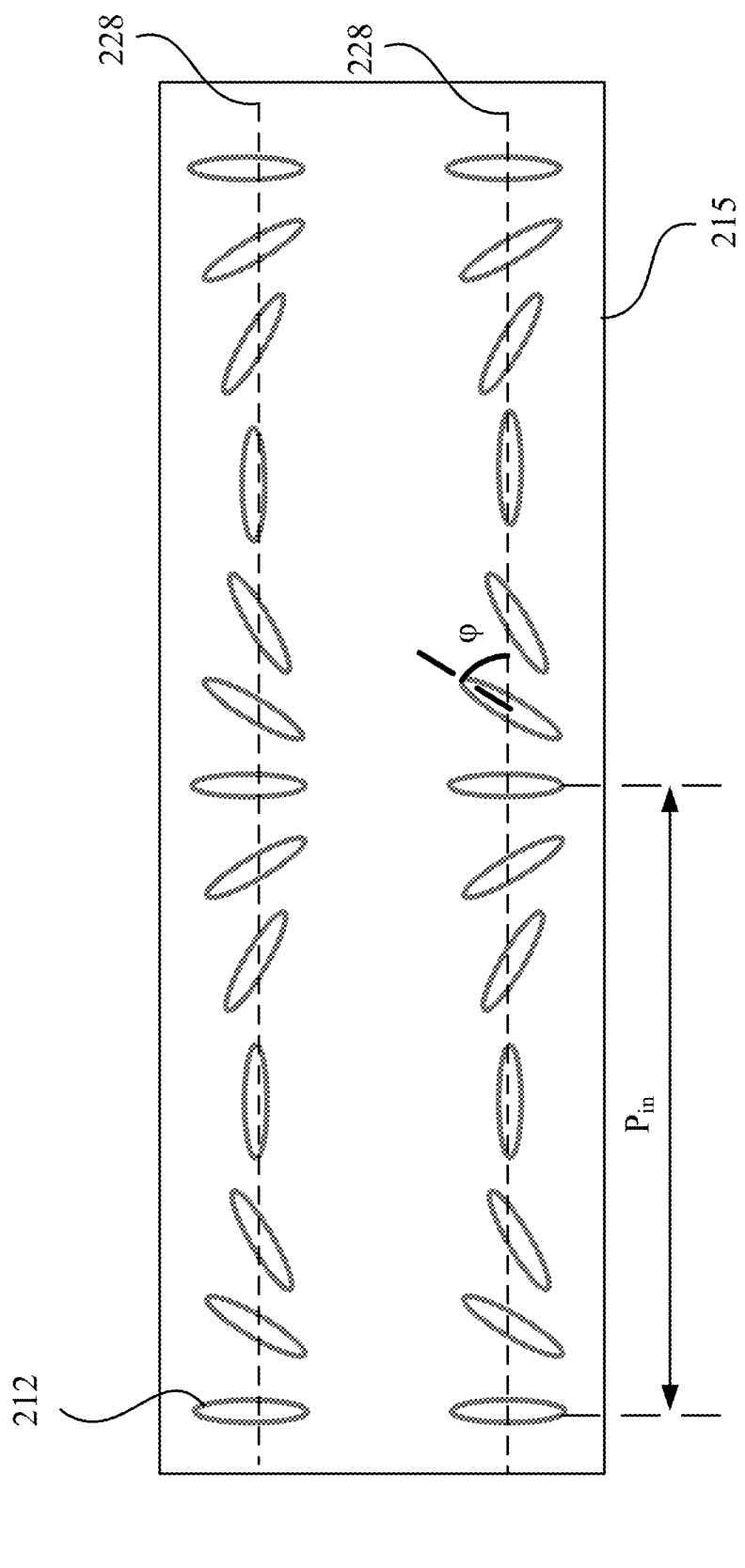

FIG. 2A illustrates a 3D view of an LCPH element 200, according to an embodiment of the present disclosure. FIG. 2B illustrates an x-y sectional view of the LCPH element 200 shown in FIG. 2A, according to an embodiment of the present disclosure. The LCPH element 200 may be a reflective polarization volume hologram ("R-PVH") element or a transmissive polarization volume hologram ("T-PVH") element. The LCPH element 200 may be configured to substantially diffract a circularly polarized light having a predetermined handedness, and substantially transmit, with zero or negligible diffraction, a circularly polarized light having a handedness that is opposite to the predetermined handedness. The LCPH element 200 may be configured to provide an enhanced angular brightness (or illuminance) uniformity over an FOV at the output side of the LCPH element 200.

As shown FIG. 2A, the LCPH element 200 may include an optically anisotropic film 215, which may be a thin layer of a birefringent material with intrinsic or induced (e.g., photo-induced) optical anisotropy, such as liquid crystals, liquid crystal polymers, or amorphous polymers, etc. In some embodiments, the birefringent material may include nematic LCs, twist-bend LCs, chiral nematic LCs, smectic LCs, ferroelectric LCs, or any combination thereof. In some embodiments, the birefringent material may have an induced chirality, e.g., the birefringent material may be doped with a chiral dopant. In some embodiments, the birefringent material may have an intrinsic molecular chirality, e.g., birefringent material may include chiral LC molecules, or molecules having one or more chiral functional groups. The LCPH element 200 may be an active element or a passive element.

The optically anisotropic film 215 may include optically anisotropic molecules 212. An optic axis of the optically anisotropic film 215 may be configured with a 3D orientational pattern to provide a polarization selective optical response. The orientation of the optic axis of the optically anisotropic film 215 may be determined by local orientations of the elongated optically anisotropic molecules 212 or the elongated molecular units (e.g., small molecules or fragments of polymeric molecules) included in the optically anisotropic molecules 212. For discussion purposes, elongated optically anisotropic molecules (e.g., rod-like LC molecules, also referred to as 212 for discussion purposes) are used as examples for describing the 3D orientational pattern of the optic axis of the optically anisotropic film 215. For discussion purposes, in the embodiment shown in FIG. 2A, an R-PVH element is used as an example of the LCPH element 200 (also referred to as an R-PVH element 200 for discussion purposes). When an R-PVH element is used as an example of the LCPH element 200, the optically anisotropic film 215 included in the LCPH element 200 may also be referred to as an R-PVH layer 215.

In the present disclosure, the R-PVH element 200 may be configured to have nonlinear azimuthal angle variations of the LC molecules 212 along predetermined in-plane axis within a surface 205 of the R-PVH layer 215. As shown in FIGS. 2A and 2B, the LC molecules 212 located in close proximity to the surface 205 (e.g., within an x-y plane) of the R-PVH layer 215 may be configured to have a non-uniform in-plane orientation pattern with an in-plane pitch (or a horizontal pitch) $P_{in}$. The directors of the LC molecules 212 located in close proximity to the surface 205 may periodically or non-periodically rotate along at least one in-plane direction (or in-plane axis) 228 within the surface 205, as shown in FIG. 2B. Thus, the azimuthal angle of the LC molecules 212 located in close proximity to the surface 205 may vary periodically or non-periodically along the at least one in-plane direction 228. The azimuthal angle of the LC molecules 212 located in close proximity to the surface 205 of the R-PVH layer 215 may be defined as an angle of the LC director with respect to the predetermined in-plane direction 228 within the surface 205, e.g., an x-axis direction shown in FIG. 2A. The orientations of LC directors at the azimuthal angle of p and the azimuthal angle of $\phi=+180°$) may be equivalent, e.g., the orientations of LC directors at the azimuthal angle of 0° and the azimuthal angle of 180° may be equivalent, the orientations of LC directors at the azimuthal angle of 45° and the azimuthal angle of 2250 may be equivalent, the orientations of LC directors at the azimuthal angle of 90° and the azimuthal angle of 270° may be equivalent, and the orientations of LC directors at the azimuthal angle of 1350 and the azimuthal angle of 315° may be equivalent.

The in-plane pitch $P_{in}$ may be defined as a distance along the predetermined in-plane direction 228 over which the azimuthal angles of the LC molecules 212 located in close proximity to the surface 205 vary by 180°. The in-plane pitch $P_{in}$ may be a constant in-plane pitch or a varying in-plane pitch. For discussion purpose, the in-plane pitch $P_{in}$ of the non-uniform in-plane orientation pattern of the LC molecules 212 located in close proximity to the surface 205 may also be referred to as an in-plane pitch $P_{in}$ of the R-PVH element 200 or the R-PVH layer 215.

The predetermined in-plane direction 228 within the surface 205 may be an in-plane linear direction, an in-plane radial direction, an in-plane circumferential (e.g., azimuthal) direction, or a combination thereof. For example, in some embodiments, the R-PVH layer 215 may be coupled with an alignment structure (not shown) at the surface 205, and the alignment structure may at least partially align the LC molecules 212 located in close proximity to the surface 205 to have the non-uniform in-plane orientation pattern. The alignment structure may include a polyimide layer, a photo-alignment material ("PAM") layer, a plurality of nanostructures or microstructures, an alignment network, or any combination thereof.

For discussion purposes, FIGS. 2A and 2B show that the LC molecules 212 located in close proximity to the surface 205 rotate periodically in the predetermined in-plane direction 228 (e.g., the x-axis direction shown in FIGS. 2A and 2B) with a constant in-plane pitch $P_{in}$. Such a non-uniform in-plane orientation pattern may be referred to as a periodic in-plane orientation pattern. In some embodiments, the LC molecules 212 located in close proximity to the surface 205 may be configured with another suitable non-uniform in-plane orientation pattern, such as a lens pattern (e.g., a spherical lens pattern, a cylindrical lens pattern, an off-axis lens pattern, or a freeform lens pattern, etc.), or a lens array pattern, etc.

In some embodiments, over a single in-plane pitch $P_{in}$ of the in-plane orientation pattern, the LC molecules 212 located in close proximity to the surface 205 may be configured to have a nonlinear azimuthal angle variation along the predetermined in-plane direction 228. For discussion purposes, over the single in-plane pitch $P_{in}$, a starting (or reference) point of the 1800 variation of the azimuthal angle along the predetermined in-plane direction 228 may be defined as a point where the azimuthal angle of the LC molecule 212 is 0°. In some embodiments, over the single in-plane pitch $P_{in}$ of the in-plane orientation pattern, the azimuthal angle of the LC molecule 212 may be configured to vary nonlinearly with respect to a distance from the starting point (e.g., where the azimuthal angle is 0°) to a local point at which the LC molecule 212 is located along the predetermined in-plane direction 228. For discussion purposes, the distance from the starting point (e.g., where the azimuthal angle is 0°) to a local point at which the LC molecule 212 is located along the predetermined in-plane direction 228 may be referred to as an in-plane axis distance of the LC molecule 212.

In some embodiments, over the single in-plane pitch $P_{in}$ of the in-plane orientation pattern, the azimuthal angle of the LC molecule 212 located in close proximity to the surface 205 may vary according to a function $$\varphi(x) = 180° * \frac{x}{P_{in}} + f\left(A, \frac{x}{P_{in}}\right),$$

where φ is the azimuthal angle (unit: degree) of the LC molecule 212, x is an in-plane axis distance (unit: μm) of the LC molecule 212, and $P_{in}$ is the in-plane pitch (unit: μm), which may be a constant value (with respect to x). The term $$180° * \frac{x}{P_{in}}$$

is a linear function of x, meaning that this portion of the azimuthal angle changes with the in-plane axis distance x with a rate (or slope) of $180°/P_{in}$. The term $$f\left(A, \frac{x}{P_{in}}\right)$$

is a nonlinear function of the in-plane axis distance x, in which A is an amplitude parameter (which may be referred to as "amplitude" for simplicity of discussion) associated with the amplitude of the azimuthal angle variation introduced by the nonlinear function. Thus, the nonlinear azimuthal angle variation with respect to the in-plane axis distance x is a combination of a linear variation and a nonlinear variation. Here the term "amplitude parameter" or "amplitude" is merely a term used for convenience of differentiating the parameter A from other parameters.

In some embodiments, the amplitude A of the nonlinear function may be a constant value with respect to the in-plane axis distance x. For example, the amplitude A may be configured as a constant positive value that is greater than 0° and smaller than or equal to 360°. The selection of the amplitude A may be based on specific application needs. The nonlinear term $$f\left(A, \frac{x}{P_{in}}\right)$$

may be any suitable nonlinear function, such as a φ is the azimuthal uadratic function, a polynomial function, a rational function, an exponential function, a logarithmic function, a trigonometric function, or a combination thereof. For example, in some embodiments, over the single in-plane pitch $P_{in}$ of the LCPH element 200, the azimuthal angle of the LC molecule 212 located in close proximity to the surface 205 may be configured to vary nonlinearly with respect to the in-plane axis distance x according to a function of:

$$\varphi(x) = 180° * \frac{x}{P_{in}} + A * \mathrm{Sin}\left(360° * \frac{x}{P_{in}}\right),$$

where $$A * \mathrm{Sin}\left(360° * \frac{x}{P_{in}}\right)$$

is an example of the nonlinear function $$f\left(A, \frac{x}{P_{in}}\right).$$

Referring back to FIG. 2A, when the LCPH element 200 is an R-PVH element, within the volume of the R-PVH layer 215, the LC molecules 212 may be arranged in a plurality of helical structures 217 and a plurality of series of Bragg planes 214. The x-y-z coordinate system shown in FIG. 2A refers to a global coordinate system for the LCPH element 200, whereas an x'-y'-z' coordinate system shown in FIG. 2A refers to a local coordinate system for the helical structure 217. For discussion purposes, FIG. 2A shows that the Bragg planes 214 are within an x'-y' plane, the helical axis 218 is along a z'-axis direction, and the Bragg planes 214 are substantially perpendicular to the helical axis 218.

In some embodiments, a helical axis 218 of the helical structure 217 may be tilted with respect to the surface 205 of the R-PVH layer 215 (or with respect to the thickness direction of the R-PVH layer 215). The helical axis 218 may form an acute angle that is less than 45° with respect to the normal of the surface 205 or the thickness direction of the R-PVH layer 215 (e.g., a z-axis direction). In the helical structure 217, the directors of the LC molecules 212 may continuously rotate around the helical axis 218 in a predetermined rotation direction, e.g., clockwise direction or counter-clockwise direction. Accordingly, the helical structure 217 may exhibit a handedness, e.g., right handedness or left handedness.

The LC molecules 212 having a first same orientation (e.g., same first tilt angle and same first azimuthal angle)

may form a first series of slanted and parallel refractive index planes (i.e., a first series of Bragg planes) 214 periodically distributed within the volume of the R-PVH layer 215. Although not labeled, the LC molecules 212 having a second same orientation (e.g., same second tilt angle and same second azimuthal angle) different from the first same orientation may form a second series of slanted and parallel refractive index planes (i.e., a second series of Bragg planes) 214 periodically distributed within the volume of the R-PVH layer 215. Different series of Bragg planes may be formed by the LC molecules 212 having different orientations. In the same series of Bragg planes, the LC molecules 212 may have the same orientation, and the refractive index may be the same. Different series of Bragg planes may correspond to different refractive indices. When the number of the Bragg planes (or the thickness of the R-PVH layer 215) increases to a sufficient value, Bragg diffraction may be established according to the principles of volume gratings. The distance between adjacent Bragg planes 214 of the same series may be referred to as a Bragg period $P_B$. In the embodiment shown in FIG. 2A, the Bragg planes 214 may form an acute angle with respect to the surface 205 of the R-PVH layer 215.

As the directors of the LC molecules 212 continuously rotate around the helical axis 218 in the predetermined rotation direction, the azimuthal angles of the LC molecules 212 within the volume of the R-PVH layer 215 may exhibit a continuous periodic variation along the helical axis 218. The azimuthal angle of the LC molecule 212 located within the volume of the R-PVH layer 215 may be defined as an angle of the LC director with respect to a predetermined in-plane direction within the Bragg plane 214, e.g., an x'-axis in FIG. 2A. A helical pitch $P_h$ of the helical structures 217 may be defined as a distance along the helical axis 218 over which the orientation of the LC directors rotate by 3600 or the azimuthal angle of the LC molecules 212 vary by 360°. The helical pitch $P_h$ is presumed to be constant across the R-PVH layer 215.

In some embodiments, the LCPH element 200 may be configured to have linear azimuthal angle variations of the LC molecules 212 along the helical axis 218 within the volume of the R-PVH layer 215. In some embodiments, the LCPH element 200 may be configured to have nonlinear azimuthal angle variations of the LC molecules 212 along the helical axis 218 within the volume of the R-PVH layer 215. For example, over the single helical pitch $P_h$ of the helical structure 217, the LC molecules 212 located within the volume of the R-PVH layer 215 may be configured to have a nonlinear azimuthal angle variation along the helical axis 218. For discussion purposes, a local point at the helical axis 218 where the azimuthal angle of the LC molecule 212 is 0° may be defined as a starting point of the 3600 variation of azimuthal angle along the helical axis 218. Over the single helical pitch $P_h$ of the helical structure 217, the azimuthal angle of the LC molecule 212 may be configured to vary nonlinearly with respect to a distance from the starting point (e.g., where the azimuthal angle is 0°) to a local point at which the LC molecule 212 is located along the helical axis 218. For discussion purposes, over the single helical pitch $P_h$ of the helical structure 217, the distance from the starting point (e.g., where the azimuthal angle is 0°) to a local point at which the LC molecule 212 is located along the helical axis 218 may be referred to as an out-of-plane axis distance of the LC molecule 212.

In some embodiments, over the single helical pitch $P_h$ of the helical structure 217, the azimuthal angle of the LC molecule 212 may vary according to a function $$\varphi(z') = 180° * \frac{z'}{P_B} + f\left(A, \frac{z'}{P_B}\right),$$

where $\varphi$ is the azimuthal angle of the LC molecule 212 located along the helical axis 218, z' is an out-of-plane axis distance of the LC molecule 112, and $P_B$ is the Bragg period. The term $$180° * \frac{z'}{P_B}$$

is a linear function of the out-of-plane axis distance z', the term $$f\left(A, \frac{z'}{P_B}\right)$$

is a nonlinear function of the out-of-plane axis distance z', and A is an amplitude parameter of the nonlinear function associated with the amplitude of the azimuthal angle variation introduced by the nonlinear function. Thus, the nonlinear azimuthal angle variation with respect to the out-of-plane axis distance z' is a combination of a linear variation and a nonlinear variation.

In some embodiments, the amplitude parameter A of the nonlinear function may be a constant value with respect to the out-of-plane axis distance z'. For example, the amplitude A may be configured as a constant positive value that is greater than 0° and smaller than or e$\varphi$ is the azimuthal ual to 360°. The selection of the amplitude A may be based on specific application needs. The nonlinear term $$f\left(A, \frac{z'}{P_B}\right)$$

may be any suitable nonlinear function, such as a $\varphi$ is the azimuthal uadratic function, a polynomial function, a rational function, an exponential function, a logarithmic function, a trigonometric function, or a combination thereof. For example, in some embodiments, over the single helical pitch $P_h$ of the helical structure 217, the azimuthal angle of the LC molecule 212 located along the helical axis 218 may be configured to vary nonlinearly with respect to the out-of-plane axis distance z' according to a function of:

$$\varphi(z') = 180° * \frac{z'}{P_B} + A * \text{Sin}\left(360° * \frac{z'}{P_B}\right),$$

$$A * \text{Sin}\left(360° * \frac{z'}{P_B}\right),$$

is an example of the nonlinear function $$f\left(A, \frac{z'}{P_B}\right).$$

In some embodiments, the amplitude parameter A of the nonlinear function associated with the non-linear azimuthal angle variation along the helical axis 218 may be the same as or different from the amplitude parameter A of the nonlinear function associated with the non-linear azimuthal angle variation along the in-plane direction 228. In some embodiments, when the azimuthal angles of the molecules disposed at or near the surface 205 along the in-plane direction 228 has a non-linear variation, the azimuthal angles of the molecules disposed along the helical axis 218 may have a linear variation or may have a non-linear variation. It is noted that although in the nonlinear functions the same symbol "A" is used for representing the amplitude parameter when describing the nonlinear azimuthal angle variations in the in-plane direction and the helical axis direction, the specific value of the amplitude parameter A may or may not be the same for the nonlinear azimuthal angle variations in the in-plane direction and the helical axis direction.

Figure 2C:
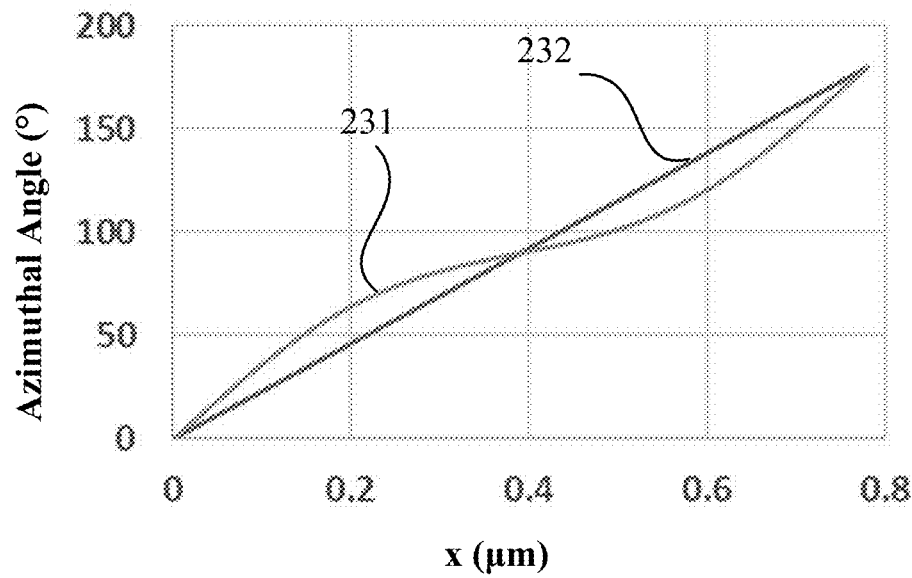
FIG. 2C illustrates simulation results showing a relationship between an azimuthal angle of optically anisotropic molecules and an in-plane axis distance over a single in-plane pitch, for both the conventional R-PVH element shown in FIG. 1A, and the LCPH element shown in FIG. 2A.

FIG. 2C illustrates simulation results showing a relationship between an azimuthal angle and an in-plane axis distance of the LC molecule over a single in-plane pitch, for both the conventional R-PVH element 100 shown in FIG. 1A, and the LCPH element 200 (an R-PVH element is used as an example) shown in FIG. 2A. As shown in FIG. 2C, the horizontal axis represents an in-plane axis distance x (unit: μm) of the LC molecule, and the vertical axis represents an azimuthal angle ϕ (unit: degrees) of the LC molecule. A straight line 232 shows the linear relationship between the azimuthal angle and the in-plane axis distance of the LC molecule 112 over a single in-plane pitch $P_{in}$ in the conventional R-PVH element 100 shown in FIG. 1A. A curved line 231 shows the nonlinear relationship between the azimuthal angle and the in-plane axis distance of the LC molecule 212 over a single in-plane pitch $P_{in}$ in the LCPH element 200 shown in FIG. 2A. In the simulations, over the single in-plane pitch $P_{in}$ of the LCPH element 200, the azimuthal angle ϕ of the LC molecule 212 located in close proximity to the surface 205 varies according to a function $$\varphi(x) = 180° * \frac{x}{P_{in}} + A * \mathrm{Sin}\!\left(360° * \frac{x}{P_{in}}\right)\!,$$

where $$180° * \frac{x}{P_{in}}$$

is a linear function of the in-plane axis distance x $$A * \mathrm{Sin}\!\left(360° * \frac{x}{P_{in}}\right)$$

is an example of the nonlinear function $$f\!\left(A, \frac{x}{P_{in}}\right)\!,$$

A=18°, and $P_{in}$=0.78 μm.

The curved line 231 shows a nonlinear relationship represented by the nonlinear function $$\varphi(x) = 180° * \frac{x}{P_{in}} + A * \mathrm{Sin}\!\left(360° * \frac{x}{P_{in}}\right)\!.$$

The straight line 232 shows a linear function of $$\varphi(x) = 180° * \frac{x}{P_{in}},$$

according to which the azimuthal angle in the conventional R-PVH element 100 shown in FIG. 1A is arranged. The straight line 232 has a constant slope of 180°/$P_{in}$, indicating that over a single helical pitch $P_h$ of the helical structures 117 formed in the conventional R-PVH element 100, the azimuthal angle ϕ of the LC molecules 112 linearly increases as the in-plane axis distance x of the LC molecules 112 increases. The curved line 231 is shown as a wavy line, which oscillates around the straight line 232, indicating that over the single in-plane pitch $P_{in}$ of the LCPH element 200, the azimuthal angle ϕ of the LC molecules 212 increases nonlinearly as the in-plane axis distance x of the LC molecules 212 increases. The amplitude of the oscillation around the straight line 232 may be controlled by selecting the amplitude A of the nonlinear term. The nonlinear azimuthal angle variation is a combined result of the linear term and the nonlinear term as indicated in the overall nonlinear function of $$\varphi(x) = 180° * \frac{x}{P_{in}} + A * \mathrm{Sin}\!\left(360° * \frac{x}{P_{in}}\right)\!.$$

Figure 2D:
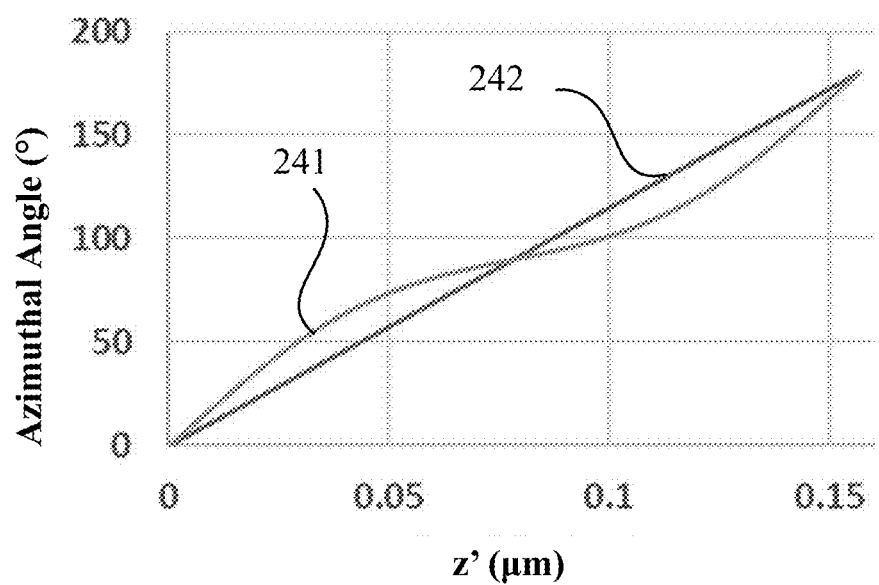
FIG. 2D illustrates simulation results showing a relationship between an azimuthal angle of LC molecule and an out-of-plane axis distance over a single Bragg period, for both a conventional R-PVH element shown in FIG. 1A, and the LCPH element shown in FIG. 2A.

FIG. 2D illustrates simulation results showing a relationship between an azimuthal angle and an out-of-plane axis distance over a single Bragg period $P_B$ (a distance over which the azimuthal angle varies by 180°) for both the conventional R-PVH element 100 shown in FIG. 1A, and the LCPH element 200 shown in FIG. 2A. As shown in FIG. 2D, the horizontal axis represents an out-of-plane axis distance z' (unit: μm) of the LC molecule, and the vertical axis represents an azimuthal angle ϕ (unit: degrees) of the LC molecule. A straight line 242 shows the linear relationship between the azimuthal angle and the out-of-plane axis distance of the LC molecule 112 over the single Bragg period $P_B$ for the conventional R-PVH element 100 shown in FIG. 1A, and a curved line 241 shows the nonlinear relationship between the azimuthal angle and the out-of-plane axis distance of the LC molecule 212 over the single Bragg period $P_B$ for the LCPH element 200 shown in FIG. 2A. In the simulations, over a single helical pitch $P_h$ (a distance over which the azimuthal angle ϕ varies by 360°) of the LCPH element 200, the azimuthal angle ϕ of the LC molecule 212 may vary according to a function $$\varphi(z') = 180° * \frac{z'}{P_B} + A * \mathrm{sin}\!\left(360° * \frac{z'}{P_B}\right)\!,$$

where $$180° * \frac{z'}{P_B}$$

is a linear function of the out-of-plane axis distance z'

$$A * \mathrm{Sin}\left(360° * \frac{z'}{P_B}\right)$$

is an example of the nonlinear function $$f\left(A, \frac{z'}{P_B}\right), A = 18°,$$

and $P_B$=0.1565 μm.

The curved line 241 in FIG. 2D shows the nonlinear relationship represented by the nonlinear function $$\varphi(z') = 180° * \frac{z'}{P_B} + A * \sin\left(360° * \frac{z'}{P_B}\right).$$

The straight line 242 shows a linear function $$\varphi(z') = 180° * \frac{z'}{P_B},$$

according to which the azimuthal angle in the conventional R-PVH element 100 shown in FIG. 1A is arranged. The straight line 242 has a constant slope of 180°/$P_B$, indicating that over a single Bragg period $P_B$ of the conventional R-PVH element 100, the azimuthal angle ϕ of the LC molecules increases linearly as the out-of-plane axis distance z' of the LC molecules 112 increases. The curved line 241 is shown as a wavy line, which oscillates around the straight line 242, indicating that over the single Bragg period $P_B$ of the disclosed LCPH element 200, the azimuthal angle ϕ of the LC molecules 212 increases nonlinearly as the out-of-plane axis distance z' of the LC molecules 212 increases. The amplitude of the oscillation around the straight line 242 may be controlled by selecting the amplitude A of the nonlinear term. The nonlinear azimuthal angle variation is a combined result of the linear term and the nonlinear term as indicated in the function of $$\varphi(z') = 180° * \frac{z'}{P_B} + A * \mathrm{Sin}\left(360° * \frac{z'}{P_B}\right).$$

FIG. 2E illustrates a table showing the simulated azimuthal angles ϕ of the LC molecules for different in-plane axis distances x (where x=0.25*$P_{in}$, 0.5*$P_{in}$, 0.75*$P_{in}$, $P_{in}$, 1.25*$P_{in}$, 1.5*$P_{in}$, 1.75*$P_{in}$, and 2*$P_{in}$), for both the LCPH element 200 shown in FIG. 2A when the amplitude A is of different non-zero values, and for the conventional R-PVH element 100 shown in FIG. 1A when the amplitude A is zero. For the LCPH element 200, the amplitudes A of the nonlinear term are selected as A=9°, 18°, and 36°. As shown in Table 1, over the single in-plane pitch $P_{in}$ of the LCPH element 200, the azimuthal angle ϕ of the LC molecules 212 increases nonlinearly as the in-plane axis distance x of the LC molecules 212 increases. The last column (marked as "A=0 (Linear)") of Table 1 shown in FIG. 2E also shows the calculated azimuthal angles ϕ of the LC molecules 112 for a series of in-plane axis distances x (x=0.25*$P_{in}$, 0.5*$P_{in}$, 0.75*$P_{in}$, and $P_{in}$), over the single in-plane pitch $P_{in}$ of the conventional R-PVH element 100 shown in FIG. 1A.

Figure 2F:
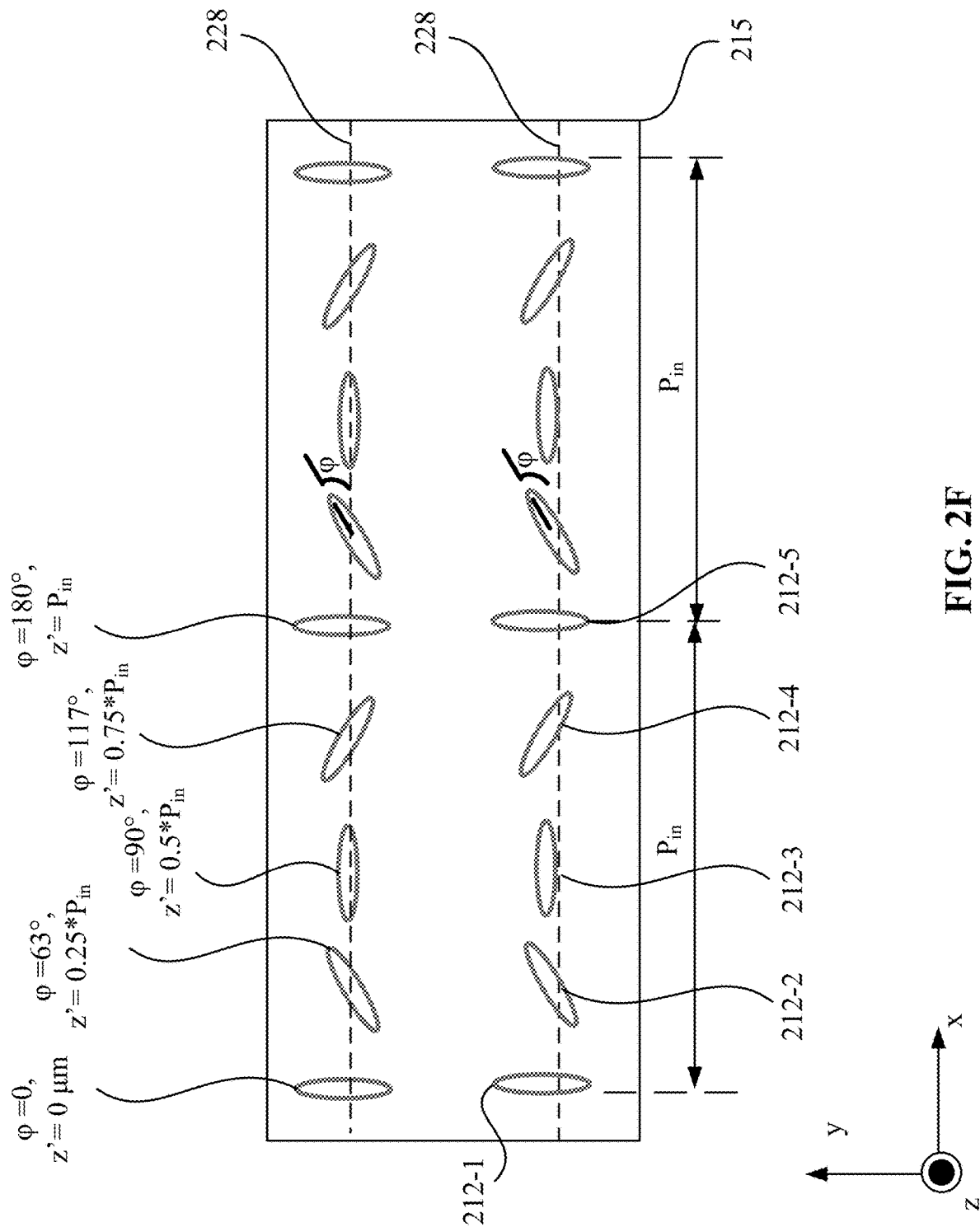
FIG. 2F illustrates a schematic diagram of a portion of the LCPH element shown in FIG. 2A, showing a nonlinear azimuthal angle variation of optically anisotropic molecules over a single in-plane pitch, according to an embodiment of the present disclosure.

FIG. 2F illustrates an x-y sectional view of a portion of the LCPH element 200 shown in FIG. 2A, showing a nonlinear azimuthal angle variation of the LC molecules 212 located in close proximity to the surface 205, over a single in-plane pitch $P_h$, when amplitude of the nonlinear function is selected as A=18°, according to an embodiment of the present disclosure. For example, over the single in-plane pitch $P_h$ of the LCPH element 200, five LC molecules 212-1 to 212-5 are eϕ is the azimuthal ually spaced from one another along the predetermined in-plane direction 228. The starting point of the 1800 variation of the azimuthal angle over the single in-plane pitch $P_h$ may be at the LC molecule 212-1 where the azimuthal angle ϕ is 0°. FIG. 2F shows that when the in-plane axis distances x of the LC molecules 212-2 to 212-5 are 0.25*$P_{in}$, 0.5*$P_{in}$, 0.75*$P_{in}$, and $P_{in}$, respectively, the corresponding azimuthal angles ϕ of the LC molecules 212-2 to 212-5 are 63°, 90°, 117°, and 180°, respectively.

FIG. 2G illustrates simulation results showing azimuthal angles of optically anisotropic molecules for a series of out-of-plane axis distances over a single helical pitch, for the LCPH element 200 shown in FIG. 2A when the amplitude of a nonlinear term is of different non-zero values, and for the conventional R-PVH element 100 shown in FIG. 1A where the amplitude is zero. Table 2 shows the simulated azimuthal angles ϕ of the LC molecules 212 at different out-of-plane axis distances z' changes: z'=0.25*$P_B$, 0.5*$P_B$, 0.75*$P_B$, $P_B$, 1.25*$P_B$, 1.5*$P_B$, 1.75*$P_B$, and 2*$P_B$, over a single helical pitch $P_h$ of the LCPH element 200. The amplitudes A of the nonlinear term are selected as A=9°, 18°, and 36°. As shown in Table 2, over the single helical pitch $P_h$ of the of the LCPH element 200, for any of the selected amplitude A, the azimuthal angle ϕ of the LC molecules 212 increases nonlinearly as the out-of-plane axis distance z' of the LC molecules 212 increases. The last column (marked as "A=0 (Linear)") of Table 2 shown in FIG. 2G also shows the calculated azimuthal angles ϕ of the LC molecules 112 at different out-of-plane axis distances z': z'=0.25*$P_B$, 0.5*$P_B$, 0.75*$P_B$, $P_B$, 1.25*$P_B$, 1.5*$P_B$, 1.75*$P_B$, 2*$P_B$, over the single helical pitch $P_h$ of the conventional R-PVH element 100 shown in FIG. 1A.

Figure 2H:
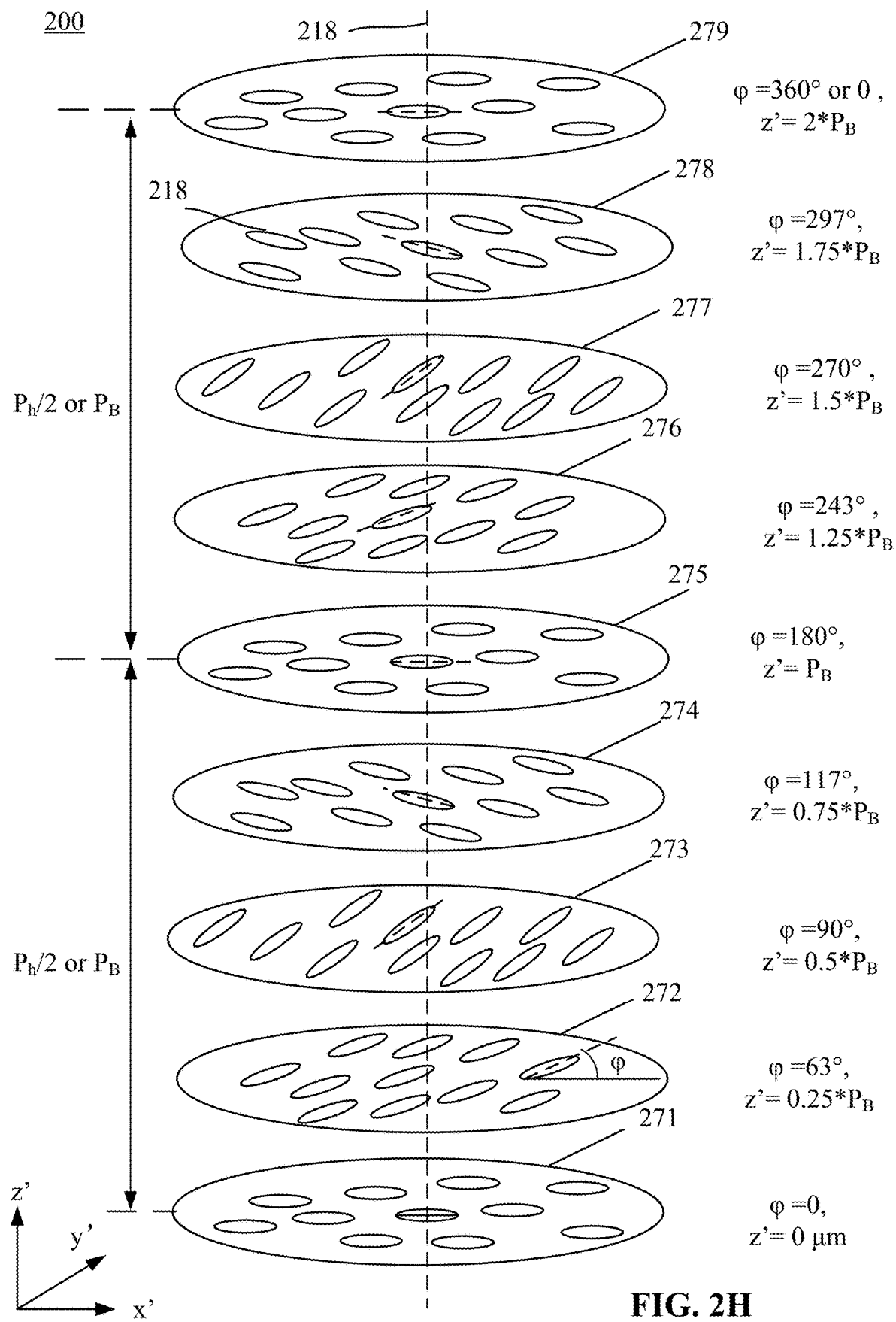
FIG. 2H illustrates a 3D exploded view of a portion of the LCPH element shown in FIG. 2A, showing a nonlinear azimuthal angle variation of optically anisotropic molecules over a single helical pitch, according to an embodiment of the present disclosure.

FIG. 2H illustrates a 3D exploded view of a portion of the LCPH element 200 shown in FIG. 2A, showing a nonlinear azimuthal angle variation of the LC molecules 212 over a single helical pitch $P_h$ when the amplitude of the nonlinear term is A=18°, according to an embodiment of the present disclosure. For illustrative purposes, FIG. 2G shows nine successive sub-layers (or Bragg planes) 271-279. The sub-layers are separated for better illustration purposes. In each sub-layer, the LC directors (represented by dashed lines) of the LC molecules 212 may be oriented in the same direction. In different sub-layers, the LC directors may be oriented in different directions. Over the single helical pitch $P_h$ of the helical structure 217, the starting point of the 360° variation of the azimuthal angle (which relates to the direction of the LC director) along the helical axis 218 may be at the sub-layer 271 where the azimuthal angle ϕ is 0°. FIG. 2G shows that when the out-of-plane axis distances z' of the sub-layers 272-279 are 0.25*$P_B$, 0.5*$P_B$, 0.75*$P_B$, $P_B$, 1.25*$P_B$, 1.5*$P_B$, 1.75*$P_B$, and 2*$P_B$, respectively, the corresponding azimuthal angles ϕ of the LC molecules 212 are 63°, 90°, 117°, 180°, 243°, 270°, 297°, and 360°, respectively.

Figure 3A:
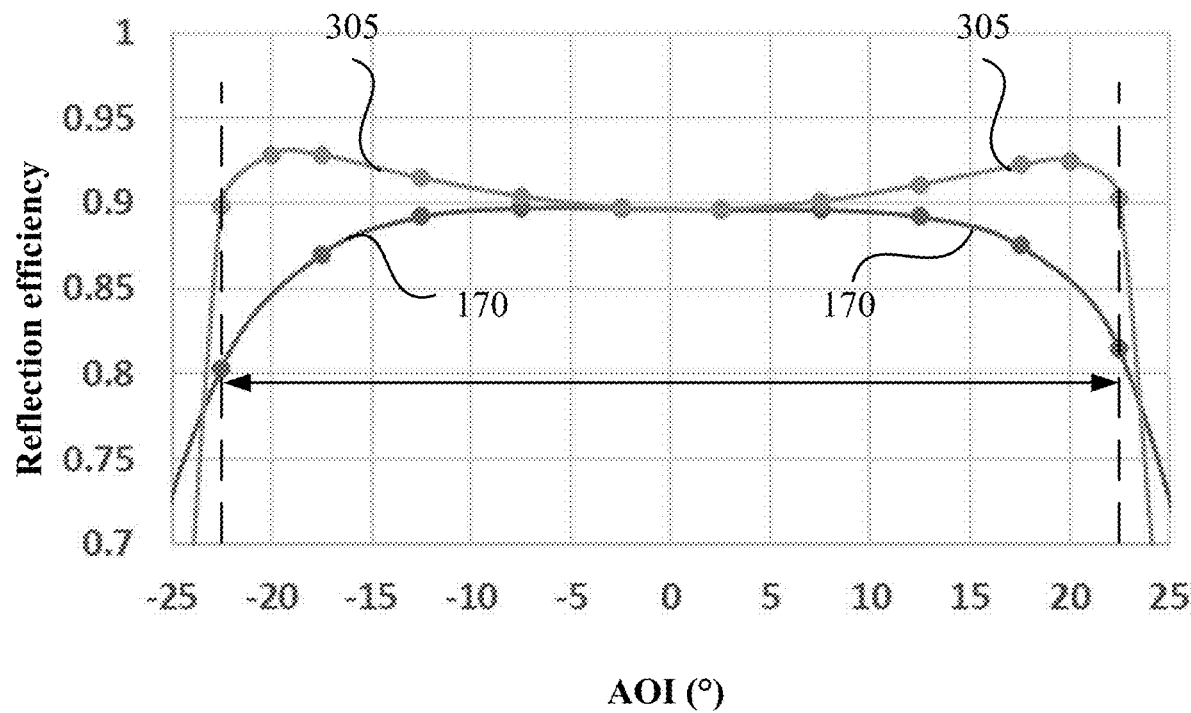
FIG. 3A illustrates simulation results showing a relationship between a diffraction efficiency and an angle of incidence ("AOI") of an incident light, for both the conventional R-PVH element shown in FIG. 1A, and the LCPH element shown in FIG. 2A.

By configuring the azimuthal angles of the LC molecules 212 to have a nonlinear variation in the LCPH element 200 shown in FIG. 2A, the diffraction efficiency versus AOI curve of the LCPH element 200 may be changed compared to the diffraction efficiency versus AOI curve of the conventional R-PVH element 100 shown in FIG. 1A. FIG. 3A illustrates simulation results showing a relationship between a diffraction efficiency and an angle of incidence ("AOI") of an incident light, for both the conventional R-PVH element shown in FIG. 1A, and the LCPH element shown in FIG. 2A. In FIG. 3A, the horizontal axis represents the AOI, and the vertical axis represents a normalized diffraction efficiency (e.g., a normalized reflection efficiency). The curve 170 (also shown in FIG. 1B) shows the relationship between the diffraction efficiency and the AOI for the conventional R-PVH element 100 shown in FIG. 1A, and a curve 305 shows the relationship between the diffraction efficiency and the AOI for the LCPH element 200 shown in FIG. 2A. In the simulations, over the single helical pitch $P_h$ of the LCPH element 200, the azimuthal angle ϕ of the LC molecule 212 located along the helical axis 218 varies nonlinearly with respect to the out-of-plane axis distance z' according to a function $$\varphi(z') = 180° * \frac{z'}{P_B} + A * \text{Sin}\left(360° * \frac{z'}{P_B}\right),$$

where A=18°, and $P_B$=0.1565 μm. Over the single in-plane pitch $P_{in}$ of the LCPH element 200, the azimuthal angle (p of the LC molecule 212 located in close proximity to the surface 205 varies nonlinearly with respect to the in-plane axis distance x according to a function $$\varphi(x) = 180° * \frac{x}{P_{in}} + A * \text{Sin}\left(360° * \frac{x}{P_{in}}\right),$$

where A=18°, and $P_{in}$=0.78 μm.

The curve 305 shows that the LCPH element 200 of the present disclosure provides a high diffraction efficiency of about 90% when the AOI is within a range of about −10° to about 100 (i.e., over an AOI range of 20°). The curve 305 also shows that as the AOI increases from 100 to 22.5° (or from −10° to −22.5°), the diffraction efficiency of the LCPH element 200 does not decrease, as in the curve 170, but slightly increases from about 90% to about 93% (at 20°) and falls back to about 90% (at 22.5°). Overall, the LCPH element 200 provides a diffraction efficiency of 90% or more over the entire AOI range of 450 (from −22.5° to 22.5°). The curve 305 shown in FIG. 3A is for a specific amplitude A. The amplitude A may be tuned to different values to produce curves that may be similar to the curve 305, which can provide a high diffraction efficiency of 90% or more over the entire AOI range. When the amplitude A is 0°, the curve 305 may become the curve 170, which is for the conventional R-PVH element 100, in which the azimuthal angles are linearly distributed.

In addition, the diffraction efficiency distribution over the AOI range as indicated by the curve 305 is more uniform than the diffraction efficiency distribution indicated by the curve 170. As described above, according to the curve 170, the uniformity indicator U is calculated to be 10.8% for the conventional R-PVH element 100 over the FOV from 22.5° to −22.5°. For the disclosed LCPH element 200, over the FOV from 22.5° to −22.5°, the uniformity indicator U is calculated to be about 3.6%, much less than the 10.8% for the conventional R-PVH element 100. As described above, smaller uniformity indicator U means greater angular uniformity. Accordingly, the LCPH element 200 may provide an enhanced angular uniformity for the brightness of diffracted lights over the entire FOV.

Figure 3B:
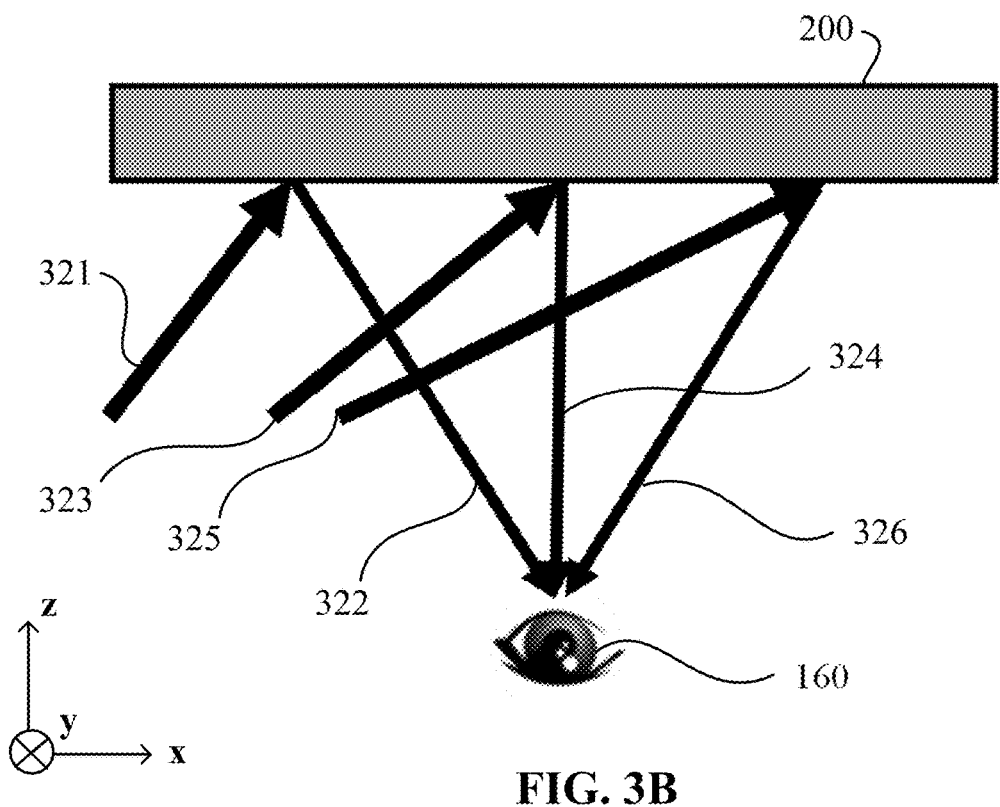
FIG. 3B illustrates diffracted lights perceived at different viewing angles of the LCPH element shown in FIG. 2A, according to an embodiment of the present disclosure.

FIG. 3B shows that diffracted lights perceived at different viewing angles of the LCPH element 200 have substantially the same light intensity, which indicates an enhanced angular uniformity at the output side of the LCPH element 200 over a predetermined FOV. As shown in FIG. 3B, the LCPH element 200 may reflect, via backward diffraction, lights 321, 323, and 325 having different angles of incidence as lights 322, 324, and 326 having different diffraction angles, respectively. It is presumed that the lights 321, 323, and 325 have the same light intensity. By configuring the azimuthal angle in the LCPH element 200 to have a nonlinear variation, the diffraction efficiency versus the AOI may have a profile as indicated by the curve 305 shown in FIG. 3A. Accordingly, the angular distribution of the light intensity (or brightness) of the diffracted lights 322, 324, and 326 output from the LCPH element 200 may become more uniform as compared to the conventional R-PVH element 100 shown in FIG. 1C.

As shown in FIG. 1C, the output lights 182, 184, and 186 corresponding to different viewing angles have different intensities (as indicated by lines of different thicknesses). In contrast, the output lights 322, 324, and 326 corresponding to different viewing angles (or different FOV directions) have a uniform intensity. Thus, the LCPH element 200 may provide an enhanced angular uniformity over a predetermined FOV (e.g., from 22.5° to −22.5°) at the output side. Thus, the eye 160 positioned at the output side of the LCPH element 200 may perceive a substantially uniform angular distribution of brightness or illuminance over a predetermined FOV (e.g., from 22.5° to −22.5°). In other words, when the eye 160 receives diffracted lights coming in different FOV directions, the angular distribution of brightness or illuminance of the diffracted lights output from the LCPH element 200 configured with nonlinearly varying azimuthal angles as described above may become more uniform.

Figure 3C:
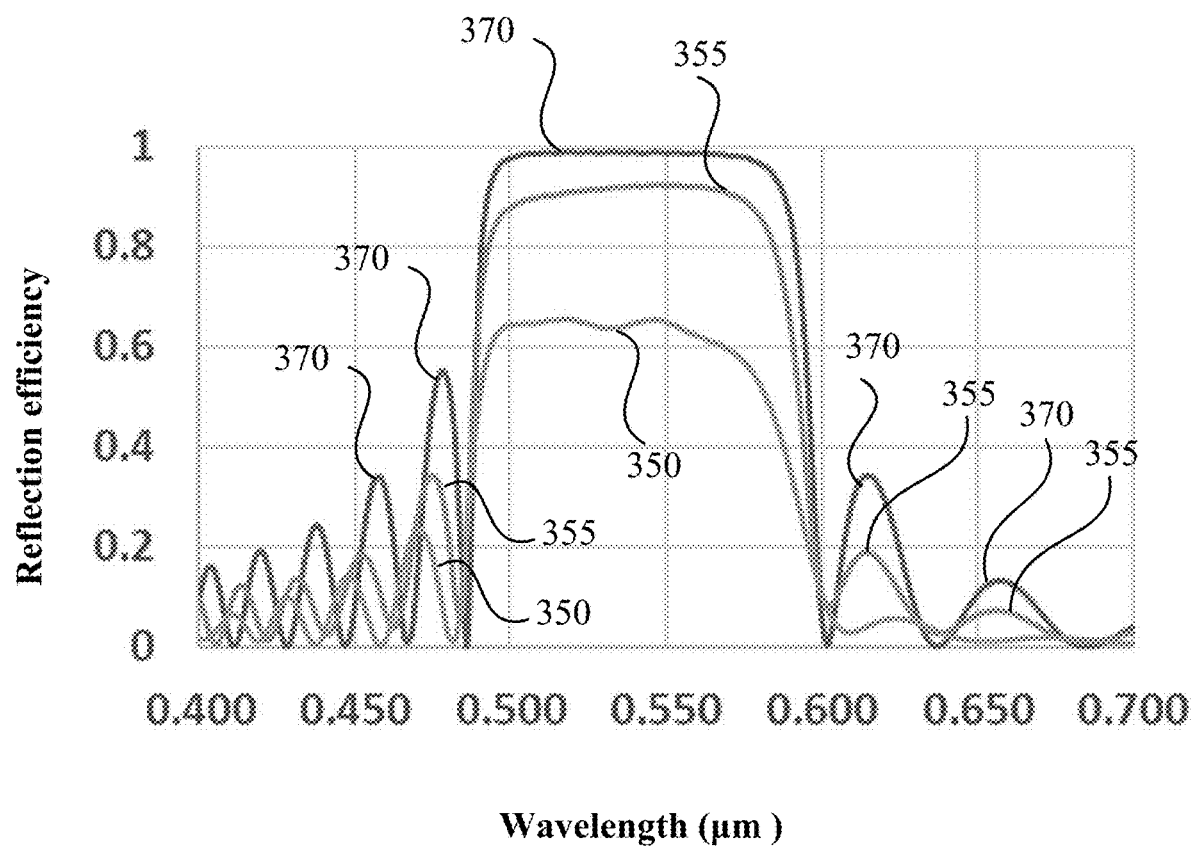
FIG. 3C illustrates simulation results showing a relationship between a diffraction efficiency and a wavelength of an incident light for both the conventional R-PVH element shown in FIG. 1A, and the LCPH element shown in FIG. 2A.

FIG. 3C illustrates simulation results showing a relationship between a diffraction efficiency and a wavelength of an incident light for both the conventional R-PVH element 100 shown in FIG. 1A, and the LCPH element 200 shown in FIG. 2A. A curve 370 shows the relationship for the conventional R-PVH element 100 shown in FIG. 1A, and the other two curves 350 and 355 show the relationship for the LCPH element 200 shown in FIG. 2A when the amplitude A of the nonlinear function described above is selected to be two different non-zero values.

In the simulations, for the LCPH element 200, over the single helical pitch $P_h$, the azimuthal angle ϕ of the LC molecule 212 located along the helical axis 218 varies nonlinearly with respect to the out-of-plane axis distance z' according to a nonlinear function $$\varphi(z') = 180° * \frac{z'}{P_B} + A * \text{Sin}\left(360° * \frac{z'}{P_B}\right).$$

Over the single in-plane pitch $P_{in}$, the azimuthal angle ϕ of the LC molecule 212 located in close proximity to the surface 205 varies nonlinearly with respect to the in-plane axis distance x according to a nonlinear function $$\varphi(x) = 180° * \frac{x}{P_{in}} + A * \text{Sin}\left(360° * \frac{x}{P_{in}}\right),$$

where $P_B$=0.1565 µm, and $P_{in}$=0.78 µm. For the conventional R-PVH element 100, the azimuthal angle φ of the LC molecule 112 located along the helical axis 168 varies linearly with respect to the out-of-plane axis distance z' according to a linear function $$\varphi(z') = 180° * \frac{z'}{P_B},$$

and over the single in-plane pitch $P_{in}$, the azimuthal angle φ of the LC molecule 112 located in close proximity to the surface 165 varies linearly with respect to the in-plane axis distance x according to a linear function $$\varphi(x) = 180° * \frac{x}{P_{in}},$$

where $P_B$=0.1565 µm, and $P_{in}$=0.78 µm. It is noted that the linear functions are special cases of the nonlinear functions when A=0°. The AOI of the incident lights are presumed to be the same for the LCPH element 200 and the conventional R-PVH element 100.

As shown in FIG. 3C, the horizontal axis represents a wavelength (unit: µm) of an incident light (or wavelength of incidence), and the vertical axis represents a normalized diffraction efficiency (e.g., a normalized diffraction efficiency for $1^{st}$ diffraction order). The curve 350 shows a relationship between the normalized diffraction efficiency and the wavelength for the LCPH element 200 when the amplitude is A=36°. The curve 355 shows a relationship between the diffraction efficiency and the wavelength for the LCPH element 200 when the amplitude is A=18°. The curve 370 shows a relationship between the diffraction efficiency and the wavelength for the conventional R-PVH element 100 (i.e., when the amplitude is A=0° in the nonlinear functions).

The curve 350 shows that the diffraction efficiency of the LCPH element 200 is about 65% when the amplitude is A=36°, and the curve 355 shows that the diffraction efficiency of the LCPH element 200 is about 90% when the amplitude is A=18. The curve 370 shows that the diffraction efficiency of the conventional R-PVH element 100 is close to 98% when the amplitude is A=0°. The curves 350, 355, and 370 show that each of the LCPH element 200 and the conventional R-PVH element 100 has a diffraction band associated with a green wavelength range (about 495 nm to about 570 nm). The curves 350 and 355 show that the diffraction efficiency of the LCPH element 200 increases as the amplitude A of the nonlinear functions decreases. For example, the diffraction efficiency of the LCPH element 200 increases from about 65% to about 90% when the amplitude A decreases from 36° to 18°. As the amplitude A further decreases, the diffraction efficiency of the LCPH element 200 may further increase. In the conventional R-PVH element 100 having a linear azimuthal angle variation within the volume and at the surface 165 (which may be regarded as a special case of the nonlinear variation with the amplitude A being 0°), and the diffraction efficiency is close to 98%, as shown by the curve 370.

In other words, FIG. 3C shows that by selecting different amplitudes A for configuring different nonlinear azimuthal angle variations in the LCPH element 200, the LCPH element 200 may provide different diffraction efficiencies over a predetermined wavelength range, e.g., the visible wavelength range shown in FIG. 3C. In some embodiments, it is possible to introduce a variation in the diffraction efficiency at different portions of the LCPH element 200 by configuring the azimuthal angles at different portions (or different spatial positions) according to different nonlinear functions, each of which uses a different amplitude A. By doing so, diffracted lights output from different portions of the LCPH element 200 may have different light intensities. In other words, a specific light intensity variation at the output side of the LCPH element 200 may be configured.

For example, when the amplitude A of the nonlinear term is configured to vary in respective portions of the LCPH element 200, the LCPH element 200 may provide different diffraction efficiencies to lights that are incident onto the respective portions at the same AOI. Thus, the diffracted lights output from the respective portions of the LCPH element 200 may have the same diffraction angle and different light intensities. In addition, in each portion of the LCPH element 200 configured with a specific amplitude A for the nonlinear term, the diffracted lights output from that portion may have a uniform angular distribution of the local brightness (or local intensity) over the entire FOV. When the amplitude A for the nonlinear term is configured to be constant across the LCPH element 200, the LCPH element 200 may provide the same diffraction efficiency to lights that are incident onto the respective portions at the same AOI, and the diffracted lights output from the respective portions of the LCPH element 200 may have the same diffraction angle and the same light intensity.

Figure 4A:
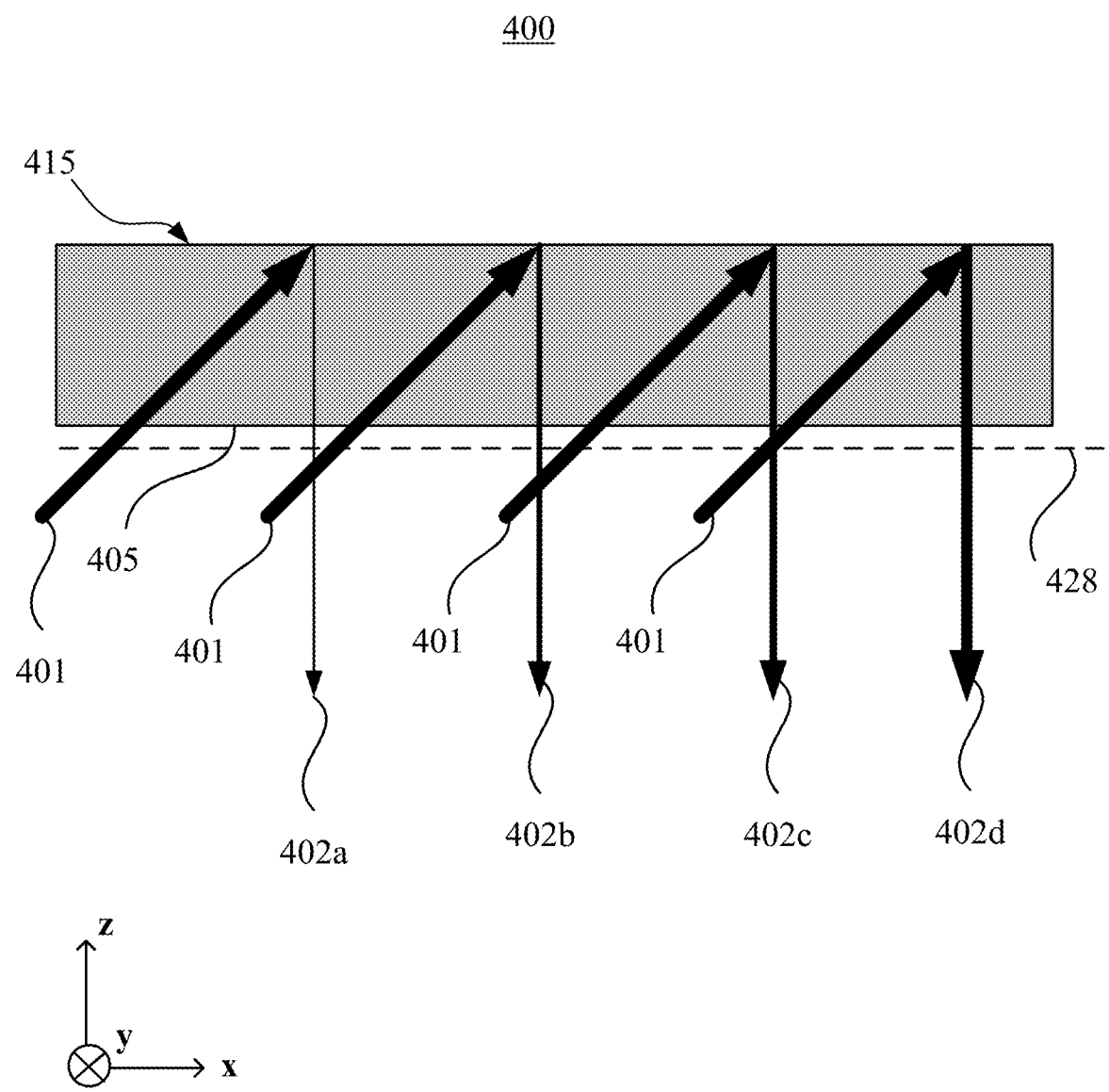
FIGS. 4A and 4B illustrate schematic diagrams of an LCPH element, according to an embodiment of the present disclosure.
Figure 4B:
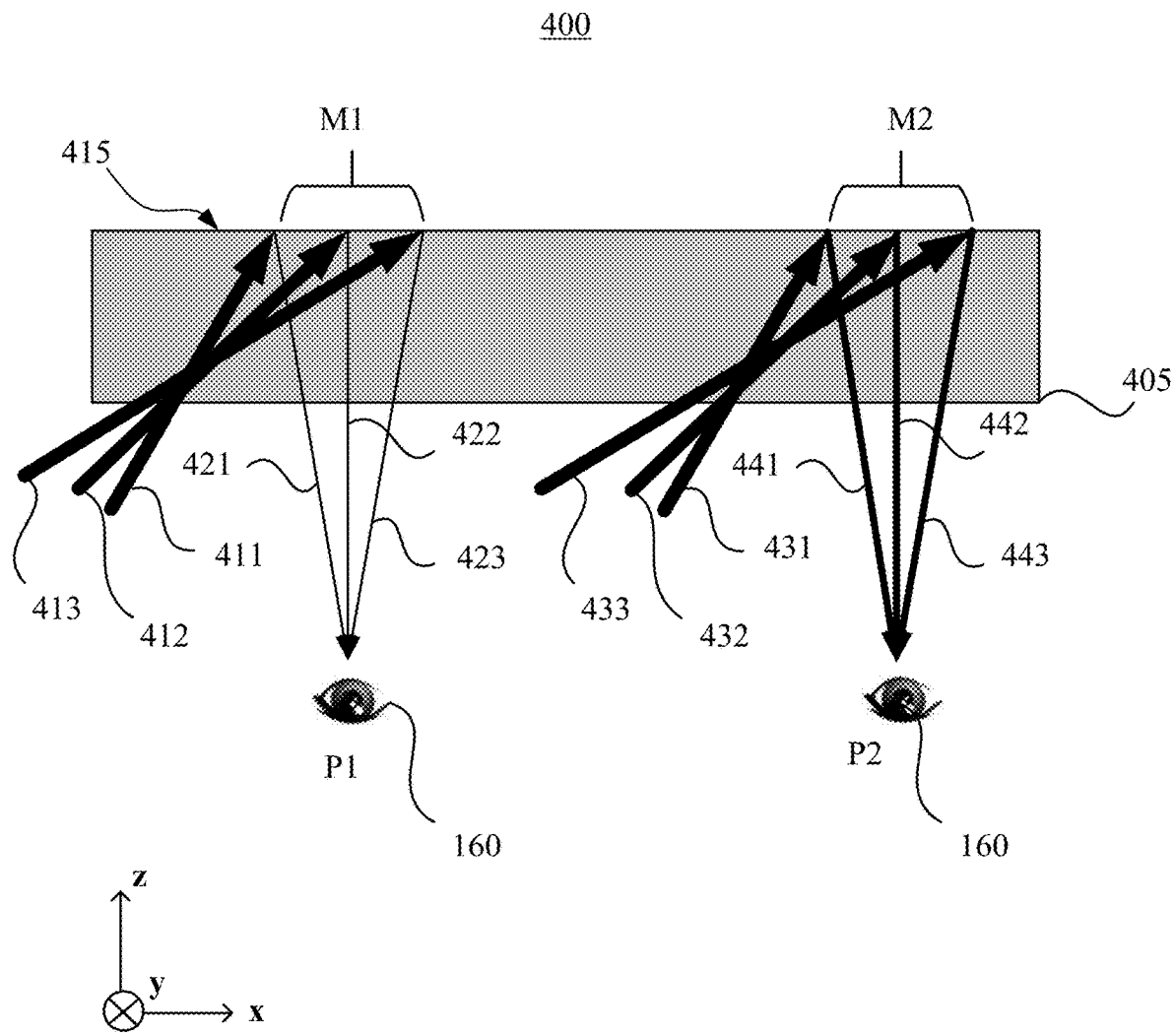

FIGS. 4A and 4B illustrate x-z sectional views of an LCPH element 400, according to an embodiment of the present disclosure. The LCPH element 400 may include elements that are similar to or the same as those included in the LCPH element 200 shown in FIG. 2A. Descriptions of the same or similar elements or features can refer to the above corresponding descriptions, including those rendered in connection with FIG. 2A. The LCPH element 400 may be an R-PVH element or T-PVH element. An R-PVH element is used as an example of the LCPH element 400. The LCPH element 400 may be configured to substantially backwardly diffract (e.g., to reflect), a circularly polarized light having a predetermined handedness, and substantially transmit, with zero or negligible diffraction, a circularly polarized light having a handedness that is opposite to the predetermined handedness.

For discussion purposes, in the embodiment shown in FIG. 4A, the R-PVH element used as an example of the LCPH element 400 is also referred to as 400 for discussion purposes. Similar to the LCPH element 200 shown in FIG. 2A, the R-PVH element 400 may include an R-PVH layer 415. The LC molecules 212 (not shown) located in close proximity to a surface 405 of the R-PVH element 400 or the R-PVH layer 415 may be configured to have a nonlinear azimuthal angle variation along at least one in-plane direction (or in-plane axis) 428 within the surface 405. In some embodiments, the LC molecules 212 (not shown) may also be configured to have a nonlinear azimuthal angle variation along a helical axis of helical twist structures (also referred to as helical structures) formed within the volume of the R-PVH layer 415. In some embodiments, the LC molecules 212 (not shown) may also be configured to have a linear azimuthal angle variation along the helical axis of helical twist structures (formed within the volume of the R-PVH layer 415).

In the embodiment shown in FIG. 4A, the R-PVH element 400 may be configured to have a predetermined variation of the amplitude A of the nonlinear term (referred to as an amplitude variation of the nonlinear term) along one or more in-plane dimensions, e.g., along an x-axis direction and/or a y-axis direction within a film plane of the R-PVH element 400. That is, for different portions along the x-axis direction and/or the y-axis direction of the R-PVH element 400, the amplitude A may be different values for the nonlinear azimuthal angle distribution. In some embodiments, the film plane of the R-PVH element 400 may be parallel to the surface 405 of the R-PVH element 400, and may be perpendicular to a thickness direction (e.g., a z-axis direction) of the R-PVH element 400. That is, the R-PVH element 400 may be configured to have a predetermined 1D or 2D amplitude variation(s) of the nonlinear term within the film plane of the R-PVH element 400.

As the diffraction efficiency of the LCPH element 400 varies with the amplitude A of the nonlinear term, the LCPH element 400 may be configured to provide a predetermined diffraction efficiency variation along one or more in-plane dimensions within the film plane of the LCPH element 400. Accordingly, when the LCPH element 400 backwardly diffract a plurality of lights 401 incident thereon with the same AOI and the same input light intensity, diffracted lights 402a-402d output from the LCPH element 400 may have a predetermined light intensity variation along one or more in-plane dimensions within the film plane of the LCPH element 400. In some embodiments, the diffract lights 402a-402d may correspond to a plurality of $1^4$ order diffracted lights having the same diffraction angle.

For example, when the amplitude A of the nonlinear term varies in one direction within the film plane of the LCPH element 400, the LCPH element 400 may provide a 1D diffraction efficiency variation, and the diffracted lights 402a-402d may have a 1D light intensity variation at the output side of the LCPH element 400. When the amplitude A of the nonlinear term varies in two directions within the film plane of the LCPH element 400, the LCPH element 400 may provide a 2D diffraction efficiency variation, and the diffracted lights 402a-402d may have a 2D light intensity variation at the output side of the LCPH element 400.

For discussion purposes, in the LCPH element 400, the amplitude A of the nonlinear term is presumed to have a 1D variation along the x-axis direction, i.e., the amplitude A decreases in the +x-axis direction in a monotonical manner. The monotonical manner may be a linear gradient manner, a nonlinear gradient manner, a stepped gradient manner, or a suitable combination thereof. Thus, the diffraction efficiency provided by the LCPH element 400 to the incident lights 401 may increase in the +x-axis direction. When the incident lights 401 are presumed to have the same light intensity and same AOI, the light intensity of the diffracted lights 402a-402d may increase in the +x-axis direction.

As shown in FIG. 4B, when the respective portions M1 and M2 of the LCPH element 400 are configured with different amplitudes A, the LCPH element 400 may provide different diffraction efficiency to lights incident onto the different portions M1 and M2. Here, a plurality of lights 411, 412, and 413 are incident onto the portion M1 of the LCPH element 400 with different angles of incidence and the same light intensity. The portion M1 may be configured with a nonlinear azimuthal angle variation by adopting an amplitude A1. The LCPH element 400 may backwardly diffract (e.g., reflect) the lights 411, 412, and 413 with a substantially same diffraction efficiency R1. Thus, diffracted lights 421, 422, and 423 output from the portion M1 of the LCPH element 400 may provide substantially uniform angular distribution of the brightness over a predetermined FOV corresponding to the AOIs of the incident lights 411, 412, and 413. The eye 160 positioned at P1 on the output side of the LCPH element 400 may perceive a substantially uniform angular brightness or illuminance over the predetermined FOV.

Another plurality of lights 431, 432, and 433 may be incident onto another portion M2 of the LCPH element 400 with different AOIs and the same light intensity (this light intensity is presumed to be the same as that of the light intensity of the lights 411, 412, and 413). The portion M2 may be configured with a nonlinear azimuthal angle variation by adopting a different amplitude A2. Thus, the diffraction efficiency provided by the portion M2 may be different from that provided by the portion M1. The portion M2 may provide a substantially same diffraction efficiency to the lights 431, 432, and 433. Thus, diffracted lights 441, 442, and 443 output from the portion M2 of the LCPH element 400 may provide a substantially uniform angular distribution of the brightness over a predetermined FOV corresponding to the AOIs of the incident lights 431, 432, and 433. The eye 160 positioned at P2 on the output side of the LCPH element 400 may perceive a substantially uniform angular brightness or illuminance over the predetermined FOV. For discussion purposes, in FIG. 4B, the amplitude A1 at the portion M1 is configured to be greater than the amplitude A2 at the portion M2 and, thus, the brightness perceived at the position P1 is lower than the brightness perceived at the position P2.

Compared to a conventional LCPH element, the LCPH elements disclosed herein can provide an enhanced angular illuminance uniformity over a large AOI range, a configurable 1D or 2D light intensity variation, a small thickness, a light weight, compactness, no limitation of aperture, simple fabrication, etc. The LCPH elements disclosed herein can be implemented in a number of technical fields. For example, the LCPH elements disclosed herein may be implemented in various systems for augmented reality ("AR"), virtual reality ("VR"), and/or mixed reality ("MR") applications, e.g., near-eye displays ("NEDs"), head-up displays ("HUDs"), head-mounted displays ("HMDs"), smart phones, laptops, televisions, vehicles, etc.

An artificial reality system, such as a head-mounted display ("HMD") or heads-up display ("HUD") system, generally includes a near-eye display ("NED") system in the form of a headset or a pair of glasses, and configured to present content to a user via an electronic or optic display within, for example, about 10-20 μmm in front of the eyes of a user. The NED system may display virtual objects or combine images of real objects with virtual objects, as in VR, AR, or MR applications. For example, in an AR or MR system, a user may view both images of virtual objects (e.g., computer-generated images ("CGIs")) and the surrounding environment by, for example, seeing through transparent display glasses or lenses. One example of an AR system may include a pupil-expansion light guide (or waveguide) display system, in which an image light representing a CGI may be coupled into a light guide (or waveguide), propagate within the waveguide, and be coupled out of the waveguide at different locations to expand an effective pupil. Diffractive optical elements may be disposed at the waveguide to couple the image light into or out of the waveguide via diffraction. The pupil-expansion light guide (or waveguide) display system may potentially offer eye-glasses form factors, a moderately large field of view ("FOV"), a high transmittance, and a large eye-box.

In a typical light guide (or waveguide) display system or assembly, a light source assembly may generate an image light representing a virtual image. An in-coupling grating may couple the image light (referred to as input image light)

into a light guide as an in-coupled image light. The in-coupled image light may propagate within the light guide toward an out-coupling grating through total internal reflection ("TIR"). Hence, the in-coupled image light is also referred to as a TIR propagating image light. As the in-coupled image light propagates inside the light guide via TIR, the in-coupled image light may be incident onto different portions of the out-coupling grating. The out-coupling grating may couple the in-coupled image light out of the light guide at the different portions as a plurality of out-coupled (or output) image lights. In this manner, the out-coupling grating may replicate the image light received from the light source assembly to expand an effective pupil of the light guide display assembly. The out-coupling grating may provide a uniform or constant diffraction efficiency for the in-coupled image light (or a predetermined polarized component of the in-coupled image light) incident onto different portions of the out-coupling grating. Thus, as portions of the in-coupled image light are coupled out of the light guide at different portions of the out-coupling grating, the intensity of the in-coupled image light propagating inside the light guide may naturally decrease from one portion to another. Accordingly, the intensity (or illuminance) of the out-coupled image lights may naturally decrease in a pupil expansion direction. Thus, when an out-coupling grating having a uniform diffraction efficiency along the pupil expansion direction is used in the conventional light guide display system, the conventional light guide display system may provide a non-uniform illuminance at the output side of the light guide due to the natural decrease in the light intensity described above. In other words, the virtual image perceived by eyes located at the output side of the light guide may have a spatially varying brightness, where different portions of the virtual image may have different brightness. The non-uniform illuminance provided by a conventional light guide display system is often uncontrolled. Such an uncontrolled non-uniform illuminance may provide a poor visual effect to the user.

Figure 5A:
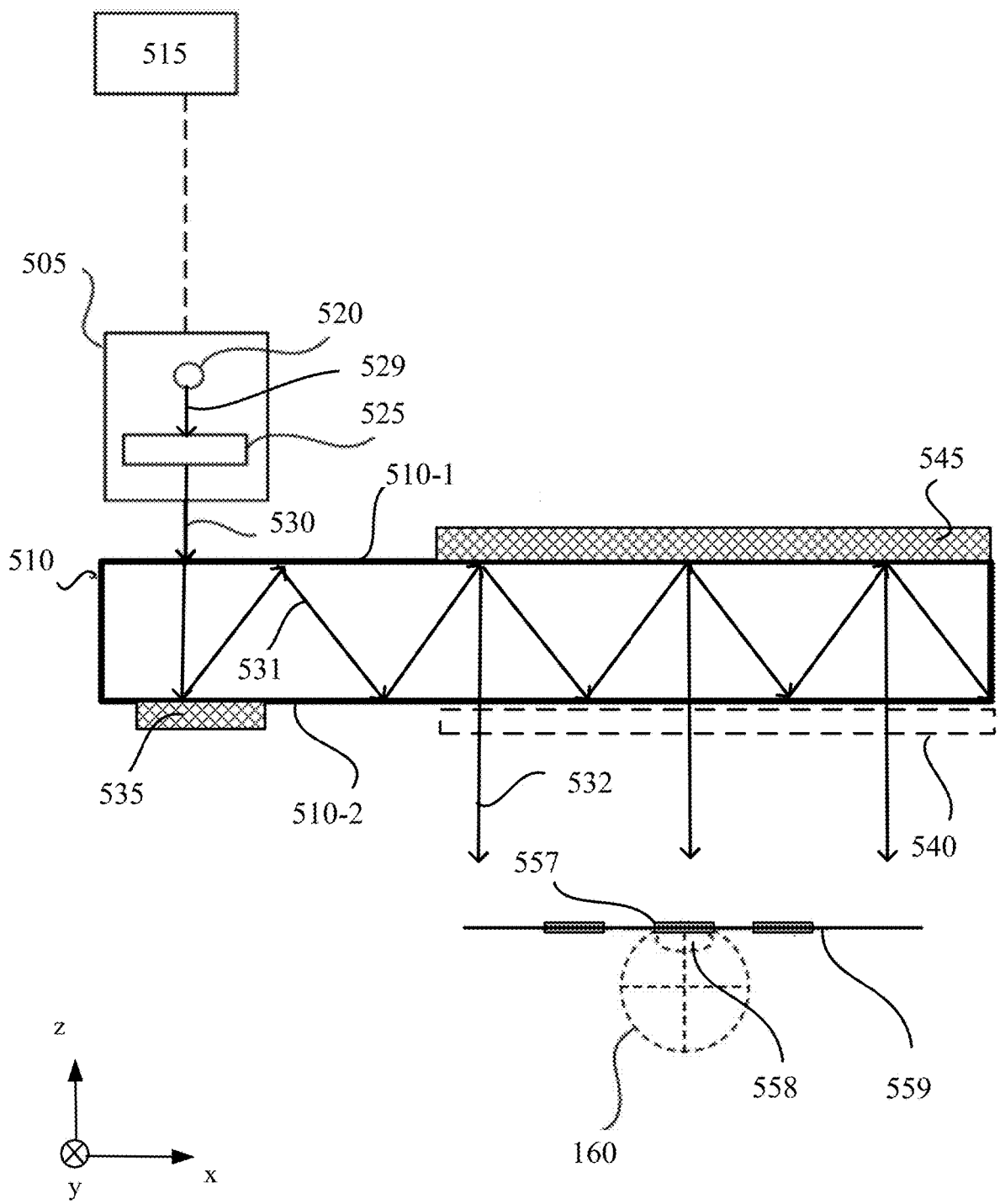
FIG. 5A illustrates a schematic diagram of a light guide display system, according to an embodiment of the present disclosure.

The present disclosure provides a device (e.g., an optical device) or a light guide display assembly or system that includes one or more disclosed LCPH elements. FIG. 5A illustrates an x-z sectional view of a light guide display system 500 that includes a disclosed LCPH having a non-linear azimuthal angle variation, according to an embodiment of the present disclosure. The light guide display system 500 may be implemented in artificial reality systems for VR, AR, and/or MR applications. The disclosed light guide display system 500 may be configured to provide not only a uniform angular distribution of a controllable illuminance (or brightness) over a predetermined FOV of the system 500, but also a controllable illuminance (or brightness) distribution along the pupil expansion direction. The controllable illuminance distribution along the pupil expansion direction may be controlled to be uniform or non-uniform (according to a predetermined profile, such as Gaussian profile) by configuring the different amplitudes A that affect the nonlinear azimuthal angle variations, depending on application needs.

As shown in FIG. 5A, the light guide display system 500 may include a light source assembly 505, a light guide 510, and a controller 515. The light source assembly 505 may include a light source 520 and a collimating lens 525. The light guide 510 may be coupled with an in-coupling element (or input coupler) 535 and an out-coupling element (or output coupler) 545. The light guide 510 coupled with the in-coupling element 535 and the out-coupling element 545 may also be referred to as a light guide image combiner.

In some embodiments, the light source 520 may include a display element (also referred to as 520) that includes a plurality of pixels (not shown) arranged in a pixel array, in which neighboring pixels may be separated by, e.g., a black matrix. The display element 520 may output an image light 529 representing a virtual image (having a predetermined image size associated with a linear size of the display element 520) toward the collimating lens 525. The image light 529 may be a divergent image light including a bundle of rays. For illustrative purposes, FIG. 5A shows a single ray of the image light 529. The collimating lens 525 may transmit the image light 529 as an image light 530 having a predetermined input FOV (e.g., a) toward an input side of the light guide 510. The collimating lens 525 may transform or convert a linear distribution of the pixels in the virtual image formed by the image light 529 into an angular distribution of the pixels in the image light 530 having the predetermined input FOV. Each ray in the in the image light 530 may represent an FOV direction of the input FOV. For illustrative purposes, FIG. 5A shows a single ray (e.g., central ray) of the image light 530 that is normally incident onto the in-coupling element 535, and the single ray of the image light 530 may represent a single FOV direction (e.g., 0° FOV direction) of the input FOV.

The in-coupling element 535 may couple the image light 530 into the light guide 510 as an in-coupled image light 531, which may propagate inside the light guide 510 toward the out-coupling element 545 via total internal reflection ("TIR"). The out-coupling element 545 may couple the in-coupled image light 531 out of the light guide 510 as a plurality of output image lights 532 at different locations (or portions) along the longitudinal direction or pupil expansion direction (e.g., x-axis direction) of the light guide 510, each of which may have an output FOV that may be substantially the same as the input FOV (e.g., as represented by an angle α). For discussion purposes, FIG. 5A shows three output image lights 532 each being represented by a single ray (e.g., central ray). Each output image light 532 may include the same image content as the virtual image displayed on the display element 520. Thus, the light guide 510 coupled with the in-coupling element 535 and the out-coupling element 545 may replicate the image light 530 at the output side of the light guide 510, to expand an effective pupil of the system 500.

For discussion purposes, FIG. 5A shows a one-dimensional pupil expansion along the x-axis direction in FIG. 5A. Thus, the pupil expansion direction is the x-axis direction. In some embodiments, the system 500 may also provide a two-dimensional pupil expansion, e.g., along both the x-axis direction and the y-axis direction in FIG. 5A. For example, in some embodiments, the system 500 may also include a redirecting element (or folding element) 540 coupled to the light guide 510, and configured to redirect the in-coupled image light 531 to the out-coupling element 545. The redirecting element 540 may be configured to expand the input image light 530 in a first direction, e.g., the y-axis direction, and the out-coupling element 545 may be configured to expand the input image light 530) in a second, different direction, e.g., the x-axis direction.

The plurality of image lights 532 may propagate through exit pupils 557 located in an eye-box region 559 of the system 500. The exit pupil 557 may correspond to a spatial zone where an eye pupil 558 of an eye 160 of a user may be positioned in the eye-box region 559 of the system 500 to perceive the virtual image. The size of a single exit pupil 557 may be larger than and comparable with the size of the eye pupil 558. The exit pupils 557 may be sufficiently spaced apart, such that when one of the exit pupils 557 substantially coincides with the position of the eye pupil 558, the remaining one or more exit pupils 557 may be located beyond the position of the eye pupil 558 (e.g., falling outside of the eye pupil 558). The light guide 510 and the out-coupling element 545 may also transmit a light (not shown) from a real-world environment (referred to as a real-world light), combining the real-world light with the output image light 532 and delivering the combined light to the eye 160. Thus, the eye 160 may observe the virtual scene optically combined with the real world scene.

In some embodiments, the out-coupling element 545 may include a grating that couples the image light 531 out of the light guide 510 via diffraction. The grating may include an LCPH element disclosed herein, such as the LCPH element 400 shown in FIG. 4A. The LC molecules 212 (not shown) included in the out-coupling element 545 may be configured to have a nonlinear azimuthal angle variation along a helical axis of helical twist structures formed within the volume of the out-coupling element 545. In addition, the LC molecules 212 (not shown) located in close proximity to a surface of the out-coupling element 545 may be configured to have a nonlinear azimuthal angle variation along at least one in-plane direction (or in-plane axis) within the surface of the out-coupling element 545.

Different portions of the out-coupling element 545 may adopt a different amplitude A for the azimuthal angle variation. The variation in the amplitude A may be along one or more in-plane dimensions, e.g., along an x-axis direction and/or a y-axis direction within a film plane of the out-coupling element 545. Thus, the out-coupling element 545 may be configured to provide a predetermined diffraction efficiency profile, e.g., a predetermined 1D or 2D diffraction efficiency profile in an x-y plane, to the image lights 531 incident onto different portions of the out-coupling element 545 at the same predetermined incidence angle, with the same predetermined incidence wavelength and the same predetermined polarization. For example, the predetermined diffraction efficiency profile may be: different portions of the out-coupling element 545 are configured with different diffraction efficiencies. Thus, the out-coupling element 545 may diffract the image lights 531, incident onto different portions out of the light guide 510 at different diffraction efficiencies. For example, the diffraction efficiencies may increase along the pupil expansion direction, thereby mitigating the natural decrease in the intensity of the image lights 531 to provide a uniform brightness at the output side of the light guide display system 500.

To provide the different diffraction efficiencies at the different portions of the out-coupling element 545, in some embodiments, the amplitude A for the nonlinear distribution of the azimuthal angle in the out-coupling element 545 may be configured to vary at least along the +x-axis direction (i.e., a pupil expansion direction) in FIG. 5A. The varying amplitude A may result in a varying (e.g., non-uniform) diffraction efficiency of the out-coupling element 545 at least along the +x-axis direction in FIG. 5A. In some embodiments, the amplitude A may be selected to decrease in the +x-axis direction, which may cause the diffraction efficiency of the out-coupling element 545 to increase along the +x-axis direction. As a result, when the intensity of the image light 531 naturally decreases as the image light 531 propagates along the propagating direction or the pupil expansion direction, the output image lights 532 output from different portions of the light guide 510 may become uniform due to the increasing diffraction efficiency along the propagating direction or the pupil expansion direction. Thus, the uniformity of the illuminance at the output side of the light guide 510 may be enhanced at least along the +x-axis direction (or the pupil expansion direction).

Although FIG. 5A shows that the out-coupling element 545 may provide a uniform illuminance in one pupil expansion direction (e.g., the +x-axis direction), in some embodiments, the out-coupling element 545 may be configured to provide a uniform illuminance in two pupil expansion directions (e.g., the x-axis direction and the y-axis direction). For example, in some embodiments, the amplitude A may vary in both the x-axis direction and the y-axis direction, to cause the azimuthal angle to vary nonlinearly in both the x-axis direction and the y-axis direction. As a result, the out-coupling element 545 may provide a first (e.g., a non-uniform) 1D diffraction efficiency profile in the x-axis direction, and a second (e.g., a non-uniform) 1D diffraction efficiency profile in the y-axis direction. Thus, the uniformity of the illuminance of the image lights 532 at the output side of the light guide 510 may be improved in both the +x-axis direction and the +y-axis direction.

In some embodiments, the controllable illuminance distribution along the pupil expansion direction at the output side of the light guide display system 500 may be controlled to be non-uniform by configuring the different amplitudes A at different portions of the out-coupling element 545. For example, the out-coupling element 545 may be configured to diffract an image light toward regions outside of the eye-box region 559 with a relatively small (e.g., negligible) diffraction efficiency, and diffract an image light toward regions inside the eye-box region 559 with a relatively large diffraction efficiency. Thus, the loss of the image light directed to regions outside of the eye-box region 559 may be reduced. As a result, the power consumption of the light source assembly 505 may be significantly reduced, while the power efficiency of the light guide display system 500 may be significantly improved.

In some embodiments, the redirecting element 540 may be a grating that includes an LCPH element disclosed herein, such as the LCPH element 400 shown in FIG. 4A. The LC molecules 212 (not shown) included in the redirecting element 540 may be configured to have a nonlinear azimuthal angle variation along a helical axis of helical twist structures formed within the volume of the redirecting element 540. In addition, the LC molecules 212 (not shown) located in close proximity to a surface of the redirecting element 540 may be configured to have a nonlinear azimuthal angle variation along at least one in-plane direction (or in-plane axis) within the surface of the redirecting element 540.

In some embodiments, the amplitude A for the nonlinear azimuthal angle variation may be a constant value throughout different portions of the redirecting element 540. In some embodiments, the amplitude A for the nonlinear azimuthal angle variation may be different values at different portions of the redirecting element 540. When the different values of the amplitude A are used, the amplitude A may vary along a first in-plane direction, e.g., a y-axis direction within a film plane of the redirecting element 540. Thus, the redirecting element 540 may be configured to provide a predetermined (e.g., a non-uniform) diffraction efficiency profile, e.g., a predetermined 1D diffraction efficiency profile, in the y-axis direction, to the image lights 531 incident onto different portions of the redirecting element 540 at the same predetermined incidence angle, with the same predetermined incidence wavelength and the same predetermined polarization. For example, in some embodiments, the diffraction efficiencies of different portions of the redirecting element 540 may increase along the +y-axis direction, whereas the diffraction efficiencies of different portions of the out-coupling element 545 may increase along the +x-axis direction. Thus, the uniformity of the illuminance of the image lights 532 at the output side of the light guide 510 may be enhanced in both the +x-axis direction and the +y-axis direction.

In some embodiments, the light guide display system 500 may include a plurality of light guides 510 disposed in a stacked configuration (not shown in FIG. 5A). At least one (e.g., each) of the plurality of light guides 510 may be coupled with or include one or more diffractive elements (e.g., in-coupling element, out-coupling element, and/or directing element), which may be configured to direct the image light 530 toward the eye 160. In some embodiments, the plurality of light guides 510 disposed in the stacked configuration may be configured to output an expanded polychromatic image light (e.g., a full-color image light). In some embodiments, the light guide display system 500 may include one or more light source assemblies 505 and/or one or more light guides 510. In some embodiments, at least one (e.g., each) of the light source assemblies 505 may be configured to emit a monochromatic image light of a specific wavelength band corresponding to a primary color (e.g., red, green, or blue) and a predetermined FOV (or a predetermined portion of an FOV). In some embodiments, the light guide display system 500 may include three different light guides 510 configured to deliver component color images (e.g., primary color images) by in-coupling and subseϕ is the azimuthal uently out-coupling, e.g., red, green, and blue lights, respectively, in any suitable order. In some embodiments, the light guide display assembly 500 may include two different light guides configured to deliver component color images (e.g., primary color images) by in-coupling and subseϕ is the azimuthal uently out-coupling, e.g., a combination of red and green lights, and a combination of green and blue lights, respectively, in any suitable order. In some embodiments, at least one (e.g., each) of the light source assemblies 505 may be configured to emit a polychromatic image light (e.g., a full-color image light).

Figure 5B:
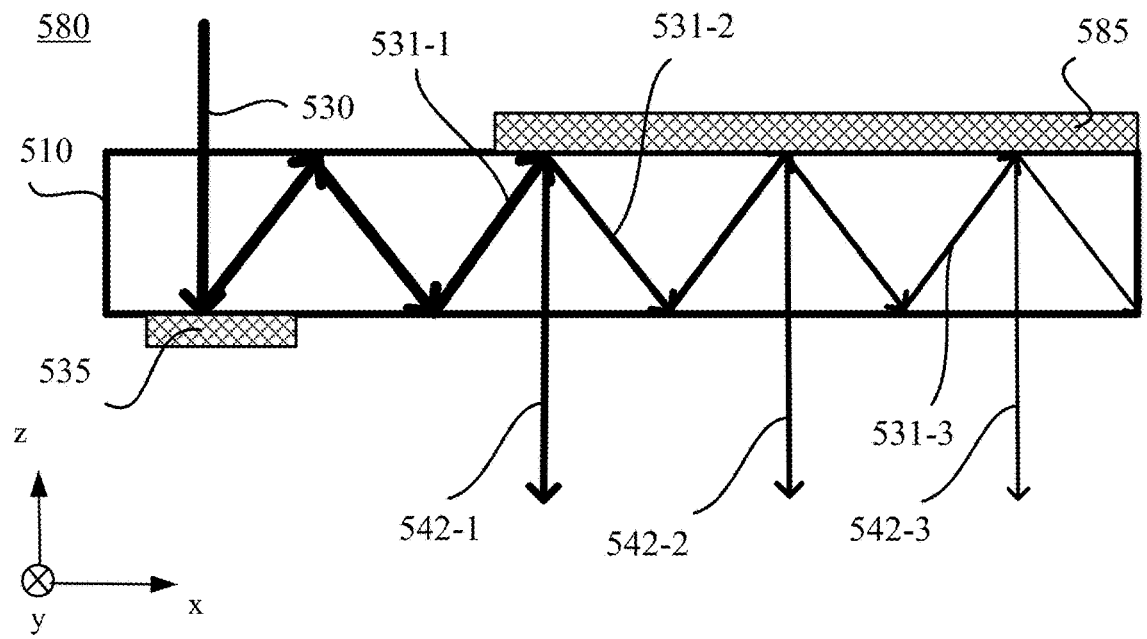
FIG. 5B illustrates a schematic diagram showing diffraction of an image light at an output side of a conventional light guide display system including an out-coupling grating with a uniform diffraction efficiency.

FIG. 5B illustrates a conventional light guide display system 580 including an out-coupling element 585 that provides a uniform diffraction efficiency in the x-axis direction. As shown in FIG. 5B, when the image light 531 propagates inside the light guide 510 through TIR, as portions of the image light 531 are diffracted out of the light guide 510 by the out-coupling element 585 at different locations, the intensity of the image light 531 naturally becomes lower in the light propagating direction, as schematically indicated by the gradually reducing thickness of the lines 530-1, 530-2, and 530-3. As a result, the intensity (or illuminance) of output lights 542-1, 542-2, and 542-3 output from the light guide 510 gradually decreases. Thus, at the output side of the light guide 510, the illuminance is non-uniform along the pupil expansion direction (e.g., +x-axis direction).

Figure 5C:
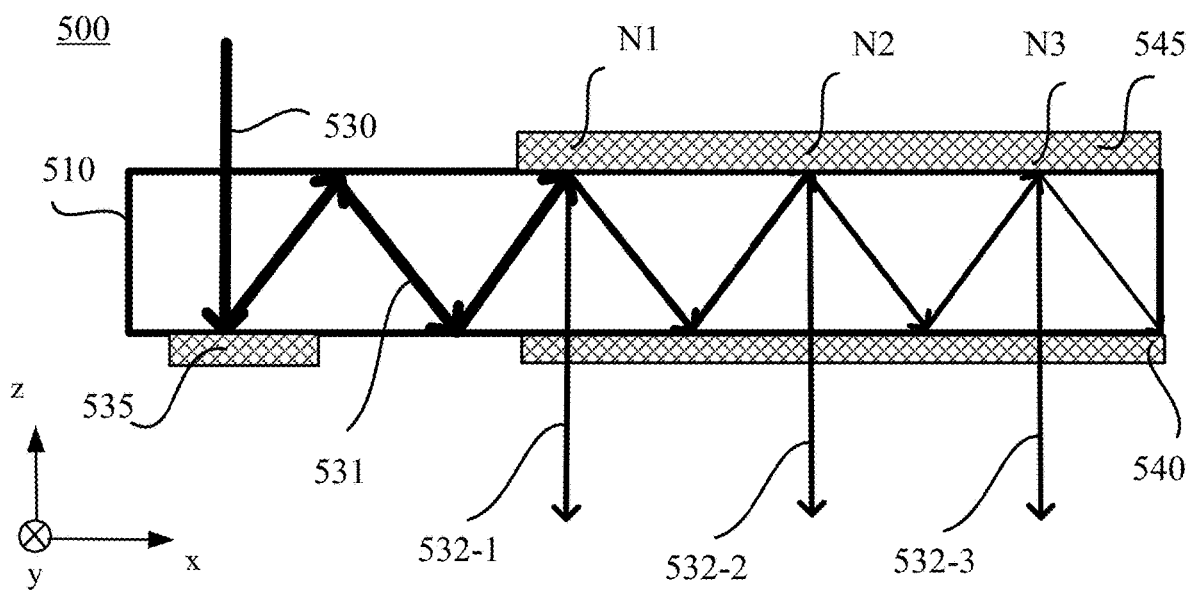
FIG. 5C illustrates a schematic diagram showing diffraction of an image light at an output side of the light guide display system shown in FIG. 5A, according to an embodiment of the present disclosure.

According to an embodiment of the present disclosure, the disclosed LCPH element with a nonlinear azimuthal angle variation may increase the illuminance uniformity of the output image light at the output side of the light guide. FIG. 5C illustrates diffraction of the image light 531 by the disclosed light guide display system 500. FIG. 5C shows that in the disclosed light guide display system 500 shown in FIG. 5A, the out-coupling element 545 may be configured with different nonlinear azimuthal angle variations (e.g., by adopting different amplitude A), such that the out-coupling element 545 may provide a gradually increasing diffraction efficiency along the x-axis direction. For example, at three exemplary portions N1, N2, and N3 at the out-coupling element 545, the amplitudes A for the nonlinear azimuthal angle variation may gradually increase. Thus, the diffraction efficiency of the out-coupling element 545 may gradually decrease. Thus, at portion N1 where the intensity of the image light 531 is the largest, the diffraction efficiency may be the smallest. At portion N2, the intensity of the image light 531 may be lower than the intensity at portion N1. Hence, the diffraction efficiency at portion N2 may be higher than the diffraction efficiency at portion N1. At portion N3, the intensity of the image light 531 may be further reduced. Thus, at portion N3, the diffraction efficiency may be further increased as compared to the diffraction efficiency at portion N2. Thus, the diffraction efficiency at portion N3 may be the highest. As a result of the different diffraction efficiencies provided at different portions of the out-coupling element 545, the illuminance (or intensity) of the output image light 532-1, 532-2, and 532-3 at the output side of the light guide 510 may become more uniform as compared with the conventional configuration shown in FIG. 5B.

In FIG. 5C, the diffraction efficiency of the out-coupling element 545 is presumed to vary in one dimension. It is understood that the diffraction efficiency of the out-coupling element 545 may vary in two dimensions, i.e., the x-axis direction and the y-axis direction. The out-coupling element 545 may have any suitable diffraction efficiency distribution profile in one dimension or two dimensions.

Figure 5D:
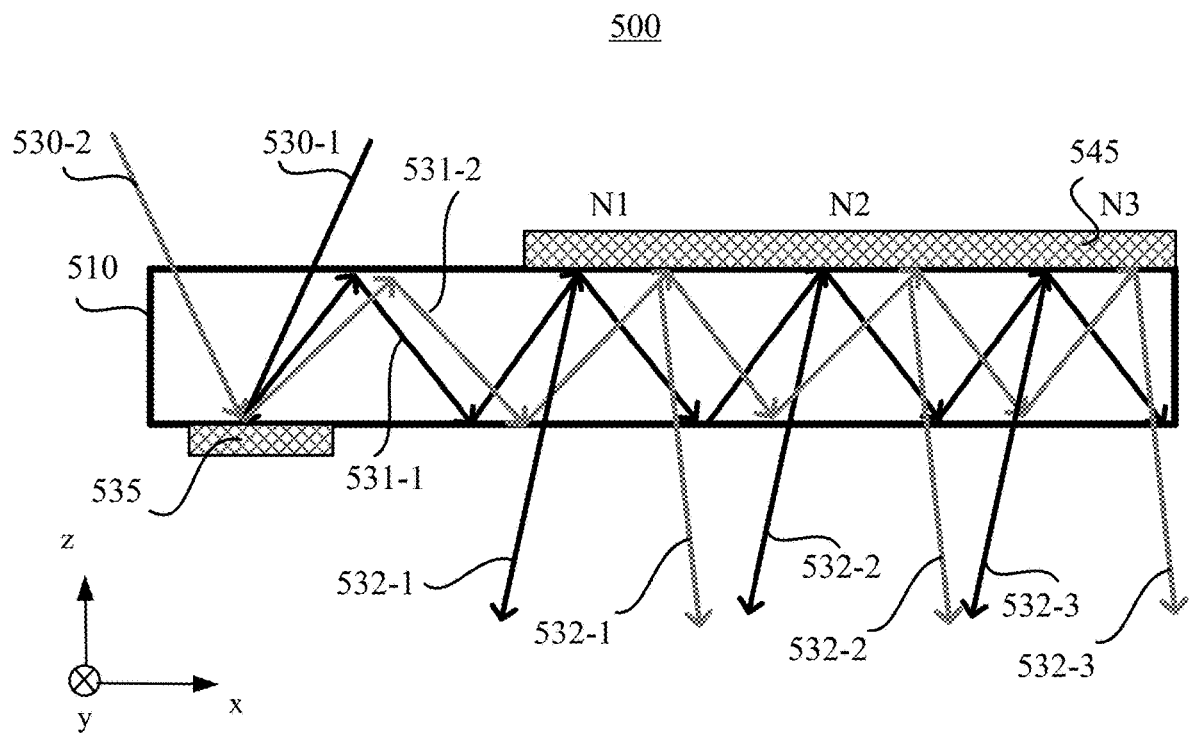
FIG. 5D illustrates a schematic diagram showing diffraction of image lights at an output side of the light guide display system shown in FIG. 5A, according to an embodiment of the present disclosure.

FIG. 5D illustrates diffraction of two image lights 530-1 and 530-2 by the disclosed light guide display system 500. The two image lights 530-1 and 530-2 may represent the leftmost and the rightmost portions of an input FOV of the system 500. The two image lights 530-1 and 530-2 may have different angles of incidence at the in-coupling element 535, and may be coupled into the light guide 510 as image lights 531-1 and 531-2, respectively. The image lights 531-1 and 531-2 may have different TIR angles. For the same image light 531-1 or 531-2 propagating along the light guide 510, the diffraction efficiency provided by the out-coupling element 545 at different locations may vary (e.g., increase) in the +x-axis direction. That is, for the same image light 531-1 or 531-2 propagating along the light guide 510, the diffraction efficiency at different portions of the out-coupling element 545 may be different.

At the same portion N1, N2, or N3 of the out-coupling element 545, the out-coupling element 545 may provide a substantially same diffraction efficiency to different image lights 531-1 and 531-2 (having different incidence angle and same incidence wavelength and same polarization). Thus, output image lights 532-1, 532-2, or 532-3 diffracted out from the same portion N1, N2, or N3 of the out-coupling element 545 may have an improved angular illuminance uniformity over an entire output FOV associated with the input FOV. Thus, the eye 160 positioned at the eye-box 559 may perceive a substantially uniform brightness or illuminance an entire output FOV associated with the input FOV.

Figure 6A:
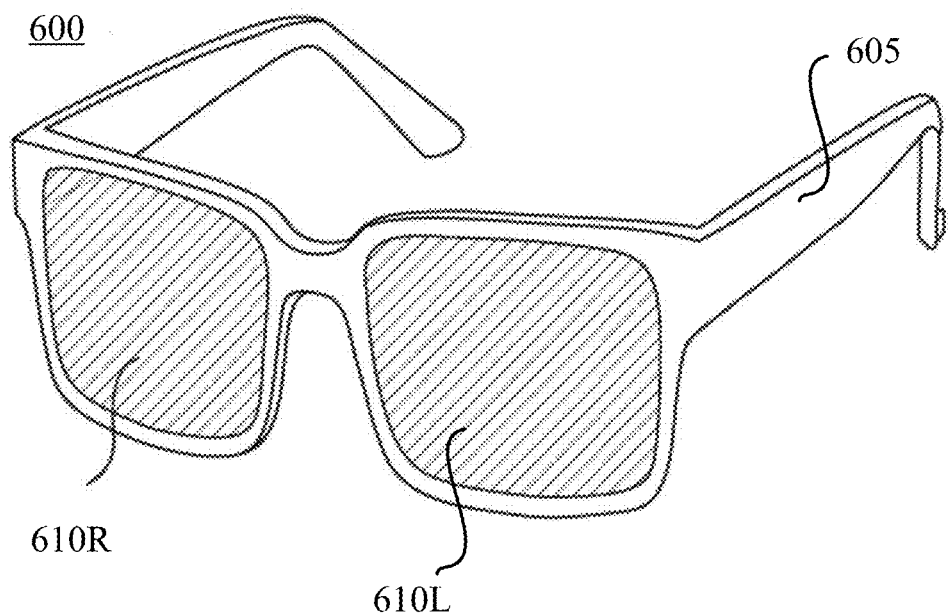
FIG. 6A illustrates a schematic diagram of an artificial reality device, according to an embodiment of the present disclosure.

FIG. 6A illustrates a schematic diagram of an artificial reality device 600 according to an embodiment of the present disclosure. In some embodiments, the artificial reality device 600 may produce VR, AR, and/or MR content for a user, such as images, video, audio, or a combination thereof. In some embodiments, the artificial reality device 600 may be smart glasses. In one embodiment, the artificial reality device 600 may be a near-eye display ("NED"). In some embodiments, the artificial reality device 600 may be in the form of eyeglasses, goggles, a helmet, a visor, or some other type of eyewear. In some embodiments, the artificial reality device 600 may be configured to be worn on a head of a user (e.g., by having the form of spectacles or eyeglasses, as shown in FIG. 6A), or to be included as part of a helmet that is worn by the user. In some embodiments, the artificial reality device 600 may be configured for placement in proximity to an eye or eyes of the user at a fixed location in front of the eye(s), without being mounted to the head of the user. In some embodiments, the artificial reality device 600 may be in a form of eyeglasses which provide vision correction to a user's eyesight. In some embodiments, the artificial reality device 600 may be in a form of sunglasses which protect the eyes of the user from the bright sunlight. In some embodiments, the artificial reality device 600 may be in a form of safety glasses which protect the eyes of the user. In some embodiments, the artificial reality device 600 may be in a form of a night vision device or infrared goggles to enhance a user's vision at night.

Figure 6B:
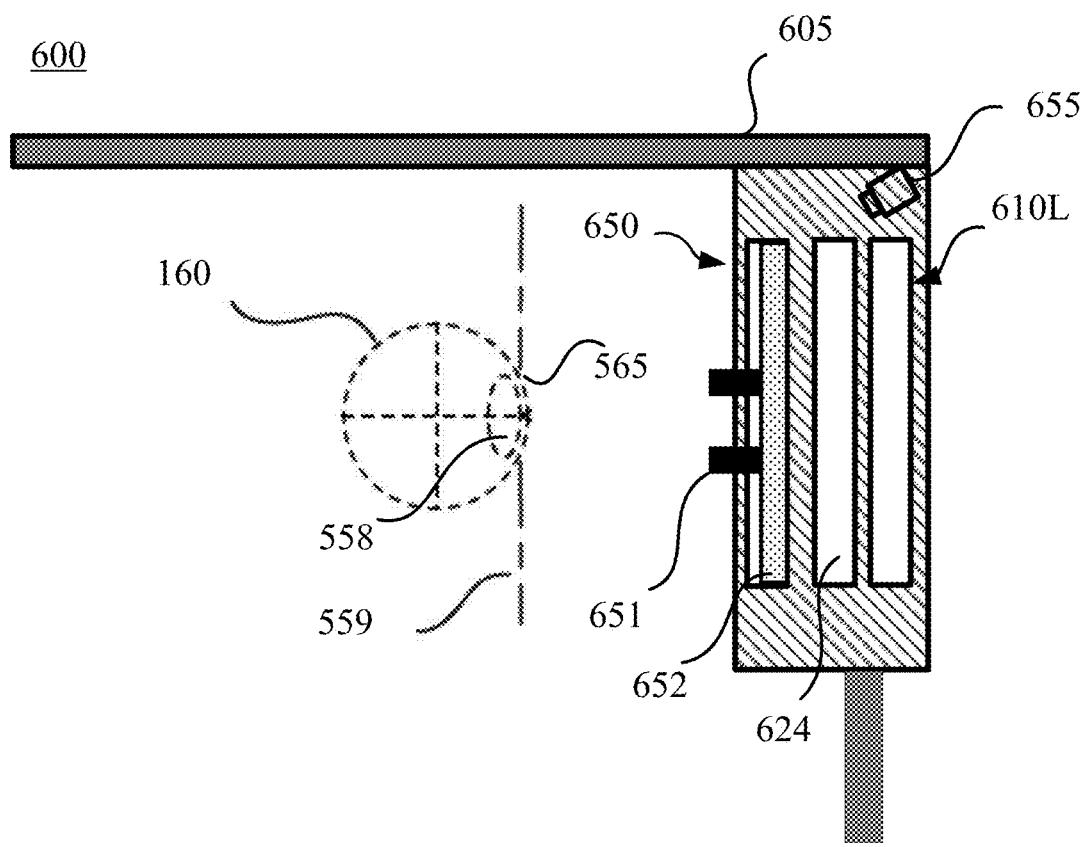
FIG. 6B illustrates a schematic cross sectional view of half of the artificial reality device shown in FIG. 6A, according to an embodiment of the present disclosure.

For discussion purposes, FIG. 6A shows that the artificial reality device 600 includes a frame 605 configured to mount to a user's head, and left-eye and right-eye display systems 610L and 610R mounted to the frame 605. FIG. 6B is a cross-sectional view of half of the artificial reality device 600 shown in FIG. 6A according to an embodiment of the present disclosure. For discussion purposes, FIG. 6B shows the cross-sectional view associated with the left-eye display system 610L. The frame 605 is merely an example structure to which various components of the artificial reality device 600 may be mounted. Other suitable type of fixtures may be used in place of or in combination with the frame 605.

In some embodiments, the left-eye and right-eye display systems 610L and 610R each may include suitable image display components configured to generate an image light representing a virtual image. In some embodiments, the left-eye and right-eye display systems 610L and 610R each may include suitable optical components configured to direct the image light toward the eye-box region 559. For example, in some embodiments, the left-eye and right-eye display systems 610L and 610R each may include a light guide display system, e.g., the system 500 shown in FIG. 5A.

In some embodiments, the artificial reality device 600 may also include a viewing optics system 624 disposed between the left-eye display system 610L or right-eye display system 610R and the eye-box region 559. The viewing optics system 624 may be configured to guide an image light (representing a computer-generated virtual image) output from the left-eye display system 610L or right-eye display system 610R to propagate through one or more exit pupils 557 within the eye-box region 559. In some embodiments, the viewing optics system 624 may also be configured to perform a suitable optical adjustment of an image light output from the left-eye display system 610L or right-eye display system 610R, e.g., correct aberrations in the image light, adjust a position of the focal point of the image light in the eye-box region 559, etc.

In some embodiments, as shown in FIG. 6B, the artificial reality device 600 may also include an object tracking system 650 (e.g., eye tracking system and/or face tracking system). The object tracking system 650 may include an IR light source 651 configured to illuminate the eye 660 and/or the face, a light deflecting element 652 configured to deflect the IR light reflected by the eye 660, and an optical sensor 655 configured to receive the IR light deflected by the deflecting element 652 and generate a tracking signal. A controller (e.g., one similar to controller 515 shown in FIG. 5A) may be included in the artificial reality device 600.

The present disclosure also provides processes for fabricating an LCPH element or device with a nonlinear azimuthal angle variation. FIGS. 7A-7F schematically illustrate processes for fabricating an LCPH element with a nonlinear azimuthal angle variation, according to an embodiment of the present disclosure. The fabrication processes shown in FIGS. 7A-7F may include holographic recording of an alignment pattern in a photo-alignment film, and aligning molecules of an anisotropic material (e.g., an LC material) by the photo-alignment film. The holographic recording of an alignment pattern in a photo-alignment film may also be referred to as surface recording. This alignment process may be referred to as a surface-mediated photo-alignment. For discussion purposes, the substrate and different layers, films, or structures formed thereon are shown as having flat surfaces. In some embodiments, the substrate and different layers or films or structures may have curved surfaces.

Figure 7A:
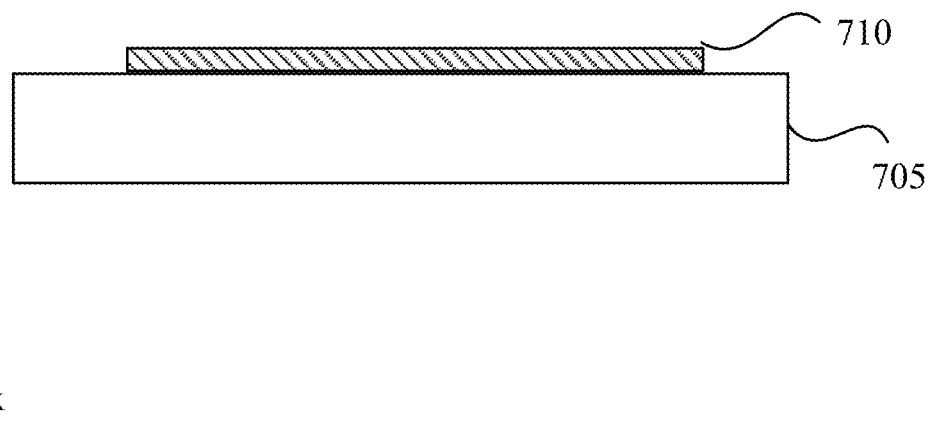
FIGS. 7A-7F schematically illustrate processes for fabricating an LCPH element, according to an embodiment of the present disclosure.

As shown in FIG. 7A, a recording medium layer 710 may be formed on a surface (e.g., a top surface) of a substrate 705 by dispensing, e.g., coating, printing, or depositing, a polarization sensitive material on the surface of the substrate 705. The recording medium layer 710 may include a polarization sensitive material, which is an optically recordable and polarization sensitive material (e.g., a photo-alignment material) configured to have a photo-induced optical anisotropy when exposed to a polarized light irradiation. Molecules (or fragments) and/or photo-products of the polarization sensitive material may be configured to generate an orientational ordering under a polarized light irradiation. In some embodiments, the polarization sensitive material may be dissolved in a solvent to form a solution. The solution may be dispensed on the substrate 705 using any suitable solution coating process, e.g., spin coating, slot coating, blade coating, spray coating, or jet (ink-jet) coating or printing. The solvent may be removed from the coated solution using a suitable process, e.g., drying, or heating, leaving the polarization sensitive material on the substrate 705 to form the recording medium layer 710.

Figure 7B:
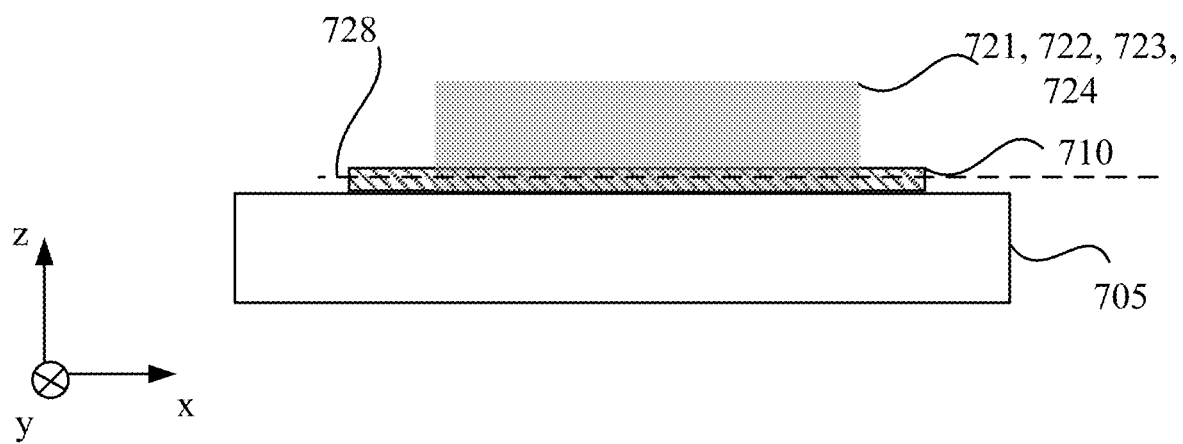

After the recording medium layer 710 is formed on the substrate 705, as shown in FIG. 7B, the recording medium layer 710 may be exposed to a polarization interference pattern (e.g., 720 shown in FIG. 7C) generated based on a plurality of recording beams 721-724, e.g. more than two recording beams. The recording beams 721-724 may be coherent circularly polarized beams, including at least one left-handed circularly polarized recording beam and at least one right-handed circularly polarized recording beam. For discussion purposes, FIG. 7B shows that four recording beams 721-724, e.g., two right-handed circularly polarized beams 721 and 722 and two left-handed circularly polarized beams 723 and 724, are used to generate the polarization interference pattern. In some embodiments, although not shown, three recording beams, or five recording beams, etc. may be used to generate the polarization interference pattern.

The recording beams 721-724 may have a wavelength within an absorption band of the recording medium layer 710, e.g., ultraviolet ("UV"), violet, blue, or green beams. In some embodiments, the recording beams 721-724 may be laser beams, e.g., UV, violet, blue, or green laser beams. In some embodiments, the superposition of the recording beams 721-724 may result in a superimposed wave that has a spatially uniform intensity and a spatially varying linear polarization direction. For example, the linear polarization direction of the superimposed wave may spatially vary within a spatial region in which the recording beams 721-724 interfere with one another. In other words, the superimposed wave may have a linear polarization with a polarization direction that is spatially varying within the spatial region in which the recording beams 721-724 interfere with one another.

Figure 7C:
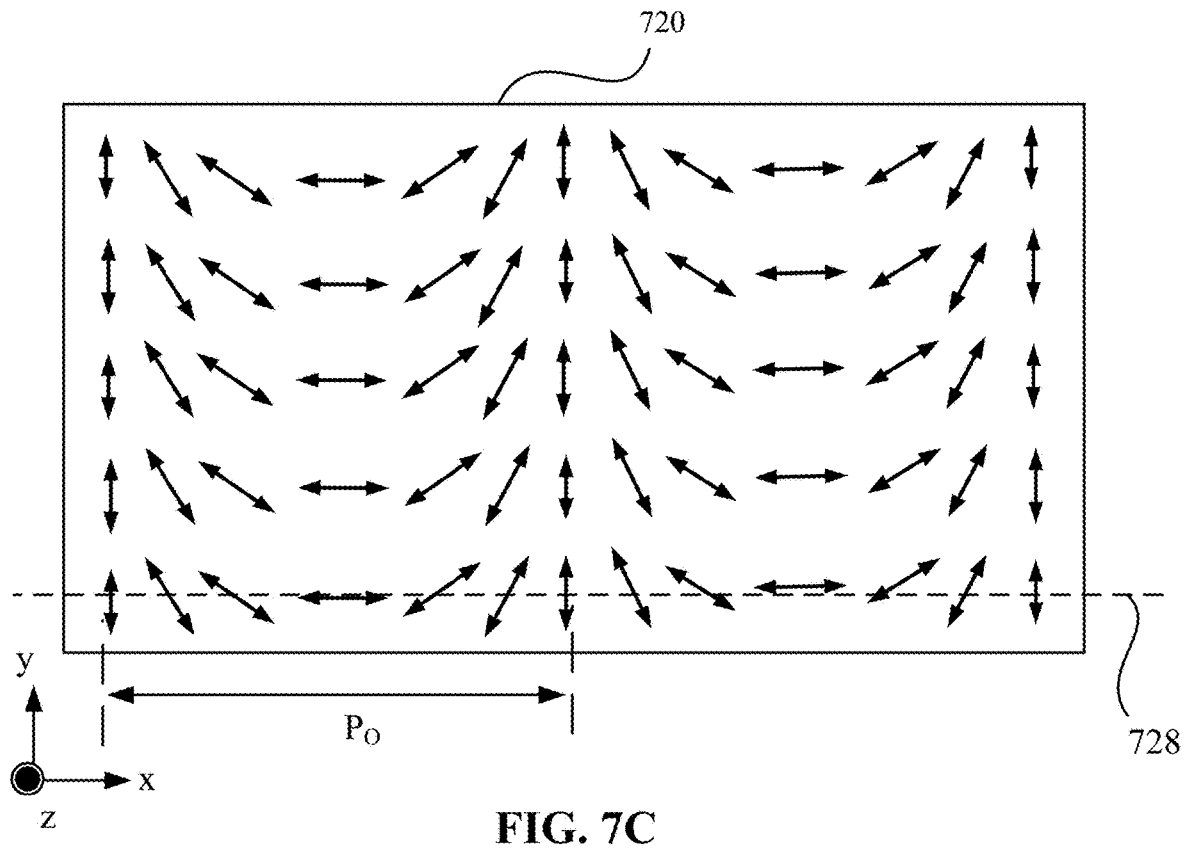

The superposition of the recording beams 721-724 may result in the polarization interference pattern 720 shown in FIG. 2C at the recording medium layer 710. The polarization interference pattern 720 may also be referred to as a pattern of the spatially varying orientation (or polarization direction) of the linear polarization of the superimposed wave, or a pattern of the varying linear polarization of the superimposed wave. As shown in FIG. 7C, the orientation (or polarization direction) of the linear polarization may periodically or non-periodically vary along at least one in-plane direction 728 within a surface of the recording medium layer 710, with a pitch $P_0$. In some embodiments, a pitch $P_0$ of the polarization interference pattern 720 may be referred to as a distance along the in-plane direction 728, over which the orientation (or polarization direction) of the linear polarization rotates by 180°. For discussion purposes, FIG. 7C shows that in the polarization interference pattern 720, the orientation (or polarization direction) of the linear polarization periodically varies along the in-plane direction 728 with the constant pitch $P_0$.

In some embodiments, the angles between the recording beams 721-724 may be configured, such that over the single pitch $P_0$ of the polarization interference pattern 720, the orientation (or polarization direction) of the linear polarization may be configured to rotate along the in-plane direction 728 in a predetermined nonlinear manner. For example, over the single pitch $P_0$ of the polarization interference pattern 720, an angle of the orientation (or polarization direction) of the linear polarization with respect to the in-plane direction 728 may be configured to vary along the in-plane direction 728 in a predetermined nonlinear manner (or according to a predetermined nonlinear function). For discussion purposes, the polarization interference pattern 720 may be referred to as a nonlinear polarization interference pattern 720.

In some embodiments, the nonlinear polarization interference pattern 720 may be resulted from a superposition of a first linear polarization interference pattern generated based on the right-handed circularly polarized recording beam 721 and the left-handed circularly polarized recording beam 723, and a second linear polarization interference pattern generated based on the right-handed circularly polarized recording beam 722 and the left-handed circularly polarized recording beam 724. For example, referring to FIG. 7B, the right-handed circularly polarized recording beam 721 and the left-handed circularly polarized recording beam 723 may interfere with one another to generate the first linear polarization interference pattern with a first pitch $P_1$ in the in-plane direction 728. Over a single first pitch $P_1$ of the first linear polarization interference pattern, an angle of the orientation (or polarization direction) of the linear polarization with respect to the in-plane direction 728 may be configured to vary along the in-plane direction 728 in a first predetermined linear manner (or according to a first predetermined linear function). In addition, the right-handed circularly polarized recording beam 722 and the left-handed circularly polarized recording beam 724 may interfere with one another to generate the second linear polarization interference pattern with a second pitch $P_2$ in the in-plane direction 728. Over a single second pitch $P_2$ of the second linear polarization interference pattern, an angle of the orientation (or polarization direction) of the linear polarization with respect to the in-plane direction 728 may be configured to vary along the in-plane direction 728 in a second predetermined linear manner (or according to a second predetermined linear function).

In some embodiments, a first angle formed between the right-handed circularly polarized recording beam 721 and the left-handed circularly polarized recording beam 723 may be configured to be different from a second angle formed between the right-handed circularly polarized recording beam 722 and the left-handed circularly polarized recording beam 724. Thus, the first pitch P1 of the first linear polarization interference pattern may be configured to be different from the second pitch $P_2$ of the second linear polarization interference pattern, and the first predetermined linear manner may be configured to be different from the first predetermined linear manner. A superposition of the first linear polarization interference pattern and the second linear polarization interference pattern may generate the nonlinear polarization interference pattern 720 shown in FIG. 7C.

Referring to FIGS. 7B and 7C, the recording medium layer 710 may be optically patterned when exposed to the polarization interference pattern 720 generated based on the recording beams 721-724 during the polarization interference exposure process. An orientation pattern of an optic axis of the recording medium layer 710 may be defined by the polarization interference pattern 720. In some embodiments, the recording medium layer 710 may include elongated anisotropic photo-sensitive units (e.g., small molecules or fragments of polymeric molecules). After being subjected to a sufficient exposure of the polarization interference pattern 720, local alignment directions of the anisotropic photo-sensitive units may be induced in the recording medium layer 710 by the polarization interference pattern 720, resulting in an alignment pattern (or in-plane modulation) of an optic axis of the recording medium layer 710 due to a photo-alignment of the anisotropic photo-sensitive units. After the recording medium layer 710 is optically patterned under the polarization interference pattern 720, the recording medium layer 710 may be referred to as a patterned recording medium layer with an alignment pattern.

Figure 7D:
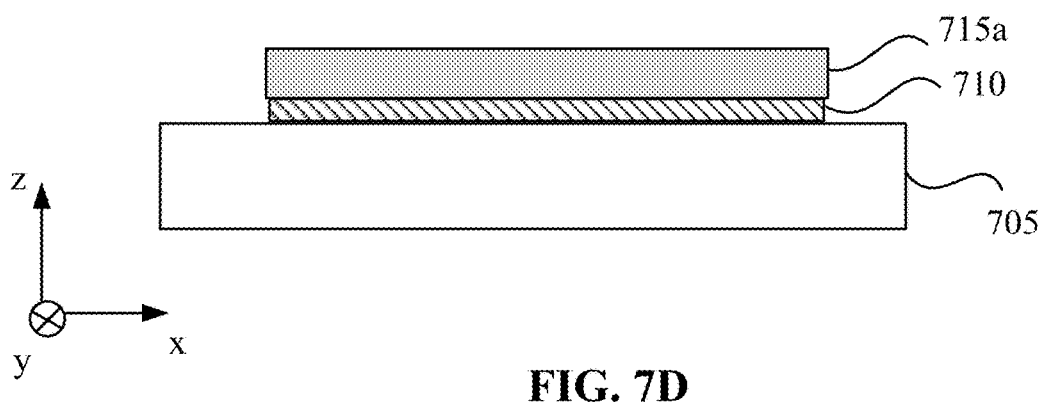

As shown in FIG. 7D, after the patterned recording medium layer 710 is formed, a first optically anisotropic film 715a may be formed on the patterned recording medium layer 710 by dispensing a birefringent medium onto the patterned recording medium layer 710. For example, a birefringent medium may be dissolved in a solvent to form a solution. A suitable amount of the solution may be dispensed (e.g., coated, printed, or sprayed, etc.) on the patterned recording medium layer 710 to form the first optically anisotropic film 715a. In some embodiments, the solution containing the birefringent medium may be dispensed on the patterned recording medium layer 710 using a suitable process, e.g., spin coating, slot coating, blade coating, spray coating, 3D printing, or jet (ink-jet) coating or printing, etc.

The birefringent medium may include a host birefringent material having an intrinsic birefringence, such as non-polymerizable LCs or polymerizable LCs (e.g., reactive mesogens ("RMs")), and a chiral dopant. The chiral dopant may twist the LC molecules in the host birefringent material to form helical twist structures. In some embodiments, the birefringent medium may also include or be mixed with other ingredients, such as solvents, initiators (e.g., photo-initiators or thermal initiators), or surfactants, etc. The chirality of the birefringent medium may be introduced by the chiral dopant doped into the host birefringent material.

The patterned recording medium layer 710 may be configured to provide a surface alignment to LC molecules in the first optically anisotropic film 715a, at least partially aligning the LC molecules located in close proximity to the patterned recording medium layer 710 in a predetermined non-uniform in-plane orientation pattern. For example, the LC molecules located in close proximity to the patterned recording medium layer 710 may be at least partially aligned along the local alignment directions of the anisotropic photo-sensitive units in the patterned recording medium layer 710 to form the predetermined non-uniform in-plane orientation pattern. Thus, the alignment pattern recorded in the patterned recording medium layer 710 (or the in-plane orientation pattern of the optic axis of the recording medium layer 710) may be transferred to the LC molecules located in close proximity to the patterned recording medium layer 710. Accordingly, the LC molecules located in close proximity to the patterned recording medium layer 710 may exhibit a nonlinear azimuthal angle variation along the in-plane direction 728. The patterned recording medium layer 710 may function as a photo-alignment material ("PAM") layer for the LC molecules located in close proximity to the patterned recording medium layer 710. Such an alignment procedure may be referred to as a surface-mediated photo-alignment.

Figure 7E:
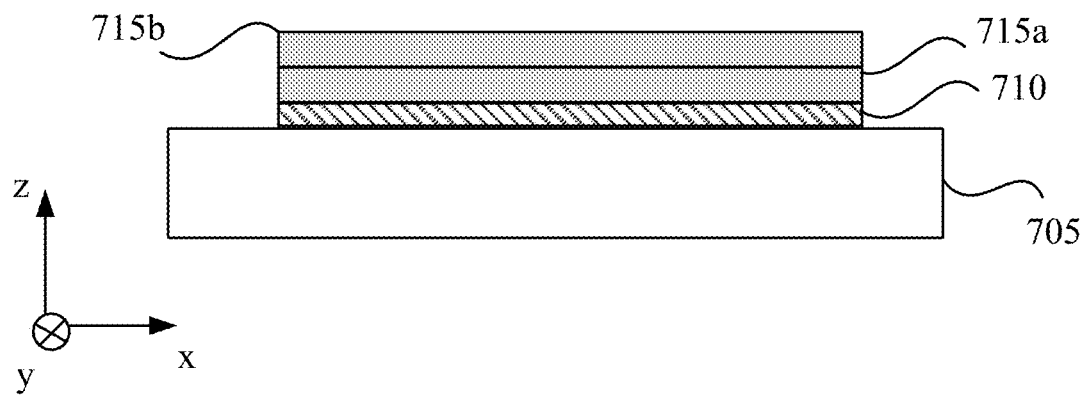

As shown in FIG. 7E, after the first optically anisotropic film 715a is formed on the patterned recording medium layer 710, a second optically anisotropic film 715b may be formed on the first optically anisotropic film 715a. The first optically anisotropic film 715a and the second optically anisotropic film 715b may be fabricated based on a similar birefringent medium, which includes a host birefringent material and a chiral dopant. Referring to FIGS. 7D and 7E, the chiral dopant included in the optically anisotropic film 715a or 715b may have a helical twisting power ("HTP") (unit: $\mu m^{-1}$), which is the ability of the chiral dopant to twist a host birefringent material. The HTP of the chiral dopant may exhibit a handedness, e.g., right-handedness or left-handedness. The helical pitch $P_h$ of helical twist structures formed in the optically anisotropic film 715a or 715b may be determined by, in part, the HTP of the chiral dopant and the weight concentration (or molar fraction) of the chiral dopant in the host birefringent material. In some embodiments, the helical pitch $P_h$ of the helical twist structures formed in the optically anisotropic film 715a or 715b may be inversely proportional to the HTP of the chiral dopant, and inversely proportional to the weight concentration (or molar fraction) of the chiral dopant in the host material. When the weight concentration of the chiral dopant is constant, a greater HTP of the chiral dopant may lead to a short helical pitch $P_h$ of the helical twist structures. When the HTP of the chiral dopant is constant, a greater weight concentration (or molar fraction) of the chiral dopant in the host birefringent material may lead to a short helical pitch $P_h$ of the helical twist structures.

In some embodiments, the chiral dopants included in the first optically anisotropic film 715a and the second optically anisotropic film 715b may be configured to have at least one difference in the HTP or the weight concentration, such that the helical twist structures formed in the first optically anisotropic film 715a and the second optically anisotropic film 715b may have different helical pitches $P_h$. In some embodiments, when the first optically anisotropic film 715a and the second optically anisotropic film 715b are fabricated to have the same predetermined thickness, due to the difference in the helical pitches $P_h$, the first optically anisotropic film 715a and the second optically anisotropic film 715b may exhibit different amounts of azimuthal angle variation of LC molecules over the same predetermined thickness.

For example, referring to FIG. 2H and FIG. 7E, the first optically anisotropic film 715a and the second optically anisotropic film 715b may be fabricated to have the same predetermined thickness of $0.25*P_B$ μm. From a lower surface of the first optically anisotropic film 715a to an interface between the first optically anisotropic film 715a and the second optically anisotropic film 715b, the azimuthal angle of the LC molecules in the first optically anisotropic film 715a may vary from 0° to 63° along the helical axis. From the interface between the first optically anisotropic film 715a and the second optically anisotropic film 715b to an upper surface of the second optically anisotropic film 715b, the azimuthal angle of the LC molecules in the first optically anisotropic film 715a may vary from 630 to 900 along the helical axis.

For discussion purposes, FIG. 7E merely illustrates two optically anisotropic films 715a and 715b, and additional optically anisotropic films may be successively formed on the second optically anisotropic film 715b. For example, the azimuthal angle of the LC molecules in a third optically anisotropic film may be configured to vary from 900 to 1170 along the helical axis, and the azimuthal angle of the LC molecules in a fourth optically anisotropic film may be configured to vary from 1170 to 1800 along the helical axis, and so on. The multiple optically anisotropic film may form an optically anisotropic layer, within a volume of which a nonlinear azimuthal angle variation of the LC molecules may be established.

Figure 7F:
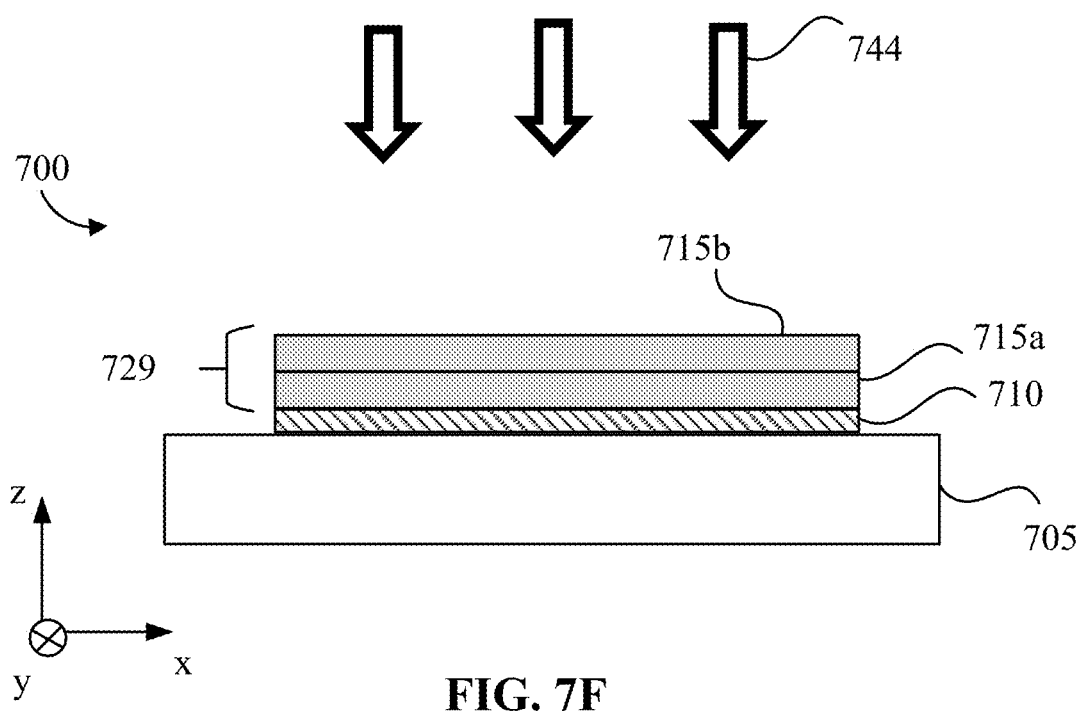

In some embodiments, as shown in FIG. 7F, the first optically anisotropic film 715a and the second optically anisotropic film 715b may be exposed to a polymerization irradiation 744 to form a polymerized optically anisotropic layer 729, thereby stabilizing the nonlinear azimuthal angle variation. In some embodiments, the exposure of the first optically anisotropic film 715a and the second optically anisotropic film 715b to the polymerization irradiation 744 may be carried out in air, in an inert atmosphere formed by, e.g., nitrogen, argon, carbon-dioxide, or in vacuum. The polymerization irradiation 744 may have a wavelength range within the absorption band of the photo-initiator, activating the photo-initiator to generate the polymerization initiating species. In some embodiments, the polymerization irradiation 744 may be an ultra-violet ("UV") irradiation.

For example, as shown in FIG. 7F, the first optically anisotropic film 715a and the second optically anisotropic film 715b may be exposed to a UV light beam (also referred to as 744 for discussion purposes). Under a sufficient exposure to the UV light beam 744, the birefringent material (e.g., RM monomers) in the first optically anisotropic film 715a and the second optically anisotropic film 715b may be polymerized or crosslinked to stabilize the orientations of the LC molecules, thereby stabilizing the nonlinear azimuthal angle variation. In some embodiments, although not shown, the first optically anisotropic film 715a may be exposed to the polymerization irradiation 744 to form a first polymerized optically anisotropic film first. Then the second optically anisotropic film 715b may be formed on the first polymerized optically anisotropic film, and exposed to the polymerization irradiation 744 to form a second polymerized optically anisotropic film.

FIG. 7F also illustrates an x-z view of an LCPH element 700 including the polymerized optically anisotropic layer 729. The LCPH element 700 may be a PVH element, and the polymerized optically anisotropic layer 729 may be a PVH layer, e.g., similar to the LCPH element 200 shown in FIG. 2A. In some embodiments, the substrate 705 and/or the alignment structure 710 may be used to fabricate, store, or transport the fabricated LCPH element 700. In some embodiments, the substrate 705 and/or the alignment structure 710 may be detachable or removable from the fabricated LCPH element 700 after the LCPH element 700 is fabricated or transported to another place or device. That is, the substrate 705 and/or the alignment structure 710 may be used in fabrication, transportation, and/or storage to support the LCPH element 700 provided on the substrate 705 and/or the alignment structure 710, and may be separated or removed from the LCPH element 700 when the fabrication of the LCPH element 700 is completed, or when the LCPH element 700 is to be implemented in an optical device. In some embodiments, the substrate 705 and/or the alignment structure 710 may not be separated from the LCPH element 700.

Figure 8A:
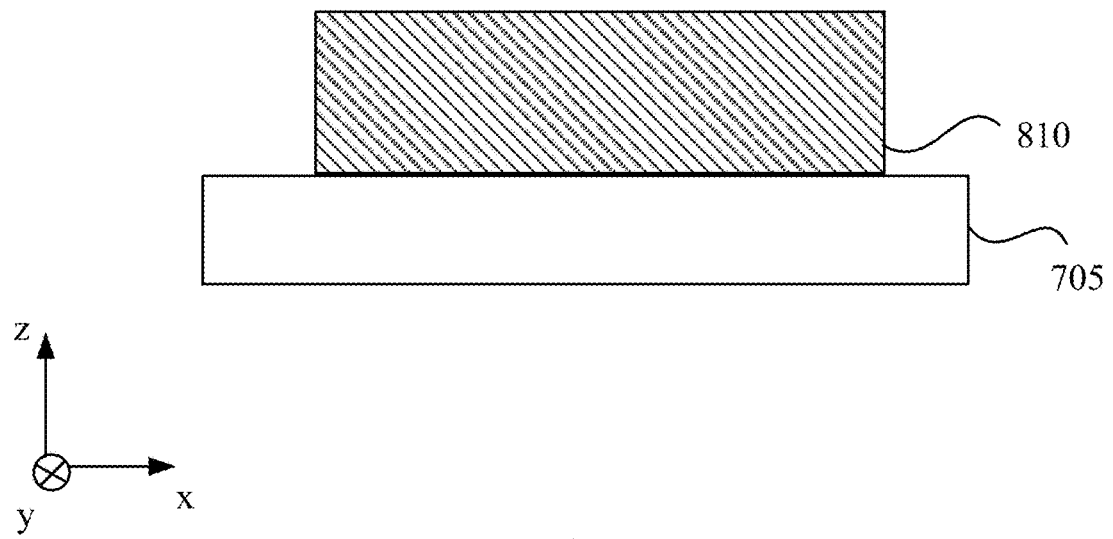
FIGS. 8A and 8B schematically illustrate processes for fabricating an LCPH element, according to an embodiment of the present disclosure.
Figure 8B:
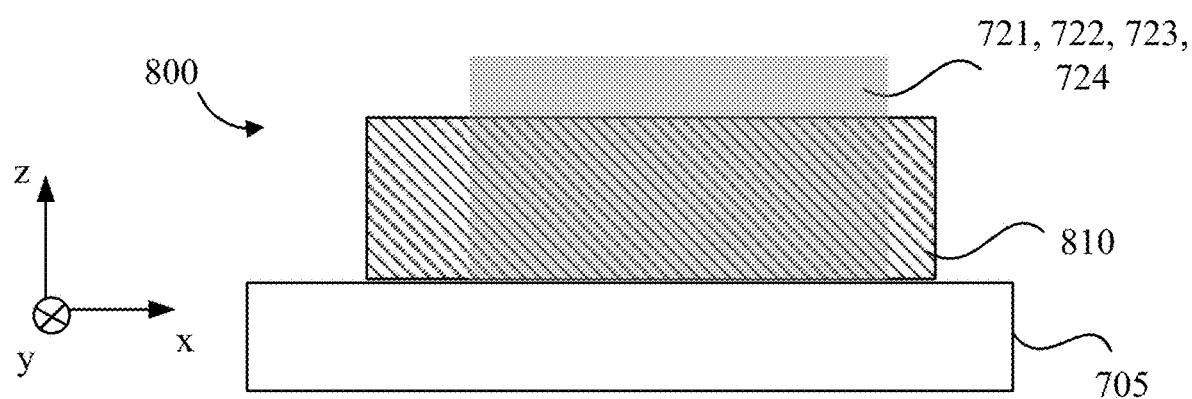

FIGS. 8A and 8B schematically illustrate processes for fabricating an LCPH element with a nonlinear azimuthal angle variation, according to an embodiment of the present disclosure. The fabrication processes shown in FIGS. 8A and 8B may include holographic recording and bulk-mediated photo-alignment (also referred to as volume recording). The fabrication processes shown in FIGS. 8A and 8B may include steps similar to those shown in FIGS. 7A-7F. The LCPH element fabricated based on the processes shown in FIGS. 8A and 8B may include elements similar to the LCPH element fabricated based on the processes shown in FIGS. 7A-7F. Descriptions of the similar steps and similar elements, structures, or functions can refer to the descriptions rendered above in connection with FIGS. 7A-7F. Although the substrate and layers are shown as having flat surfaces, in some embodiments, the substrate and layers formed thereon may have curved surfaces.

Similar to the embodiment shown in FIGS. 7A and 7B, the processes shown in FIGS. 8A and 8B may include dispensing (e.g., coating, depositing, etc.) a recording medium on a surface (e.g., a top surface) of the substrate 705 to form a recording medium layer 810. The recording medium may be a polarization sensitive recording medium. The recording medium may include an optically recordable and polarization sensitive material (e.g., a photo-alignment material) configured to have a photoinduced optical anisotropy when exposed to a polarized light irradiation. Molecules (or fragments) and/or photo-products of the optically recordable and polarization sensitive material may generate anisotropic angular distributions in a film plane of a layer of the recording medium under a polarized light irradiation. In some embodiments, the recording medium may include or be mixed with other ingredients, such as a solvent in which the optically recordable and polarization sensitive materials may be dissolved to form a solution, and photo-sensitizers. The solution may be dispensed on the substrate 705 using a suitable process, e.g., spin coating, slot coating, blade coating, spray coating, or jet (ink-jet) coating or printing. The solvent may be removed from the coated solution using a suitable process, e.g., drying, or heating, leaving the recording medium on the substrate 705.

After the recording medium layer 810 is formed on the substrate 705, as shown in FIG. 8B, the recording medium layer 810 may be exposed to a polarization interference pattern generated based on four recording beams 721-724. In some embodiments, although not shown, three recording beams, or five recording beams, etc., may be used to generate the polarization interference pattern. The recording medium layer 810 may be optically patterned after being exposed to the polarization interference pattern. An orientation pattern of an optic axis of the recording medium layer 810 in an exposed region may be defined by the polarization interference pattern.

In the embodiment shown in FIGS. 8A and 8B, the recording medium may include a photo-sensitive polymer. Molecules of the photo-sensitive polymer may include one or more polarization sensitive photo-reactive groups embedded in a main polymer chain or a side polymer chain. During the polarization interference exposure process of the recording medium layer 810, a photo-alignment of the polarization sensitive photo-reactive groups may occur within (or in, inside) a volume of the recording medium layer 810. That is, a 3D polarization field or 3D polarization variations generated by the interface of the recording beams 721-724 may be directly recorded within (or in, inside) the volume of the recording medium layer 810. In the embodiment shown in FIGS. 8A and 8B, a 3D orientation pattern of the optic axis may be directly recorded in the recording medium layer 810 via the bulk-mediated photo-alignment in an exposed region. A step of disposing an additional optically anisotropic layer on the patterned recording medium layer 810 may be omitted. The patterned recording medium layer 810 may function as an LCPH element 800.

The alignment procedure shown in FIG. 8B may be referred to as a bulk-mediated photo-alignment. The recording medium layer 810 for a bulk-mediated photo-alignment shown in FIG. 8B may be relatively thicker than the recording medium layer 710 for a surface-mediated photo-alignment shown in FIGS. 7A-7F. The recording medium included in the recording medium layer 810 for a bulk-mediated photo-alignment shown in FIG. 8B may also be referred to as a volume recording medium or bulk PAM.

In some embodiments, the photo-sensitive polymer included in the recording medium layer 810 may include an amorphous polymer, an LC polymer, etc. The molecules of the photo-sensitive polymer may include one or more polarization sensitive photo-reactive groups embedded in a main polymer chain or a side polymer chain. In some embodiments, the polarization sensitive photo-reactive group may include an azobenzene group, a cinnamate group, or a coumarin group, etc. In some embodiments, the photo-sensitive polymer may be an amorphous polymer, which may be initially optically isotropic prior to undergoing the polarization interference exposure process, and may exhibit an induced (e.g., photo-induced) optical anisotropy after being subjected to the polarization interference exposure process. In some embodiments, the photo-sensitive polymer may be an LC polymer, in which the birefringence and in-plane orientation pattern may be recorded due to an effect of photo-induced optical anisotropy. In some embodiments, the photo-sensitive polymer may be an LC polymer with a polarization sensitive cinnamate group embedded in a side polymer chain. In some embodiments, when the recording medium layer 810 includes an LC polymer, the patterned recording medium layer 810 may be heat treated (e.g., annealed) in a temperature range corresponding to a liquid crystalline state of the LC polymer to enhance the photo-induced optical anisotropy of the LC polymer (not shown in FIG. 8B).

Figure 9A:
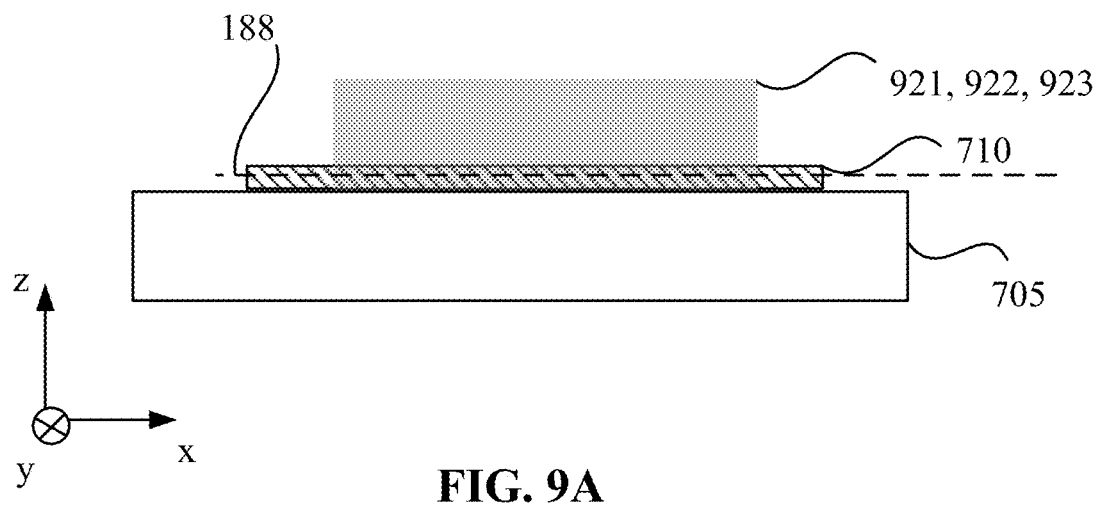
FIGS. 9A-9C schematically illustrate processes for fabricating an LCPH element, according to an embodiment of the present disclosure.
Figure 9B:
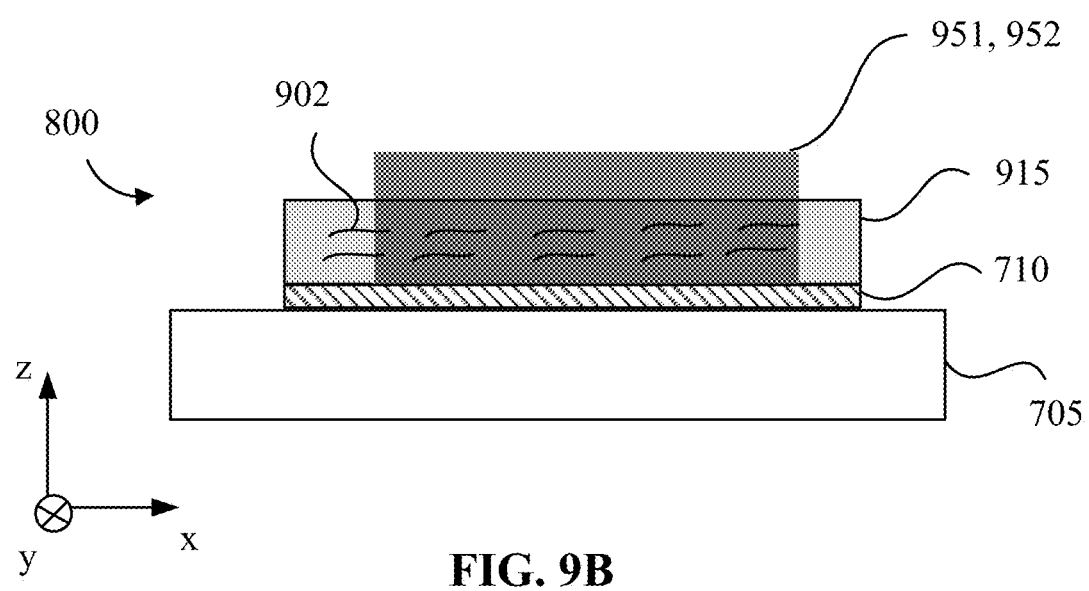
Figure 9C:
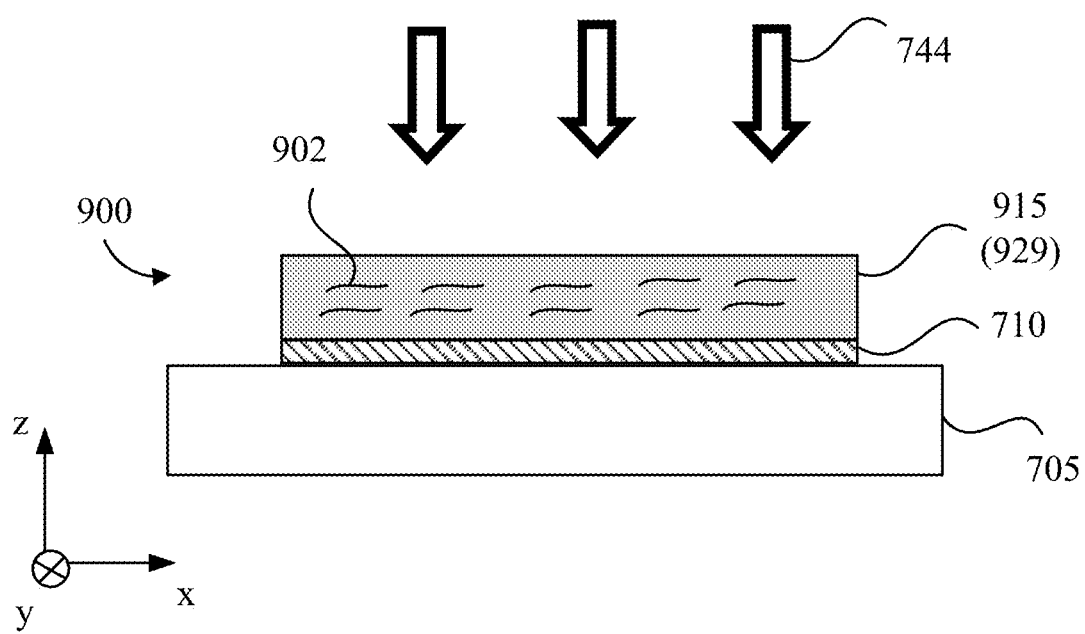

FIGS. 9A-9C schematically illustrate processes for fabricating an LCPH element with a nonlinear azimuthal angle variation, according to an embodiment of the present disclosure. The fabrication processes shown in FIGS. 9A-9C may include holographic recording and surface-mediated photo-alignment. The fabrication processes shown in FIGS. 9A-9C may include steps similar to those shown in FIGS. 7A-7F. The LCPH element fabricated based on the processes shown in FIGS. 9A-9C may include elements similar to the LCPH element fabricated based on the processes shown in FIGS. 7A-7F. Descriptions of the similar steps and similar elements, structures, or functions can refer to the descriptions rendered above in connection with FIGS. 7A-7F. Although the substrate and layers are shown as having flat surfaces, in some embodiments, the substrate and layers formed thereon may have curved surfaces.

Similar to the embodiment shown in FIGS. 7A and 7B, the processes shown in FIG. 9A may include dispensing (e.g., coating, depositing, etc.) a recording medium on a surface (e.g., a top surface) of the substrate 705 to form the recording medium layer 710. The recording medium layer 710 may be exposed to a nonlinear polarization interference pattern generated based on a plurality of recording beams 921-923. The recording beams 921-923 may be similar to the recording beams 721-724 shown in FIG. 7B. For example, the recording beams 921-923 may be coherent circularly polarized beams, including at least one left-handed circularly polarized recording beam and at least one right-handed circularly polarized recording beam. For discussion purposes, FIG. 9A shows that three recording beams 921-923, e.g., two right-handed circularly polarized beams 921 and 922 and a left-handed circularly polarized beam 923, are used to generate the nonlinear polarization interference pattern. In some embodiments, although not shown, four recording beams, or five recording beams, etc. may be used to generate the nonlinear polarization interference pattern.

In some embodiments, the nonlinear polarization interference pattern generated based on the recording beams 921-923 may result from a superposition of a first linear polarization interference pattern generated based on the right-handed circularly polarized recording beam 921 and the left-handed circularly polarized recording beam 923, and a second linear polarization interference pattern generated based on the right-handed circularly polarized recording beam 922 and the left-handed circularly polarized recording beam 923. For example, referring to FIG. 7B, the right-handed circularly polarized recording beam 921 and the left-handed circularly polarized recording beam 923 may interfere with one another to generate the first linear polarization interference pattern with a first pitch $P_1$ in the in-plane direction 728. Over a single first pitch $P_1$ of the first linear polarization interference pattern, an angle of the orientation (or polarization direction) of the linear polarization with respect to the in-plane direction 728 may be configured to vary along the in-plane direction 728 in a first predetermined linear manner (or according to a first predetermined linear function). In addition, the right-handed circularly polarized recording beam 922 and the left-handed circularly polarized recording beam 923 may interfere with one another to generate the second linear polarization interference pattern with a second pitch $P_2$ in the in-plane direction 728. Over a single second pitch $P_2$ of the second linear polarization interference pattern, an angle of the orientation (or polarization direction) of the linear polarization with respect to the in-plane direction 728 may be configured to vary along the in-plane direction 728 in a second predetermined linear manner (or according to a second predetermined linear function).

In some embodiments, a first angle formed between the right-handed circularly polarized recording beam 921 and the left-handed circularly polarized recording beam 923 may be configured to be different from a second angle formed between the right-handed circularly polarized recording beam 922 and the left-handed circularly polarized recording beam 923. Thus, the first pitch $P_1$ of the first linear polarization interference pattern may be configured to be different from the second pitch $P_2$ of the second linear polarization interference pattern, and the first predetermined linear manner may be configured to be different from the first predetermined linear manner. A superposition of the first linear polarization interference pattern and the second linear polarization interference pattern may generate the nonlinear polarization interference pattern.

Similar to the processes shown in FIG. 7D, the processes shown in FIG. 9B may include forming an optically anisotropic layer 915 on the patterned recording medium layer 710 by dispensing a birefringent medium onto the patterned recording medium layer 710. The birefringent medium forming the optically anisotropic layer 915 may be similar to the birefringent medium forming the optically anisotropic film 715*a* shown in FIG. 7D. For example, the birefringent medium may include a host birefringent material having an intrinsic birefringence, such as non-polymerizable LCs or polymerizable LCs (e.g., RMs), and a photo-responsive chiral dopant 902. The patterned recording medium layer 710 may be configured to provide a surface alignment to LC molecules in the optically anisotropic layer 915. Accordingly, the LC molecules located in close proximity to the patterned recording medium layer 710 may exhibit a nonlinear azimuthal angle variation along the in-plane direction 728.

The photo-responsive chiral dopant 902 may twist the LC molecules in the host birefringent material to form helical twist structures. The photo-responsive chiral dopant 902 may have a photo-responsive HTP, which may vary upon being exposed to a light irradiation of a suitable wavelength range, due to the photo-isomerization of the photo-responsive chiral dopant 902. The HTP of the photo-responsive chiral dopant 902 may vary (e.g., increase, decrease, or reverse the handedness) as the degree of the photo-isomerization of the photo-responsive chiral dopant 902 varies. In some embodiments, the photo-isomerization of the photo-responsive chiral dopant 902 may be reversible. The light irradiation used for varying the HTP of the photo-responsive chiral dopant 902 (or to which the photo-responsive chiral dopant 902 is sensitive) may be referred to as a stimulus irradiation.

The stimulus irradiation may only activate the stimuli-responsive chiral dopant 902 to change the HTP, and may not activate the photo-initiator (if included in the birefringent medium) to generate the polymerization initiating species. The wavelength (or wavelength range) of the stimulus irradiation may be within (or correspond to) the UV wavelength range, the visible wavelength range, the infrared wavelength range, or a combination thereof, depending on different types of photo-responsive chiral dopants. In some embodiments, the photo-responsive chiral dopant 902 may undergo different degrees of photo-isomerization in response to stimulus irradiations having different light intensities. In some embodiments, the photo-responsive chiral dopant 902 may include azobenzene, diarylethene overcrowded alkene, spirooxazine, fulgide, α,β-unsaturated ketone, naphthopyran, or a combination thereof.

As shown in FIG. 9B, the optically anisotropic layer 915 may be exposed to an intensity interference pattern generated based on two recording beams 951 and 952. The recording beams 951 and 952 may be coherent polarized beams having the same polarization, e.g., the recording beams 951 and 952 may be two linearly polarized beams with the same linear polarization direction, or two circularly polarized beams with the same handedness. The recording beams 951 and 952 may have a wavelength range to which the photo-responsive chiral dopant 902 is sensitive. In some embodiments, the interference of the recording beams 951 and 952 may result in an intensity interference pattern that has a spatially constant polarization and a spatially varying intensity, within a spatial region in which the recording beams 951 and 952 interfere with one another. That is, the intensity interference pattern may exhibit a 3D intensity variations within the spatial region in which the recording beams 951 and 952 interfere with one another. The intensity interference pattern having the 3D intensity variations may function as the stimulus irradiation for the photo-responsive chiral dopant 902.

During the intensity interference pattern exposure of the optically anisotropic layer 915, the photo-responsive chiral dopant 902 distributed within the volume of the optically anisotropic layer 915 may undergo different degrees of photo-isomerization in response to the intensity interference pattern having the 3D intensity variations, resulting in 3D helical twisting power variations of the photo-responsive chiral dopant 902 within the volume of the optically anisotropic layer 915. When the weight concentration of the photo-responsive chiral dopant 902 is presumed to be constant across the optically anisotropic layer 915, the 3D helical twisting power variations of the photo-responsive chiral dopant 902 may result in 3D helical pitch variations of the helical twist structures within the volume of the optically anisotropic layer 915. In some embodiments, through configuring the two recording beams 951 and 952, the 3D helical pitch variations of the helical twist structures within the volume of the optically anisotropic layer 915 may be configured, which may result in a predetermined nonlinear azimuthal angle variation of the LC molecules along the helical axis of the helical twist structures.

In some embodiments, as shown in FIG. 9C, after the intensity interference pattern exposure, the optically anisotropic layer 915 may be exposed to the polymerization irradiation 744 to form a polymerized optically anisotropic layer 929, thereby stabilizing the nonlinear azimuthal angle variation. Referring to FIGS. 9B and 9C, the polymerization irradiation 744 may be different from the stimulus irradiation generated by the recording beams 951 and 952. The stimulus irradiation may only activate the photo-responsive chiral dopant 902 to change the HTP thereof, and may not activate the photo-initiator to generate the polymerization initiating species. That is, the photo-initiator may not respond to the stimulus irradiation, and the stimulus irradiation may not cause the polymerization of the RM material in the optically anisotropic layer 915. The polymerization irradiation 744 may only activate the photo-initiator to generate the polymerization initiating species, and may not activate the photo-responsive chiral dopant 902 to vary the HTP. That is, the photo-responsive chiral dopant 902 may not respond to the polymerization irradiation, and the polymerization irradiation may not change the HTP of the photo-responsive chiral dopant 902.

FIGS. 10A and 10B are flowcharts illustrating various methods for fabricating an LCPH element with a nonlinear azimuthal angle variation, according to various embodiments of the present disclosure. FIG. 10A is a flowchart illustrating a method 1000 for fabricating an LCPH element with a nonlinear azimuthal angle variation, according to an embodiment of the present disclosure. As shown in FIG. 10A, the method 1000 may include generating at least three circularly polarized beams, where the at least three circularly polarized beams include one or more left-handed circularly polarized beams and one or more right-handed circularly polarized beams, and the at least three circularly polarized beams are configured to interfere with one another to generate a polarization interference pattern (step 1010). The method 1000 may also include exposing a polarization sensitive recording medium to the polarization interference pattern, where optically anisotropic molecules in the polarization sensitive recording medium that has been exposed to the polarization interference pattern form an in-plane orientation pattern (step 1015). In some embodiments, within an in-plane pitch of the in-plane orientation pattern, azimuthal angles of optically anisotropic molecules vary nonlinearly along a predetermined in-plane direction of the in-plane orientation pattern.

In some embodiments, the at least three circularly polarized beams may include a first beam, a second beam, and a third beam, and a first angle formed between the first beam and the second beam is different from a second angle formed between the second beam and the third beam. In some embodiments, the polarization sensitive recording medium may include a bulk photo-alignment material, and exposing the polarization sensitive recording medium to the polarization interference pattern may result in the polarization interference pattern being recorded in the bulk photo-alignment material.

FIG. 10B is a flowchart illustrating a method 1030 for fabricating an LCPH element with a nonlinear azimuthal angle variation, according to an embodiment of the present disclosure. The method 1030 may include generating a plurality of polarized beams, where the plurality of polarized beams include at least three circularly polarized beams, the at least three circularly polarized beams include one or more left-handed circularly polarized beams and one or more right-handed circularly polarized beams, and the at least three circularly polarized beams are configured to interfere with one another to generate a polarization interference pattern (step 1035). The method 1030 may also include exposing a polarization sensitive recording medium to the polarization interference pattern (step 1040). The method 1030 may also include forming an optically anisotropic film on the polarization sensitive recording medium that has been exposed to the polarization interference pattern, where the optically anisotropic film includes a mixture of a host birefringent material and a chiral dopant (step 1045).

In some embodiments, the polarization sensitive recording medium may include a surface photo-alignment material. In some embodiments, the optically anisotropic film may be a first optically anisotropic film, the mixture may be a first mixture of the host birefringent material and a first chiral dopant, and the first chiral dopant may have a first helical twisting power and a first weight concentration in the first mixture. The method 1030 may further include forming a second optically anisotropic film on the first optically anisotropic film. The second optically anisotropic film may include a second mixture of the host birefringent material and a second chiral dopant, and the second chiral dopant may have a second helical twisting power and a second weight concentration in the second mixture. The first chiral dopant and the second chiral dopant may be configured to have at least one difference in the first helical twisting power and the second helical twisting power or in the first weight concentration and the second weight concentration. In some embodiments, the method 1030 may further include exposing the first optically anisotropic film and the second optically anisotropic film to a polymerization irradiation.

In some embodiments, the chiral dopant may include a photo-responsive chiral dopant, and the plurality of polarized beams are a first plurality of polarized beams, the method 1030 may also include: generating a second plurality of polarized beams, where the second plurality of polarized beams include two polarized beams configured to interfere with one another to generate an intensity interference pattern within a spatial region in which the optically anisotropic film is disposed. The method 1030 may also include exposing the optically anisotropic film to the intensity interference pattern. In some embodiments, the method may further include exposing the optically anisotropic film to a polymerization irradiation.

In some embodiments, the present disclosure provides a device. The device includes a light guide configured to provide total internal reflection to a first light propagating therein; and an optical film coupled with the light guide, azimuthal angles of optically anisotropic molecules in the optical film being configured to vary nonlinearly along a helical axis of helical structures formed in the optical film. The optical film is configured to reflect the first light as a plurality of second lights from a plurality of locations of the optical film, with a plurality of different reflection efficiencies. In some embodiments, in the optical film, over a helical pitch of a helical structure, an azimuthal angle of an optically anisotropic molecule varies according to a nonlinear function of an amplitude parameter A, a Bragg period $P_B$ of the optical film, and a distance z of the optically anisotropic molecule located along the helical axis from a starting point of the helical pitch, and the amplitude parameter A is configured to have a plurality of different values at the plurality of locations of the optical film.

In some embodiments, in the optical film, over a helical pitch of a helical structure, an azimuthal angle of an optically anisotropic molecule is configured to vary nonlinearly with respect to a distance from a starting point of the helical pitch to a local point at which the optically anisotropic molecule is located along the helical axis. The helical pitch is a distance along the helical axis over which the azimuthal angle of the optically anisotropic molecule vary by a predetermined value. In some embodiments, over the helical pitch of the helical structure, the azimuthal angle of the optically anisotropic molecule located at the starting point of the helical pitch is zero degree, and the predetermined value associated with the helical pitch is 180 degrees. In some embodiments, over the helical pitch of the helical structure, the azimuthal angle of the optically anisotropic molecule varies according to a function $$\varphi(z) = 180° * \frac{z}{P_B} + f\left(A, \frac{z}{P_B}\right),$$

where $\varphi$ is the azimuthal angle of the optically anisotropic molecule, z is the distance from the starting point of the helical pitch to the local point at which the optically anisotropic molecule is located along the helical axis, and $P_B$ is a Bragg period $$180° * \frac{z}{P_B}$$

is a linear function of $$z, f\left(A, \frac{z}{P_B}\right)$$

is a nonlinear function of z, and A is an amplitude parameter of the nonlinear function and is a positive value smaller than or equal to 360°. In some embodiments, the nonlinear function $$f\left(A, \frac{z}{P_B}\right) \text{ is } f\left(A, \frac{z}{P_B}\right) = A * \text{Sin}\left(360° * \frac{z}{P_B}\right),$$

and the function $$\varphi(z) \text{ is } \varphi(z) = 180° * \frac{z}{P_B} + A * \text{Sin}\left(360° * \frac{z}{P_B}\right).$$

In some embodiments, the plurality of second lights output from the plurality of locations of the optical film are distributed along a pupil expansion direction of the device, and the amplitude parameter A of the nonlinear function is configured to decrease along the pupil expansion direction of the device.

In some embodiments, the optical film includes a reflective polarization volume hologram layer, and the optically anisotropic molecules located in close proximity to a surface of the optical film are configured in a non-uniform in-plane orientation pattern with an in-plane pitch along a predetermined in-plane direction, the in-plane pitch being defined as a distance along the predetermined in-plane direction over which the azimuthal angles of the optically anisotropic molecules located in close proximity to the surface of the optical film vary by 180°. In some embodiments, the in-plane pitch is a constant pitch or a varying pitch. In some embodiments, over the in-plane pitch of the non-uniform in-plane orientation pattern, the azimuthal angle of the optically anisotropic molecule located in close proximity to the surface of the optical film is configured to vary nonlinearly with respect to a distance from a starting point of the in-plane pitch to a local point at which the optically anisotropic molecule is located along the predetermined in-plane direction. In some embodiments, over the in-plane pitch of the non-uniform in-plane orientation pattern, the azimuthal angle of the optically anisotropic molecule located at the starting point of the in-plane pitch is zero degree. In some embodiments, over the in-plane pitch of the non-uniform in-plane orientation pattern, the azimuthal angle of the optically anisotropic molecule located in close proximity to the surface of the optical film varies according to a function $$\varphi(x) = 180° * \frac{x}{P_{in}} + f\left(A, \frac{x}{P_{in}}\right),$$

where $\varphi$ is the azimuthal angle of the optically anisotropic molecule, x is the distance from the starting point of the in-plane pitch to the local point at which the optically anisotropic molecule is located along the predetermined in in-plane axis, and $P_{in}$ is the in-plane pitch $$180° * \frac{x}{P_{in}}$$

is a linear function of $$x, f\left(A, \frac{x}{P_{in}}\right)$$

is a nonlinear function of x, and A is an amplitude parameter of the nonlinear function and is a positive value smaller than or equal to 360°. In some embodiments, the nonlinear function $f\left(A, \frac{x}{P_{in}}\right)$ is $f\left(A, \frac{x}{P_{in}}\right) = A * \mathrm{Sin}\left(360° * \frac{x}{P_{in}}\right)$, and the function φ(x) is $$\varphi(x) = 180° * \frac{x}{P_{in}} + A * \mathrm{Sin}\left(360° * \frac{x}{P_{in}}\right).$$

In some embodiments, the plurality of second lights output from the plurality of locations of the optical film are distributed along a pupil expansion direction of the device, and the amplitude parameter A of the nonlinear function is configured to decrease along the pupil expansion direction of the device.

In some embodiments, the optical film is configured to couple, via reflection, the first light out of the light guide as the plurality of second lights. In some embodiments, the device further includes an out-coupling element coupled with the light guide, the optical film is configured to reflect the first light as the plurality of second lights propagating toward the out-coupling element, and the out-coupling element is configured to couple the plurality of second lights out of the light guide as a plurality of third lights. In some embodiments, the optical film includes a cholesteric liquid crystal ("CLC") layer, and the optically anisotropic molecules located in close proximity to a surface of the optical film are configured in a uniform in-plane orientation pattern.

In some embodiments, the present disclosure provides a method. The method includes generating at least three circularly polarized beams. The at least three circularly polarized beams include one or more left-handed circularly polarized beams and one or more right-handed circularly polarized beams, and the at least three circularly polarized beams are configured to interfere with one another to generate a polarization interference pattern. The method also includes exposing a polarization sensitive recording medium to the polarization interference pattern. Optically anisotropic molecules in the polarization sensitive recording medium that has been exposed to the polarization interference pattern form an in-plane orientation pattern, and azimuthal angles of optically anisotropic molecules vary nonlinearly along a predetermined in-plane direction of the in-plane orientation pattern.

In some embodiments, at least three circularly polarized beams include a first beam, a second beam, and a third beam, and a first angle formed between the first beam and the second beam is different from a second angle formed between the second beam and the third beam. In some embodiments, the polarization sensitive recording medium includes a bulk photo-alignment material, and exposing the polarization sensitive recording medium to the polarization interference pattern results in the polarization interference pattern being recorded in the bulk photo-alignment material.

In some embodiments, the polarization sensitive recording medium includes a surface photo-alignment material, and after exposing the polarization sensitive recording medium to the polarization interference pattern, the method further includes forming an optically anisotropic film based on a mixture of a host birefringent material and a chiral dopant on the polarization sensitive recording medium. In some embodiments, the optically anisotropic film based on the mixture of the host birefringent material and the chiral dopant is a first optically anisotropic film based on a first mixture of the host birefringent material and a first chiral dopant, the first chiral dopant having a first helical twisting power and a first weight concentration in the first mixture, and the method further includes: forming a second optically anisotropic film based on a second mixture of the host birefringent material and a second chiral dopant on the first optically anisotropic film, the second chiral dopant having a second helical twisting power and a second weight concentration in the second mixture. The first chiral dopant and the second chiral dopant are configured to have at least one difference in the first helical twisting power and the second helical twisting power or in the first weight concentration and the second weight concentration. In some embodiments, the method further includes exposing the first optically anisotropic film and the second optically anisotropic film to a polymerization irradiation.

In some embodiments, the chiral dopant includes a photo-responsive chiral dopant, and the plurality of polarized beams are a first plurality of polarized beams, the method further includes: directing a second plurality of polarized beams toward the optically anisotropic film, the second plurality of polarized beams include two polarized beams configured to interfere with one another to generate an intensity interference pattern within a spatial region in which the optically anisotropic film is disposed; and exposing the optically anisotropic film to the intensity interference pattern. In some embodiments, the method further includes exposing the optically anisotropic film to a polymerization irradiation.

In some embodiments, the present disclosure provides a device. The device includes a light guide configured to guide a first light propagating therein; and an optical film coupled with the light guide, optically anisotropic molecules in the optical film being configured with an in-plane orientation pattern. Azimuthal angles of the optically anisotropic molecules are configured to vary nonlinearly along a predetermined in-plane direction of the in-plane orientation pattern. The optical film is configured to diffract the first light as a plurality of second lights at a plurality of locations of the optical film, with a plurality of predetermined, different diffraction efficiencies. In some embodiments, the optical film includes a polarization volume hologram. In some embodiments, an azimuthal angle of an optically anisotropic molecule is configured to vary according to a nonlinear function of an amplitude parameter A, an in-plane pitch of the in-plane orientation pattern, and a location of the optically anisotropic molecule, and the amplitude parameter A is configured to have a plurality of different values at the plurality of locations of the optical film. In some embodiments, the plurality of second lights are distributed along a pupil expansion direction of the device, the amplitude parameter A of the nonlinear function is configured to decrease along the pupil expansion direction, and the plurality of predetermined different diffraction efficiencies are configured to increase along the pupil expansion direction.

In some embodiments, over an in-plane pitch of the in-plane orientation pattern along the predetermined in-plane direction, an azimuthal angle of an optically anisotropic molecule is configured to vary nonlinearly with respect to a distance from a starting point of the in-plane pitch to a local point at which the optically anisotropic molecule is located along the predetermined in-plane direction. In some embodiments, the in-plane pitch is defined as a distance along the predetermined in-plane direction over which the azimuthal angles of the optically anisotropic molecules vary by 180 degrees, and the azimuthal angle of the optically anisotropic molecule located at the starting point of the in-plane pitch is zero degree. In some embodiments, over the in-plane pitch of the in-plane orientation pattern, the azimuthal angle of the optically anisotropic molecule varies according to a function $$\varphi(x) = 180° * \frac{x}{P_{in}} + f\left(A, \frac{x}{P_{in}}\right),$$

φ is the azimuthal angle of the optically anisotropic molecule, x is the distance from the starting point of the in-plane pitch to the local point, and $P_{in}$ is the in-plane pitch $$180° * \frac{x}{P_{in}}$$

is a linear function of $$x, f\left(A, \frac{x}{P_{in}}\right),$$

is a nonlinear function of x, and A is the amplitude parameter of the nonlinear function and is a positive value smaller than or equal to 360°. In some embodiments, the nonlinear function $$f\left(A, \frac{x}{P_{in}}\right) \text{ is } f\left(A, \frac{x}{P_{in}}\right) = A * \text{Sin}\left(360° * \frac{x}{P_{in}}\right),$$

and the function φ(x) is $$\varphi(x) = 180° * \frac{x}{P_{in}} + A * \text{Sin}\left(360° * \frac{x}{P_{in}}\right).$$

In some embodiments, the optically anisotropic molecules form a plurality of helical structures within a volume of the optical film, and the azimuthal angles of the optically anisotropic molecules are configured to vary nonlinearly along a helical axis of the helical structures. In some embodiments, an azimuthal angle of an optically anisotropic molecule varies according to a nonlinear function of an amplitude parameter A, a Bragg period $P_B$ of the optical film, and a position of the optically anisotropic molecule located along the helical axis, and the amplitude parameter A is configured to have a plurality of different values at the plurality of locations of the optical film. In some embodiments, over a helical pitch of the helical structure, the azimuthal angle of the optically anisotropic molecule is configured to vary nonlinearly with respect to a distance from a starting point of the helical pitch to a local point at which the optically anisotropic molecule is located along the helical axis. In some embodiments, the helical pitch is a distance along the helical axis over which the azimuthal angle of the optically anisotropic molecule vary by 360°, and the azimuthal angle of the optically anisotropic molecule located at the starting point of the helical pitch is zero degree. In some embodiments, over the helical pitch of the helical structure, the azimuthal angle of the optically anisotropic molecule varies according to a function $$\varphi(z) = 180° * \frac{z}{P_B} + f\left(A, \frac{z}{P_B}\right),$$

wherein φ is the azimuthal angle of the optically anisotropic molecule, z is the distance from the starting point of the helical pitch to the local point, and $P_B$ is a Bragg period $$180° * \frac{z}{P_B}$$

is a linear function of $$z, f\left(A, \frac{z}{P_B}\right)$$

is a nonlinear function of z, and A is an amplitude parameter of the nonlinear function and is a positive value smaller than or equal to 360°. In some embodiments, the nonlinear function $$f\left(A, \frac{z}{P_B}\right) \text{ is } f\left(A, \frac{z}{P_B}\right) = A * \text{Sin}\left(360° * \frac{z}{P_B}\right),$$

and the function $$\varphi(z) \text{ is } \varphi(z) = 180° * \frac{z}{P_B} + A * \text{Sin}\left(360° * \frac{z}{P_B}\right).$$

In some embodiments, optical film is configured to diffract the first light out of the light guide as the plurality of second lights. In some embodiments, the device further includes an out-coupling element coupled with the light guide, wherein the optical film is configured to diffract the first light as the plurality of second lights propagating toward the out-coupling element, and wherein the out-coupling element is configured to couple the plurality of second lights out of the light guide as a plurality of third lights.

In some embodiments, the present disclosure provides a method. The method includes generating at least three circularly polarized beams, wherein the at least three circularly polarized beams include one or more left-handed circularly polarized beams and one or more right-handed circularly polarized beams, and the at least three circularly polarized beams are configured to interfere with one another to generate a polarization interference pattern. The method includes exposing a polarization sensitive recording medium to the polarization interference pattern to align optically anisotropic molecules in the polarization sensitive recording medium to form an in-plane orientation pattern, wherein azimuthal angles of the aligned optically anisotropic molecules vary nonlinearly along a predetermined in-plane direction of the in-plane orientation pattern. In some embodiments, at least three circularly polarized beams include a first beam, a second beam, and a third beam, and a first angle formed between the first beam and the second beam is different from a second angle formed between the second beam and the third beam. In some embodiments, the polarization sensitive recording medium includes a bulk photo-alignment material, and exposing the polarization sensitive recording medium to the polarization interference pattern results in the polarization interference pattern being recorded in the bulk photo-alignment material.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Further, when an embodiment illustrated in a drawing shows a single element, it is understood that the embodiment or an embodiment not shown in the figures but within the scope of the present disclosure may include a plurality of such elements. Likewise, when an embodiment illustrated in a drawing shows a plurality of such elements, it is understood that the embodiment or an embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
a light guide configured to guide a first light propagating therein; and
an optical film coupled with the light guide, optically anisotropic molecules in the optical film being configured with an in-plane orientation pattern having a constant in-plane pitch along a predetermined in-plane direction,
wherein within the in-plane pitch of the in-plane orientation pattern, azimuthal angles of the optically anisotropic molecules are configured to vary nonlinearly along the predetermined in-plane direction, and
wherein the optical film is configured to diffract the first light as a plurality of second lights at a plurality of locations of the optical film, with a plurality of predetermined different diffraction efficiencies.

2. The device of claim 1, wherein the optical film includes a polarization volume hologram.

3. The device of claim 1, wherein
the azimuthal angles of the optically anisotropic molecules are configured to vary nonlinearly and periodically along the predetermined in-plane direction of the in-plane orientation pattern;
within the in-plane pitch of the in-plane orientation pattern, an azimuthal angle of an optically anisotropic molecule is configured to vary according to a nonlinear function of a parameter A, the in-plane pitch, and a location of the optically anisotropic molecule, and
the parameter A is configured to have a plurality of different values at the plurality of locations of the optical film.

4. The device of claim 3, wherein
the plurality of second lights are distributed along a pupil expansion direction of the device,
the parameter A of the nonlinear function is configured to decrease along the pupil expansion direction, and
the plurality of predetermined different diffraction efficiencies are configured to increase along the pupil expansion direction.

5. The device of claim 3, wherein the location of the optically anisotropic molecule is associated with a distance from a starting point of the in-plane pitch to a local point at which the optically anisotropic molecule is located along the predetermined in-plane direction.

6. The device of claim 5, wherein
the in-plane pitch is defined as a distance along the predetermined in-plane direction over which the azimuthal angles of the optically anisotropic molecules vary by 180 degrees, and
the azimuthal angle of the optically anisotropic molecule located at the starting point of the in-plane pitch is zero degree.

7. The device of claim 6, wherein
within the in-plane pitch of the in-plane orientation pattern, the azimuthal angle of the optically anisotropic molecule varies according to a function $$\varphi(x) = 180° * \frac{x}{P_{in}} + f\left(A, \frac{x}{P_{in}}\right),$$

φ is the azimuthal angle of the optically anisotropic molecule, x is the distance from the starting point of the in-plane pitch to the local point, and $P_{in}$ is the in-plane pitch $$180° * \frac{x}{P_{in}}$$

is a linear function of $$x, f\left(A, \frac{x}{P_{in}}\right)$$

is a nonlinear function of x, and the parameter A is a positive value smaller than or equal to 360°.

8. The device of claim 7, wherein the nonlinear function $$f\left(A, \frac{x}{P_{in}}\right) \text{ is } f\left(A, \frac{x}{P_{in}}\right) = A * \text{Sin}\left(360° * \frac{x}{P_{in}}\right),$$

and the function φ(x) is $$\varphi(x) = 180° * \frac{x}{P_{in}} + A * \text{Sin}\left(360° * \frac{x}{P_{in}}\right).$$

9. The device of claim 1, wherein
the optically anisotropic molecules form a plurality of helical structures within a volume of the optical film, and
the azimuthal angles of the optically anisotropic molecules are configured to vary nonlinearly along a helical axis of the helical structures.

10. The device of claim 9, wherein
an azimuthal angle of an optically anisotropic molecule varies according to a nonlinear function of a parameter A, a Bragg period $P_B$ of the optical film, and a position of the optically anisotropic molecule located along the helical axis, and
the parameter A is configured to have a plurality of different values at the plurality of locations of the optical film.

11. The device of claim 9, wherein within a helical pitch of the helical structure, the azimuthal angle of the optically anisotropic molecule is configured to vary nonlinearly with respect to a distance from a starting point of the helical pitch to a local point at which the optically anisotropic molecule is located along the helical axis.

12. The device of claim 11, wherein
the helical pitch is a distance along the helical axis over which the azimuthal angle of the optically anisotropic molecule varies by 360°, and
the azimuthal angle of the optically anisotropic molecule located at the starting point of the helical pitch is zero degree.

13. The device of claim 12,
wherein within the helical pitch of the helical structure, the azimuthal angle of the optically anisotropic molecule varies according to a function $$\varphi(z) = 180° * \frac{z}{P_B} + f\left(A, \frac{z}{P_B}\right),$$

wherein φ is the azimuthal angle of the optically anisotropic molecule, z is the distance from the starting point of the helical pitch to the local point, and $P_B$ is a Bragg period $$180° * \frac{z}{P_B}$$

is a linear function of $$z, f\left(A, \frac{z}{P_B}\right)$$

is a nonlinear function of z, and the parameter A is a positive value smaller than or equal to 360°.

14. The device of claim 13, wherein the nonlinear function $$f\left(A, \frac{z}{P_B}\right) \text{ is } f\left(A, \frac{z}{P_B}\right) = A * \text{Sin}\left(360° * \frac{z}{P_B}\right),$$

and the function φ(z) is $$\varphi(z) = 180° * \frac{z}{P_B} + A * \text{Sin}\left(360° * \frac{z}{P_B}\right).$$

15. The device of claim 1, wherein the optical film is configured to diffract the first light out of the light guide as the plurality of second lights.

16. The device of claim 1, further comprising:
an out-coupling element coupled with the light guide,
wherein the optical film is configured to diffract the first light as the plurality of second lights propagating toward the out-coupling element, and
wherein the out-coupling element is configured to couple the plurality of second lights out of the light guide as a plurality of third lights.

17. A method, comprising:
generating at least three circularly polarized beams, wherein the at least three circularly polarized beams include one or more left-handed circularly polarized beams and one or more right-handed circularly polarized beams, and the at least three circularly polarized beams are configured to interfere with one another to generate a polarization interference pattern; and
exposing a polarization sensitive recording medium to the polarization interference pattern to align optically anisotropic molecules in the polarization sensitive recording medium to form an in-plane orientation pattern.

18. The method of claim 17, wherein the at least three circularly polarized beams include a first beam, a second beam, and a third beam, and a first angle formed between the first beam and the second beam is different from a second angle formed between the second beam and the third beam.

19. The method of claim 17, wherein the polarization sensitive recording medium includes a bulk photo-alignment material, and exposing the polarization sensitive recording medium to the polarization interference pattern results in the polarization interference pattern being recorded in the bulk photo-alignment material.

20. The method of claim 17, wherein within an in-plane pitch of the in-plane orientation pattern, azimuthal angles of the aligned optically anisotropic molecules vary nonlinearly along a predetermined in-plane direction of the in-plane orientation pattern.

* * * * *